United States Patent
Lee et al.

(10) Patent No.: US 10,318,035 B2
(45) Date of Patent: *Jun. 11, 2019

(54) TOUCH SENSOR INTEGRATED TYPE DISPLAY DEVICE HAVING DUMMY PIXEL ELETRODES IN A BEZEL REGION

(71) Applicant: LG Display Co., Ltd., Seoul (KR)

(72) Inventors: Jaegyun Lee, Gyeonggi-do (KR);
Jihyun Jung, Gyeonggi-do (KR);
Sangkyu Kim, Gyeonggi-do (KR);
Seungrok Shin, Gyeonggi-do (KR);
Jeonghoon Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,333

(22) Filed: Nov. 17, 2017

(65) Prior Publication Data

US 2018/0107318 A1  Apr. 19, 2018

Related U.S. Application Data

(63) Continuation of application No. 14/580,600, filed on Dec. 23, 2014, now Pat. No. 9,823,765.

(30) Foreign Application Priority Data

Apr. 29, 2014  (KR) ........................ 10-2014-0051756

(51) Int. Cl.
*G06F 3/044* (2006.01)
*G06F 3/041* (2006.01)

(52) U.S. Cl.
CPC ............ *G06F 3/0412* (2013.01); *G06F 3/044* (2013.01); *G06F 3/0418* (2013.01); *G06F 3/0416* (2013.01); *G06F 2203/04103* (2013.01)

(58) Field of Classification Search
CPC ...... G06F 3/0412; G06F 3/044; G06F 3/0416; G06F 2203/04112; G06F 3/0418; G06F 2203/04103–2203/04105
See application file for complete search history.

(56) References Cited

U.S. PATENT DOCUMENTS

2005/0151912 A1   7/2005  Miyachi
2009/0278443 A1  11/2009  Terada
(Continued)

FOREIGN PATENT DOCUMENTS

CN   101882041 A   11/2010
CN   102622149 A    8/2012
(Continued)

OTHER PUBLICATIONS

The first Office Action dated Jul. 27, 2017 from the State Intellectual Property Office of the People's Republic of China in counterpart Chinese application No. 201410815967.5.

*Primary Examiner* — Darlene M Ritchie
(74) *Attorney, Agent, or Firm* — Morgan, Lewis & Bockius LLP

(57) ABSTRACT

A touch sensor integrated type display device includes gate lines and data lines disposed to cross over each other, pixel electrodes respectively disposed in areas defined by the crossing of the gate lines and the data lines in an active area, 1-1 electrodes arranged in at least two rows and at least two columns in the active area, 1-2 electrodes positioned outside the 1-1 electrodes and extending from the active area to a bezel area, and first routing wires respectively connected to the 1-1 and 1-2 electrodes and arranged in parallel. Each gate line extends from the active area to the bezel area on opposite sides of the active area, and each data line extends from the active area to the bezel area on opposite sides of the active area crossing the gate line.

10 Claims, 46 Drawing Sheets

(56) References Cited

U.S. PATENT DOCUMENTS

| | | |
|---|---|---|
| 2010/0026656 A1 | 2/2010 | Hotelling |
| 2010/0039406 A1 | 2/2010 | Lee et al. |
| 2010/0053131 A1 | 3/2010 | Handa |
| 2010/0123681 A1 | 5/2010 | Wu |
| 2011/0291961 A1 | 12/2011 | Hsieh |
| 2012/0062506 A1 | 3/2012 | Chae et al. |
| 2012/0075233 A1 | 3/2012 | Lakshminarayanan |
| 2012/0194459 A1 | 8/2012 | Park |
| 2012/0249444 A1 | 10/2012 | Lee |
| 2012/0262435 A1 | 10/2012 | Park et al. |
| 2013/0033439 A1 | 2/2013 | Kim |
| 2013/0147724 A1 | 6/2013 | Hwang |
| 2013/0235279 A1 | 9/2013 | Sugisaka |
| 2013/0328812 A1 | 12/2013 | Kim et al. |
| 2014/0049500 A1 | 2/2014 | Chen |
| 2014/0055383 A1 | 2/2014 | Kim et al. |
| 2014/0285465 A1 | 9/2014 | Hayashi |
| 2014/0307190 A1 | 10/2014 | Tomikawa |
| 2015/0042909 A1* | 2/2015 | Sekiguchi ............ G06F 3/0412 349/12 |
| 2015/0234486 A1 | 8/2015 | Huang |
| 2015/0293559 A1 | 10/2015 | Park |
| 2015/0293630 A1 | 10/2015 | Ishizaki |
| 2015/0332080 A1 | 11/2015 | Du |

FOREIGN PATENT DOCUMENTS

| | | |
|---|---|---|
| CN | 202495010 U | 10/2012 |
| CN | 103164076 A | 6/2013 |
| KR | 20090121635 A | 11/2009 |
| KR | 20120027984 A | 3/2012 |
| KR | 20120116665 A | 10/2012 |
| KR | 20130138644 A | 12/2013 |
| KR | 20140027695 A | 3/2014 |
| WO | 2013/035276 A1 | 3/2014 |

\* cited by examiner

TOUCH SENSOR INTEGRATED TYPE DISPLAY DEVICE HAVING DUMMY PIXEL ELETRODES IN A BEZEL REGION

This application is a continuation application of copending U.S. application Ser. No. 14/580,600, filed on Dec. 23, 2014, which claims the benefit of priority under 35 U.S.C. § 119(a) to Korean Patent Application No. 10-2014-0051756, filed on Apr. 29, 2014, both of which are incorporated by reference herein in its entirety.

BACKGROUND OF THE INVENTION

Field of the Invention

Embodiments of the invention relate to a touch sensor integrated type display device, such as a touch sensor integrated type display device capable of increasing a touch performance by improving touch accuracy at a corner or an edge.

Discussion of the Related Art

In recent years, various input devices, such as a keyboard, a mouse, a track ball, a joystick, and a digitizer, have been used to allow users to interface with home appliances or information telecommunication devices. However, as a user makes use of these input devices, the user may become dissatisfied due to the need to learn how to use the input devices. Furthermore, these input devices occupy physical space. Thus, there has been an increased demand for a convenient and simple input device capable of reducing erroneous operations. In response to the demand, a touch sensor has been proposed to enable the user to input information by directly touching a screen, or by approaching the screen with his or her hand or a pen while he or she watches the display device. Such a display device can be applied to, for example, a home appliance or an information telecommunication device.

The touch sensor may a simple configuration capable of reducing erroneous operations. The user may be able to perform an input action without using a separate input device, and can quickly and easily manipulate a display device implementing such a touch sensor through the contents displayed on the screen. Thus, the touch sensor has been applied to various display devices.

The touch sensor may be classified into an add-on type touch sensor, an on-cell type touch sensor, and an integrated type (or in-cell type) touch sensor, depending on its structure. The add-on type touch sensor may be configured such that the display device and a touch panel including the touch sensor are individually manufactured, and then the touch panel may be attached to an upper substrate of the display device. The on-cell type touch sensor may be configured such that the touch sensor may be directly formed on the surface of an upper glass substrate of the display device. The in-cell type touch sensor may be configured such that the touch sensor may be mounted inside the display device to thereby achieve a thin profile display device and increase the durability of the display device.

However, because the add-on type touch sensor has a structure in which the touch sensor is mounted on the display device, there is a problem of an increase in a thickness of the display device. Further, the visibility of the display device may be reduced by a reduction in brightness of the display device resulting from the increase in the thickness of the display device.

The on-cell type touch sensor is formed on the surface of the glass substrate of the display device and thereby shares a glass substrate with the display device. Therefore, a thickness of the display device using the on-cell type touch sensor may be less than a thickness of the display device using the add-on type touch sensor. However, the entire thickness of the display device using the on-cell type touch sensor may increase because of a touch driving electrode layer, a touch sensing electrode layer, and an insulating layer for insulating the touch driving electrode layer and the touch sensing electrode layer, which constitute the on-cell type touch sensor.

The in-cell type touch sensor may solve the problems generated in the add-on type touch sensor and the on-cell type touch sensor, providing advantages of a thin profile and an improvement in durability. The in-cell type touch sensor may be divided into a light type touch sensor and a capacitive touch sensor, depending on a method for sensing a touched portion. The capacitive touch sensor may be subdivided into a self capacitive touch sensor and a mutual capacitive touch sensor.

The self capacitive touch sensor may form a plurality of independent patterns in a touch area of a touch sensing panel and measure changes in a capacitance of each independent pattern, thereby deciding whether or not a touch operation is performed. The mutual capacitive touch sensor may cross X-axis electrode lines (for example, driving electrode lines) and Y-axis electrode lines (for example, sensing electrode lines) in a touch electrode formation area of a touch sensing panel to form a matrix, apply a driving pulse to the X-axis electrode lines, and sense changes in voltages generated in sensing nodes defined as crossings of the X-axis electrode lines and the Y-axis electrode lines through the Y-axis electrode lines, thereby deciding whether or not a touch operation is performed.

Hereinafter, an example related art self capacitive touch sensor integrated type liquid crystal display is described with reference to FIG. 1. FIG. 1 is a plane view showing a related art self capacitive touch sensor integrated type liquid crystal display.

As shown in FIG. 1, the self capacitive touch sensor integrated type liquid crystal display may include an active area AA, in which touch electrodes are formed and data may be displayed, and a bezel area BA positioned outside the active area AA. In the bezel area BA, various wires, a source driving and touch sensing integrated circuit (IC) 10, and a gate driver IC 20 may be formed.

The active area AA may include a plurality of touch electrodes Tx11-Tx1$m$, Tx21-Tx2$m$, Tx31-Tx3$m$, ..., and Txn1-Txnm divided in a first direction (for example, x-axis direction) and a second direction (for example, y-axis direction) crossing the first direction and a plurality of routing wires TW11-TW1$m$, TW21-TW2$m$, TW31-TW3$m$, ..., and TWn1-TWnm which may be respectively connected to the plurality of touch electrodes Tx11-Tx1$m$, Tx21-Tx2$m$, Tx31-Tx3$m$, ..., and Txn1-Txnm and may be arranged in parallel with one another in the second direction.

The plurality of touch electrodes Tx11-Tx1$m$, Tx21-Tx2$m$, Tx31-Tx3$m$, ..., and Txn1-Txnm in the active area AA may be formed by dividing a common electrode of the liquid crystal display, and thus operate as common electrodes in a display drive for displaying data and operate as touch electrodes in a touch drive for touch recognition.

The bezel area BA positioned outside the active area AA may include the source driving and touch sensing IC 10, the gate driver IC 20, and various wires. In the display drive, the source driving and touch sensing IC 10 drives gate lines (not shown) of the liquid crystal display and supplies display data to data lines (not shown). In the touch drive, the source driving and touch sensing IC 10 supplies a touch driving voltage to the touch electrodes Tx11-Tx1*m*, Tx21-Tx2*m*, Tx31-Tx3*m*, . . . , and Txn1-Txnm and scans changes in a capacitance of each touch electrode before and after the touch of each touch electrode, thereby determining a position of the touched touch electrodes. The various wires include the routing wires TW11-TW1*m*, TW21-TW2*m*, TW31-TW3*m*, . . . , and TWn1-TWnm connected to the touch electrodes Tx11-Tx1*m*, Tx21-Tx2*m*, Tx31-Tx3*m*, . . . , and Txn1-Txnm, the data lines connected to the source driving and touch sensing IC 10, and the gate lines connected to the gate driver IC 20.

In the related art self capacitive touch sensor integrated type liquid crystal display having the above-described structure, when a finger or a conductive metal such as a stylus pen touches the active area AA of the liquid crystal display, the source driving and touch sensing IC 10 may sense changes in a capacitance of the touch electrode before and after the touch electrode is touched, and may determine a touch position. For example, the source driving and touch sensing IC 10 may apply a driving pulse to the touch electrodes Tx11-Tx1*m*, Tx21-Tx2*m*, Tx31-Tx3*m*, . . . , and Txn1-Txnm formed in the active area AA and then may sense changes in a self capacitance of each of the touch electrodes Tx11-Tx1*m*, Tx21-Tx2*m*, Tx31-Tx3*m*, . . . , and Txn1-Txnm before and after the touch of each touch electrode, thereby determining the touch position.

Next, an example of the accuracy of touch sensing depending on the touch position is described with reference to FIG. 2. FIG. 2 is a plane view showing a partial area of FIG. 1 for an explanation of touch accuracy depending on a touch position in the related art touch sensor integrated type liquid crystal display.

FIG. 2 shows changes in a capacitance at each of touch positions 'a' to 'd'. As shown in FIG. 2, because each of the touch electrodes Tx11-Tx1*m*, Tx21-Tx2*m*, Tx31-Tx3*m*, . . . , and Txn1-Txnm should accurately sense a touch position of the finger or the stylus pen, each touch electrode may have a very small size. Thus, when a touch operation is performed on the touch sensor integrated type liquid crystal display, one touch electrode as well as the adjacent touch electrode may be touched together.

Further, when the finger or the stylus pen touches the touch electrode, the touch sensitivity may increase in proportion to a contact area between them. Thus, the touch sensitivity obtained when the touch operation is performed at a corner or an edge of the active area AA may be less than the touch sensitivity obtained when the touch operation is performed on an inner side of the active area AA.

For example, when the four touch electrodes Tx22, Tx23, Tx32, and Tx33 at an inner touch position 'a' of the active area AA shown in FIG. 2 are touched, a change amount of a capacitance of each of the four touch electrodes Tx22, Tx23, Tx32, and Tx33 before and after the touch of each touch electrode may be accumulated and measured. Because the change amount of the capacitance of each of the four touch electrodes Tx22, Tx23, Tx32, and Tx33 is accumulated and calculated depending on their touch area, an accurate touch position may be sensed.

However, when the touch operation is performed at an edge (i.e., a touch position 'b' or 'c') of the active area AA shown in FIG. 2, only the two touch electrodes Tx21, Tx31; or Tx11, Tx12 may be touched. In this example, a change amount of a capacitance of each of the two touch electrodes Tx21, Tx31; or Tx11, Tx12 before and after the touch of each touch electrode may be accumulated and measured. However, because the change amount of the capacitance of each of the two touch electrodes Tx21, Tx31; or Tx11, Tx12 is accumulated and calculated depending on their touch area, the touch sensitivity at the edge touch position 'b' or 'c' may be less than the touch sensitivity at the inner touch position 'a'.

Further, when the touch operation is performed at a corner (i.e., a touch position 'd') of the active area AA shown in FIG. 2, only one touch electrode Tx11 may be touched. In this example, a change amount of a capacitance of the one touch electrode Tx11 before and after the touch of the touch electrode Tx11 may be measured. Because the change amount of the capacitance of the touch electrode Tx11 may be calculated depending on its touch area, the touch sensitivity at the corner touch position 'd' may be less than the touch sensitivity at the edge touch position 'b' or 'c'.

As described above, because a magnitude of the capacitance may vary depending on a touch position, the change amount of the capacitance may decrease when the touch position is close to the edge and/or the corner of the active area AA. Hence, the touch accuracy and linearity at the edge and the corner of the active area AA may be reduced.

Next, an example related art mutual capacitive touch sensor integrated type liquid crystal display is described with reference to FIG. 3. FIG. 3 is a plane view showing a related art mutual capacitive touch sensor integrated type liquid crystal display.

As shown in FIG. 3, the mutual capacitive touch sensor integrated type liquid crystal display may include an active area AA, in which touch electrodes are formed and data may be displayed, and a bezel area BA positioned outside the active area AA. In the bezel area BA, various wires, a source driving and touch sensing IC 10', and a gate driver IC 20' may be formed.

The active area AA may include a plurality of first touch electrodes Tx11-Tx14, Tx21-Tx24, Tx31-Tx34, and Tx41-Tx44 divided in a first direction (for example, x-axis direction) and a second direction (for example, y-axis direction) crossing the first direction, a plurality of first sub-routing wires TW11-TW14, TW21-TW24, TW31-TW34, and TW41-TW44 which may be respectively connected to the plurality of first touch electrodes Tx11-Tx14, Tx21-Tx24, Tx31-Tx34, and Tx41-Tx44 and extend in the second direction, and a plurality of second touch electrodes Rx1 to Rx3 which may be disposed between the first touch electrodes Tx11-Tx41 and Tx12-Tx42; Tx12-Tx42 and Tx13-Tx43; and Tx13-Tx43 and Tx14-Tx44, which may be adjacent to each other in the first direction, and may be arranged in the second direction.

The plurality of first touch electrodes Tx11-Tx14, Tx21-Tx24, Tx31-Tx34, and Tx41-Tx44 may be connected to one another using the first sub-routing wires TW11-TW14, TW21-TW24, TW31-TW34, and TW41-TW44 respectively connected to the first touch electrodes, first connection wires TW1C to TW4C, and first main routing wires TW1 to TW4 and may form a plurality of first touch electrode lines Tx1 to Tx4 arranged in the first direction.

For example, the 1-1 touch electrodes Tx11 to Tx14 of a first row arranged in the first direction may be connected to one another using the 1-1 sub-routing wires TW11 to TW14 respectively connected to the 1-1 touch electrodes Tx11 to Tx14, the 1-1 connection wire TW1C connecting the 1-1 sub-routing wires TW11 to TW14, and the 1-1 main routing wire TW1 connected to the 1-1 connection wire TW1C and may form the 1-1 touch electrode line Tx1 of the first row.

The 1-2 touch electrodes Tx21 to Tx24 of a second row arranged in the first direction may be connected to one another using the 1-2 sub-routing wires TW21 to TW24 respectively connected to the 1-2 touch electrodes Tx21 to Tx24, the 1-2 connection wire TW2C connecting the 1-2 sub-routing wires TW21 to TW24, and the 1-2 main routing wire TW2 connected to the 1-2 connection wire TW2C and may form the 1-2 touch electrode line Tx2 of the second row.

The 1-3 touch electrodes Tx31 to Tx34 of a third row arranged in the first direction may be connected to one another using the 1-3 sub-routing wires TW31 to TW34 respectively connected to the 1-3 touch electrodes Tx31 to Tx34, the 1-3 connection wire TW3C connecting the 1-3 sub-routing wires TW31 to TW34, and the 1-3 main routing wire TW3 connected to the 1-3 connection wire TW3C and may form the 1-3 touch electrode line Tx3 of the third row.

The 1-4 touch electrodes Tx41 to Tx44 of a fourth row arranged in the first direction may be connected to one another using the 1-4 sub-routing wires TW41 to TW44 respectively connected to the 1-4 touch electrodes Tx41 to Tx44, the 1-4 connection wire TW4C connecting the 1-4 sub-routing wires TW41 to TW44, and the 1-4 main routing wire TW4 connected to the 1-4 connection wire TW4C and may form the 1-4 touch electrode line Tx4 of the fourth row.

In the plurality of second touch electrodes Rx1 to Rx3, the 2-1 touch electrode Rx1 may be disposed between the first touch electrodes Tx11 and Tx12; Tx21 and Tx22; Tx31 and Tx32; and Tx41 and Tx42, which may be adjacent to each other in the first direction, and may form a 2-1 touch electrode line Rx1 of a first column.

The 2-2 touch electrode Rx2 may be disposed between the first touch electrodes Tx12 and Tx13; Tx22 and Tx23; Tx32 and Tx33; and Tx42 and Tx43, which may be adjacent to each other in the first direction, and may form a 2-2 touch electrode line Rx2 of a second column.

The 2-3 touch electrode Rx3 may be disposed between the first touch electrodes Tx13 and Tx14; Tx23 and Tx24; Tx33 and Tx34; and Tx43 and Tx43, which may be adjacent to each other in the first direction, and may form a 2-3 touch electrode line Rx3 of a third column.

The bezel area BA positioned outside the active area AA may include the source driving and touch sensing IC 10', the gate driver IC 20', and various wires.

The gate driver IC 20' may drive gate lines (not shown) of the liquid crystal display in a display drive.

The source driving and touch sensing IC 10' may supply display data to data lines (not shown) of the liquid crystal display in the display drive. In a touch drive, the source driving and touch sensing IC 10' may sequentially supply a touch driving voltage to the 1-1 to 1-4 touch electrode lines Tx1 to Tx4 and then sense the 2-1 to 2-3 touch electrode lines Rx1 to Rx3. The source driving and touch sensing IC 10' may scan changes in a mutual capacitance generated between the 1-1 to 1-4 touch electrode lines Tx1 to Tx4 and the 2-1 to 2-3 touch electrode lines Rx1 to Rx3 before and after the touch of each touch electrode and determine a position of the touched touch electrodes.

The various wires may include the 1-1 to 1-4 sub-routing wires TW11-TW14, TW21-TW24, TW31-TW34, and TW41-TW44 which may be respectively connected to the 1-1 to 1-4 touch electrodes Tx11-Tx14, Tx21-Tx24, Tx31-Tx34, and Tx41-Tx44 and extend from the active area AA to the bezel area BA, the 1-1 connection wire TW1C connecting the 1-1 sub-routing wires TW11 to TW14, the 1-2 connection wire TW2C connecting the 1-2 sub-routing wires TW21 to TW24, the 1-3 connection wire TW3C connecting the 1-3 sub-routing wires TW31 to TW34, the 1-4 connection wire TW4C connecting the 1-4 sub-routing wires TW41 to TW44, the 1-1 to 1-4 main routing wires TW1 to TW4 respectively connecting the 1-1 to 1-4 connection wires TW1C, TW2C, TW3C, and TW4C to the source driving and touch sensing IC 10', second routing wires RW1 to RW3 connected to the second touch electrode lines Rx1 to Rx3, the gate lines (not shown) connected to the gate driver IC 20', and the data lines (not shown) connected to the source driving and touch sensing IC 10'.

The first and second touch electrodes Tx11-Tx14, Tx21-Tx24, Tx31-Tx34, Tx41-Tx44 and Rx1 to Rx3 in the active area AA may be formed by dividing a common electrode of the liquid crystal display, and thus operate as common electrodes in the display drive for displaying data and operate as touch electrodes in the touch drive for recognizing the touch position.

In the mutual capacitive touch sensor integrated type liquid crystal display having the above-described example structure, when a finger or a conductive metal, such as a stylus pen, touches the active area AA of the liquid crystal display, the source driving and touch sensing IC 10' may sense changes in a capacitance between the first and second touch electrodes close to a touch position before and after the touch of each touch electrode and may determine the touch position. For example, the source driving and touch sensing IC 10' may sequentially apply a driving pulse to the first touch electrode lines (touch driving electrode lines) Tx1 to Tx4 of the active area AA and then may sense changes in the mutual capacitance generated between the first touch electrode lines Tx1 to Tx4 and the second touch electrode lines (touch sensing electrode lines) Rx1 to Rx3 before and after the touch of each touch electrode through the second touch electrode lines Rx1 to Rx3, thereby determining the touch position.

Next, an example of the accuracy of touch sensing depending on the touch position is described with reference to FIG. 4. FIG. 4 is a plane view showing a partial area of FIG. 3 for an explanation of touch accuracy depending on a touch position.

In the touch sensor integrated type liquid crystal display shown in FIG. 4, the first and second touch electrode lines Tx1-Tx4 and Rx1-Rx3 may be formed by dividing the common electrode formed in the active area AA. The mutual capacitance of each of the first and second touch electrode lines Tx1-Tx4 and Rx1-Rx3 of the active area AA may vary depending on their position. For example, the touch electrodes at an edge and a corner of the active area AA have relatively small mutual capacitance. Hence, changes in the mutual capacitance at the edge and the corner of the active area AA may be small.

FIG. 4 shows example change in a capacitance at each of touch positions '1' to '4'. As shown in FIG. 4, when a touch operation is performed at the touch position '1', a change amount of a mutual capacitance between the 1-3 touch electrode Tx13 and the 2-2 touch electrode Rx2 before and after the touch operation and a change amount of a mutual capacitance between the 1-3 touch electrode Tx13 and the 2-3 touch electrode Rx3 before and after the touch operation may be accumulated, and a total change amount of the mutual capacitance may be calculated.

When the touch operation is performed at the touch position '2', a change amount of a mutual capacitance between the 1-3 touch electrode Tx13 and the 2-3 touch electrode Rx3 before and after the touch operation and a change amount of a mutual capacitance between the 1-4 touch electrode Tx14 and the 2-3 touch electrode Rx3 before and after the touch operation may be accumulated, and a total change amount of the mutual capacitance may be calculated.

When the touch operation is performed at the touch position '3', a change amount of a mutual capacitance between the 1-4 touch electrode Tx14 and the 2-3 touch electrode Rx3 before and after the touch operation may be calculated as a total change amount of the mutual capacitance.

When the touch operation is performed at the touch position '4', a change amount of a mutual capacitance between the 1-4 touch electrode Tx14 and the 2-3 touch electrode Rx3 before and after the touch operation may be calculated as a total change amount of the mutual capacitance. However, because an edge of the 1-4 touch electrode Tx14 is touched at the touch position '4', the change amount of the mutual capacitance at the touch position '4' may be less than the change amount of the mutual capacitance at the touch position '3'.

In the change amounts of the mutual capacitance at the touch positions '1' to '4', the change amounts of the mutual capacitance at the touch positions '1' and '2' may be similar, and the change amount of the mutual capacitance at the touch position '3' may be less than the change amounts of the mutual capacitance at the touch positions '1' and '2' and may be greater than the change amount of the mutual capacitance at the touch position '4'.

As described above, because the magnitude of the mutual capacitance varies depending on the touch position, the change amount of the mutual capacitance may decrease as the touch position is close to the edge and/or the corner of the active area AA. Hence, the touch accuracy and linearity at the edge and the corner of the active area AA may be reduced.

In other words, as described above, the touch accuracy and the linearity of both the self capacitive touch sensor integrated type liquid crystal display and the mutual capacitive touch sensor integrated type liquid crystal display may be reduced at the edge and the corner of the active area AA. Therefore, there is a need for an improved measurement technique to prevent this.

SUMMARY OF THE INVENTION

Embodiments of the invention provide a touch sensor integrated type display device capable of preventing a reduction in touch accuracy and linearity, even if a touch operation is performed at a corner or an edge of an active area.

In one object of the invention, there is a touch sensor integrated type display device including an active area and a bezel area positioned outside the active area, comprising a plurality of gate lines and a plurality of data lines, which are disposed to cross over each other, a plurality of pixel electrodes respectively disposed in areas defined by the crossing of the plurality of gate lines and the plurality of data lines in the active area, a plurality of 1-1 electrodes arranged in at least two rows and at least two columns in the active area to form a horizontal electric field with the plurality of pixel electrodes, a plurality of 1-2 electrodes positioned outside the plurality of 1-1 electrodes and extending from the active area to the bezel area, and a plurality of first routing wires respectively connected to the plurality of 1-1 and 1-2 electrodes and arranged in parallel, wherein each gate line extends from the active area to the bezel area on opposite sides of the active area, and each data line extends from the active area to the bezel area on opposite sides of the active area crossing the gate line.

In another object of the invention, there is a touch sensor integrated type display device including an active area and a bezel area positioned outside the active area, comprising a plurality of gate lines and a plurality of data lines, which are disposed to cross over each other, a plurality of pixel electrodes respectively disposed in areas defined by the crossing of the plurality of gate lines and the plurality of data lines in the active area, a plurality of first electrodes arranged in at least two rows and at least two columns in the active area to form a horizontal electric field with the plurality of pixel electrodes, a plurality of first routing wires respectively connected to the plurality of first electrodes and arranged in parallel, a 2-1 electrode disposed between the plurality of first electrodes arranged in the at least two columns in the active area, a 2-2 electrode disposed outside the plurality of first electrodes arranged in the at least two columns, and a plurality of second routing wires respectively connected to the 2-1 and 2-2 electrodes and arranged in parallel with the plurality of first routing wires, wherein each gate line extends from the active area to the bezel area on opposite sides of the active area, and each data line extends from the active area to the bezel area on opposite sides of the active area crossing the gate line.

In yet another objection of the invention, there is a touch sensor integrated type display device including an active area and a bezel area positioned outside the active area, comprising a plurality of gate lines and a plurality of data lines, which are disposed to cross over each other, a plurality of pixel electrodes respectively disposed in areas defined by the crossing of the plurality of gate lines and the plurality of data lines in the active area, a plurality of 1-1 electrodes arranged in at least two rows and at least two columns in the active area to form a horizontal electric field with the plurality of pixel electrodes, a plurality of 1-2 electrodes disposed outside the plurality of 1-1 electrodes and positioned in the bezel area, and a plurality of first routing wires respectively connected to the plurality of 1-1 and 1-2 electrodes and arranged in parallel, wherein each gate line extends from the active area to the bezel area on opposite sides of the active area, and each data line extends from the active area to the bezel area on opposite sides of the active area crossing the gate line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of embodiments of the invention. In the drawings.

DETAILED DESCRIPTION OF THE ILLUSTRATED EMBODIMENTS

Reference will now be made in detail to embodiments of the invention, examples of which are illustrated in the accompanying drawings. Where possible, the same or similar reference numbers may be used throughout the drawings to refer to the same or similar parts. In the following description, a capacitive touch sensor integrated type liquid crystal display may be used as an example of a capacitive touch sensor integrated type display device, but embodiments are not limited thereto.

Figure 1:
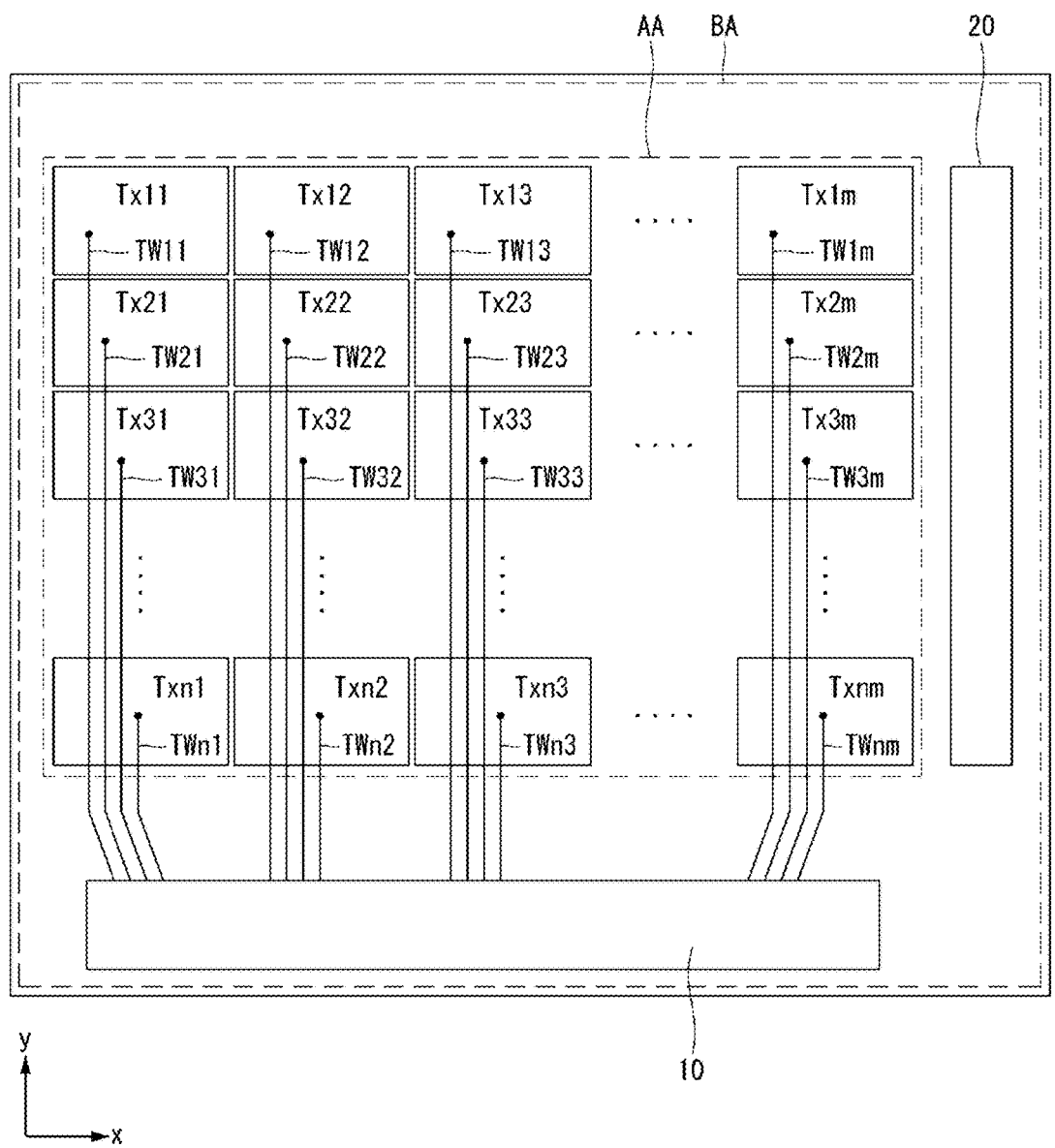
FIG. 1 is a plane view showing a related art self capacitive touch sensor integrated type liquid crystal display.
Figure 2:
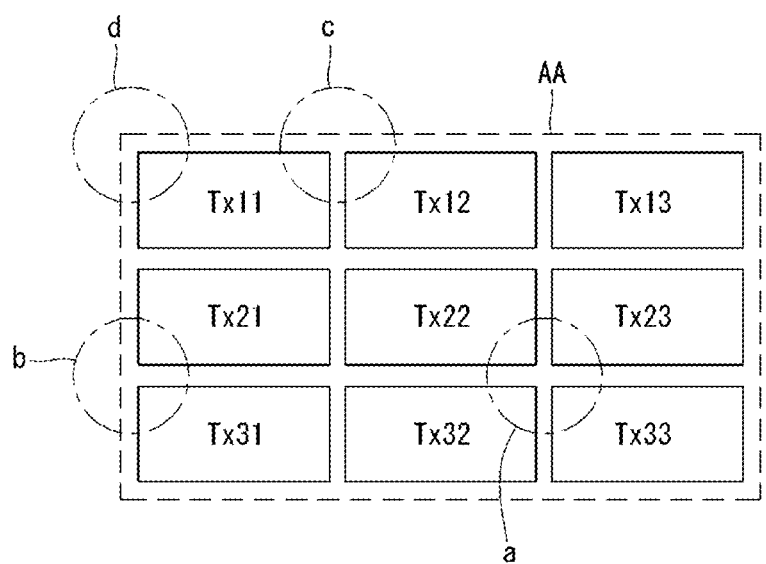
FIG. 2 is a plane view showing a partial area of FIG. 1 for an explanation of touch accuracy depending on a touch position.
Figure 3:
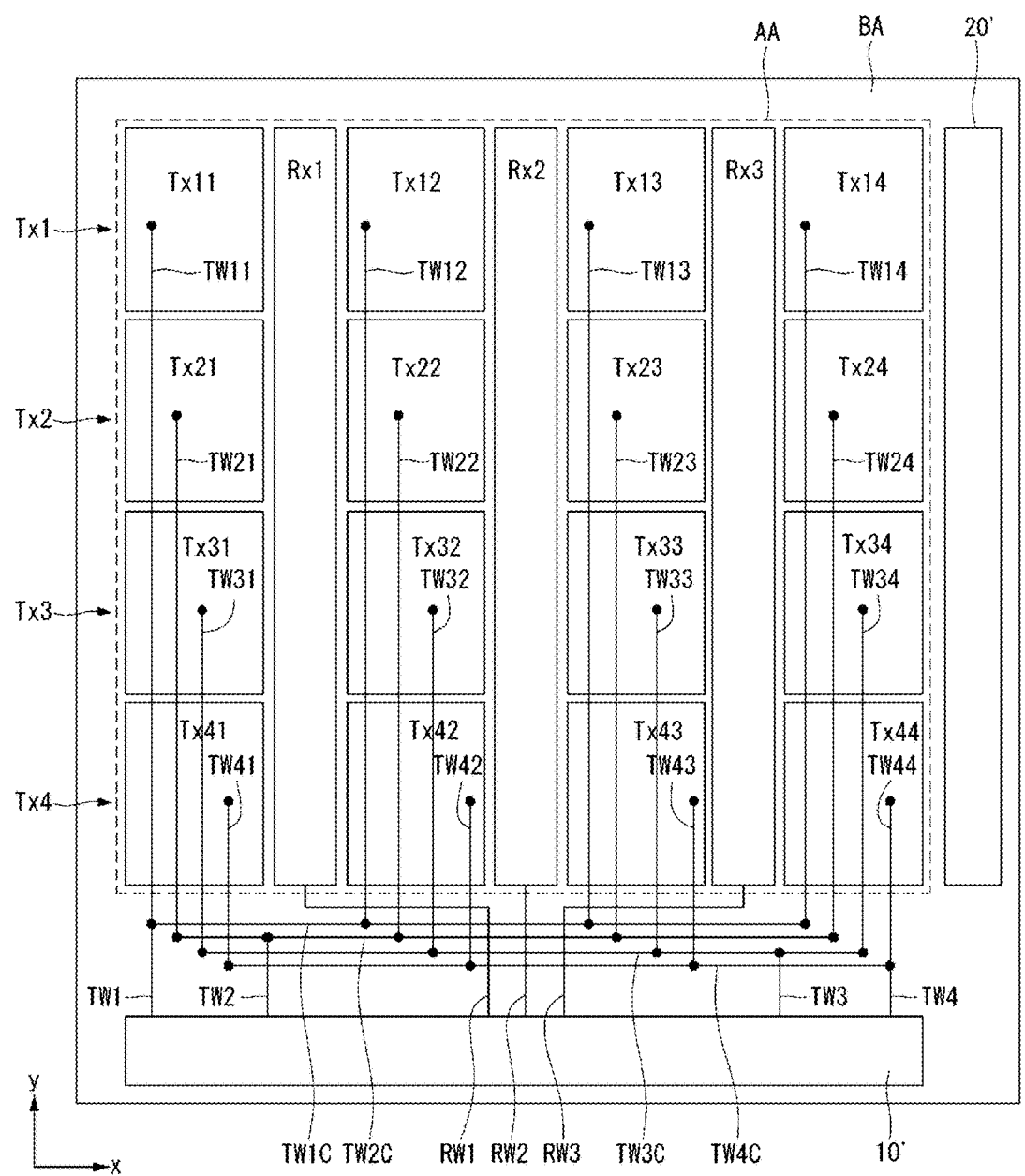
FIG. 3 is a plane view showing a related art mutual capacitive touch sensor integrated type liquid crystal display.
Figure 4:
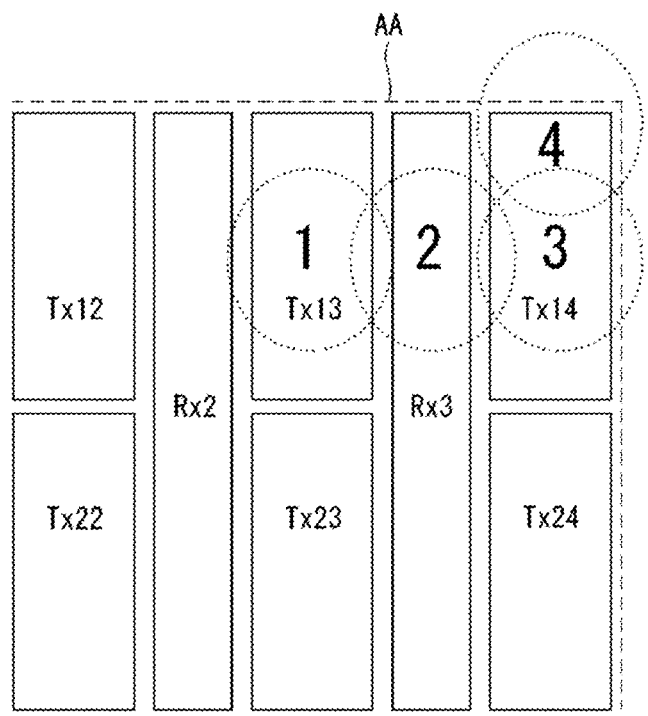
FIG. 4 is a plane view showing a partial area of FIG. 3 for an explanation of touch accuracy depending on a touch position.
Figure 5:
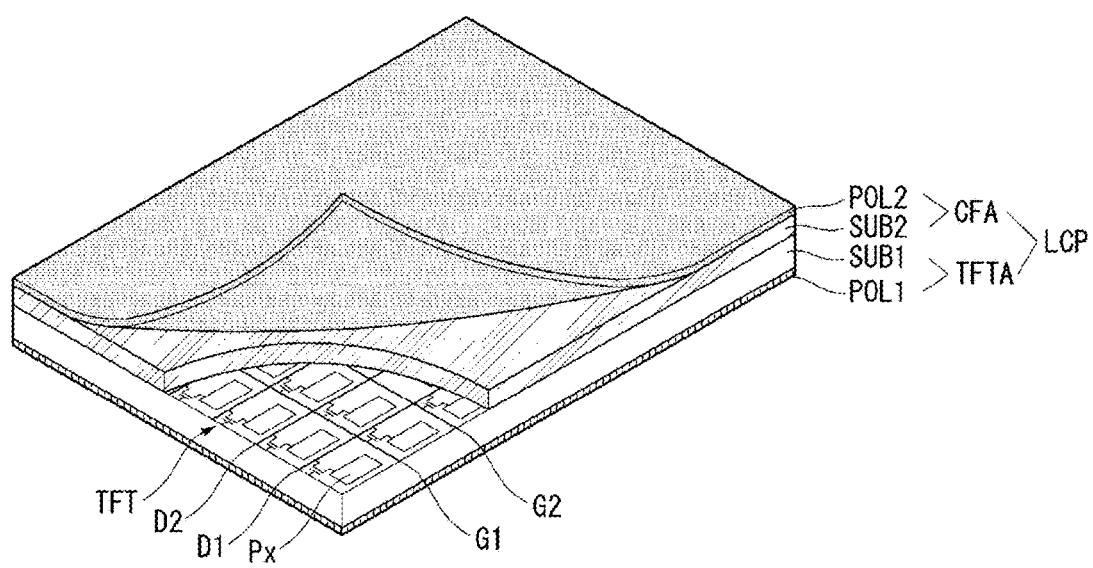
FIG. 5 is a partial exploded perspective view showing a liquid crystal display, to which example embodiments of the invention are applied.

A liquid crystal display, to which example embodiments of the invention are applied, is described with reference to FIG. 5. FIG. 5 is a partial exploded perspective view showing a liquid crystal display to which example embodiments of the invention may be applied.

As shown in FIG. 5, the liquid crystal display, to which the embodiments of the invention are applied, may include a liquid crystal display panel LCP having a thin film transistor (TFT) array TFTA and a color filter array CFA which may be positioned opposite each other with a liquid crystal layer (not shown) interposed therebetween.

The TFT array TFTA may include a plurality of gate lines G1 and G2 which may be formed in parallel in a first direction (for example, x-axis direction) on a first substrate SUB1, a plurality of data lines D1 and D2 which may be formed in parallel in a second direction (for example, y-axis direction) to cross over the plurality of gate lines G1 and G2, thin film transistors TFT formed at crossings of the gate lines G1 and G2 and the data lines D1 and D2, a plurality of pixel electrodes Px for charging liquid crystal cells to a data voltage, and a plurality of common electrodes (not shown) positioned opposite the plurality of pixel electrodes Px.

The color filter array CFA may include black matrixes (not shown) and color filters (not shown), which may be formed on a second substrate SUB2. Polarizing plates POL1 and POL2 may be respectively attached to external surfaces of the first substrate SUB1 and the second substrate SUB2 of the liquid crystal display panel LCP. Alignment layers (not shown) for setting a pre-tilt angle of liquid crystals may be respectively formed on inner surfaces of the first and second substrates SUB1 and SUB2 contacting the liquid crystals. A column spacer may be formed between the TFT array TFTA and the color filter array CFA of the liquid crystal display panel LCP to maintain cell gaps of the liquid crystal cells.

The common electrodes may be formed on the second substrate SUB2 in a vertical electric field driving manner, such as a twisted nematic (TN) mode and a vertical alignment (VA) mode. Further, the common electrodes may be formed on the first substrate SUB1 along with the pixel electrodes Px in a horizontal electric field driving manner, such as an in-plane switching (IPS) mode and a fringe field switching (FFS) mode. In the following description, embodiments of the invention will be described based on the horizontal electric field driving manner by way of example.

Figure 6:
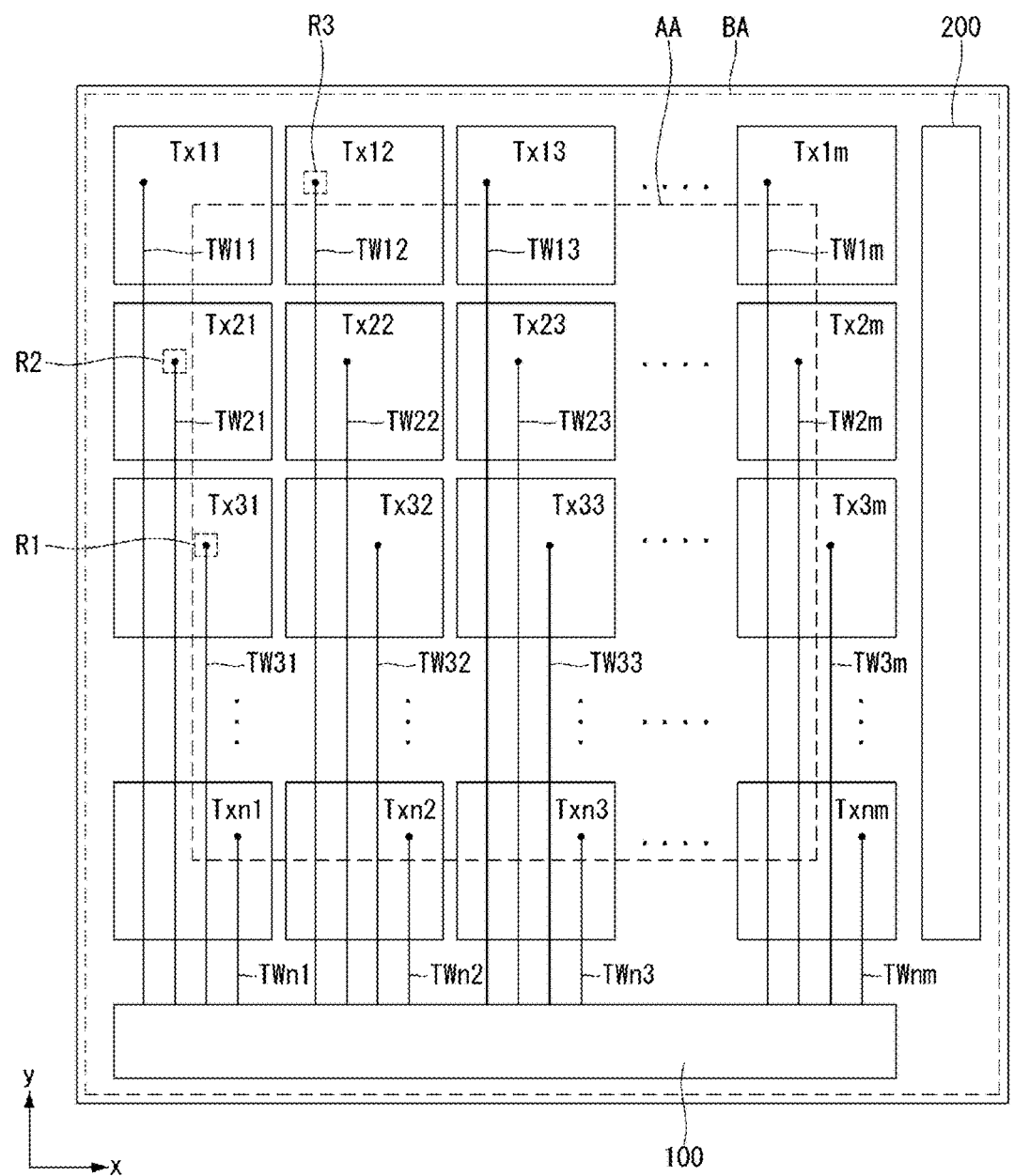
FIG. 6 is a plane view showing a self capacitive touch sensor integrated type display device according to a first embodiment of the invention.

A self capacitive touch sensor integrated type display device according to a first embodiment of the invention is described below with reference to FIGS. 6 to 9B. FIG. 6 is a plane view showing an example of the self capacitive touch sensor integrated type display device according to the first embodiment of the invention.

As shown in FIG. 6, the self capacitive touch sensor integrated type display device according to the first embodiment of the invention may include an active area AA and a bezel area BA positioned outside the active area AA.

The active area AA may include a plurality of touch electrodes Tx11-Tx1$m$, Tx21-Tx2$m$, Tx31-Tx3$m$, ..., and Txn1-Txnm divided in the first direction (for example, x-axis direction) and the second direction (for example, y-axis direction) crossing the first direction and a plurality of routing wires TW11-TW1$m$, TW21-TW2$m$, TW31-TW3$m$, ..., and TWn1-TWnm which may be respectively connected to the plurality of touch electrodes Tx11-Tx1$m$, Tx21-Tx2$m$, Tx31-Tx3$m$, ..., and Txn1-Txnm and extend in the second direction.

The plurality of touch electrodes Tx11-Tx1$m$, Tx21-Tx2$m$, Tx31-Tx3$m$, ..., and Txn1-Txnm may each have the same size. In the plurality of touch electrodes Tx11-Tx1$m$, Tx21-Tx2$m$, Tx31-Tx3$m$, ..., and Txn1-Txnm, the touch electrodes Tx11 to Tx1$m$ positioned on the uppermost side extend from the active area AA to the upper bezel area BA; the touch electrodes Tx11 to Txn1 positioned on the leftmost side extend from the active area AA to the left bezel area BA; the touch electrodes Tx1$m$ to Txnm positioned on the rightmost side extend from the active area AA to the right bezel area BA; and the touch electrodes Txn1 to Txnm positioned on the lowermost side extend from the active area AA to the lower bezel area BA. Thus, the size of a portion belonging to the active area AA of each of 1-1 touch electrodes Tx11-Tx1$m$, Txn1-Txnm, Tx21-Tx(n-1)1, and Tx2$m$-Tx(n-1)m positioned at the edge of the active area AA among the plurality of touch electrodes Tx11-Tx1$m$, Tx21-Tx2$m$, Tx31-Tx3$m$, ..., and Txn1-Txnm may be less than the size of each of 1-2 touch electrodes Tx22-Tx2($m$-1), Tx32-Tx3($m$-1), ..., and Tx(n-1)2-Tx(n-1)(m-1), of which the entire area may be positioned in the active area AA.

The bezel area BA positioned outside the active area AA may include the portions of the 1-1 touch electrodes Tx11-Tx1$m$, Txn1-Txnm, Tx21-Tx(n-1)1, and Tx2$m$-Tx(n-1)m extending from the active area AA, various wires, a source driving and touch sensing integrated circuit (IC) 100, and a gate driver IC 200. The various wires may include the routing wires TW11-TW1$m$, TW21-TW2$m$, TW31-TW3$m$, ..., and TWn1-TWnm respectively connected to the touch electrodes Tx11-Tx1$m$, Tx21-Tx2$m$, Tx31-Tx3$m$, ..., and Txn1-Txnm, the data lines D1 and D2 (refer to FIG. 5) connected to the source driving and touch sensing IC 100, and the gate lines G1 and G2 (refer to FIG. 5) connected to the gate driver IC 200.

Figure 7A:
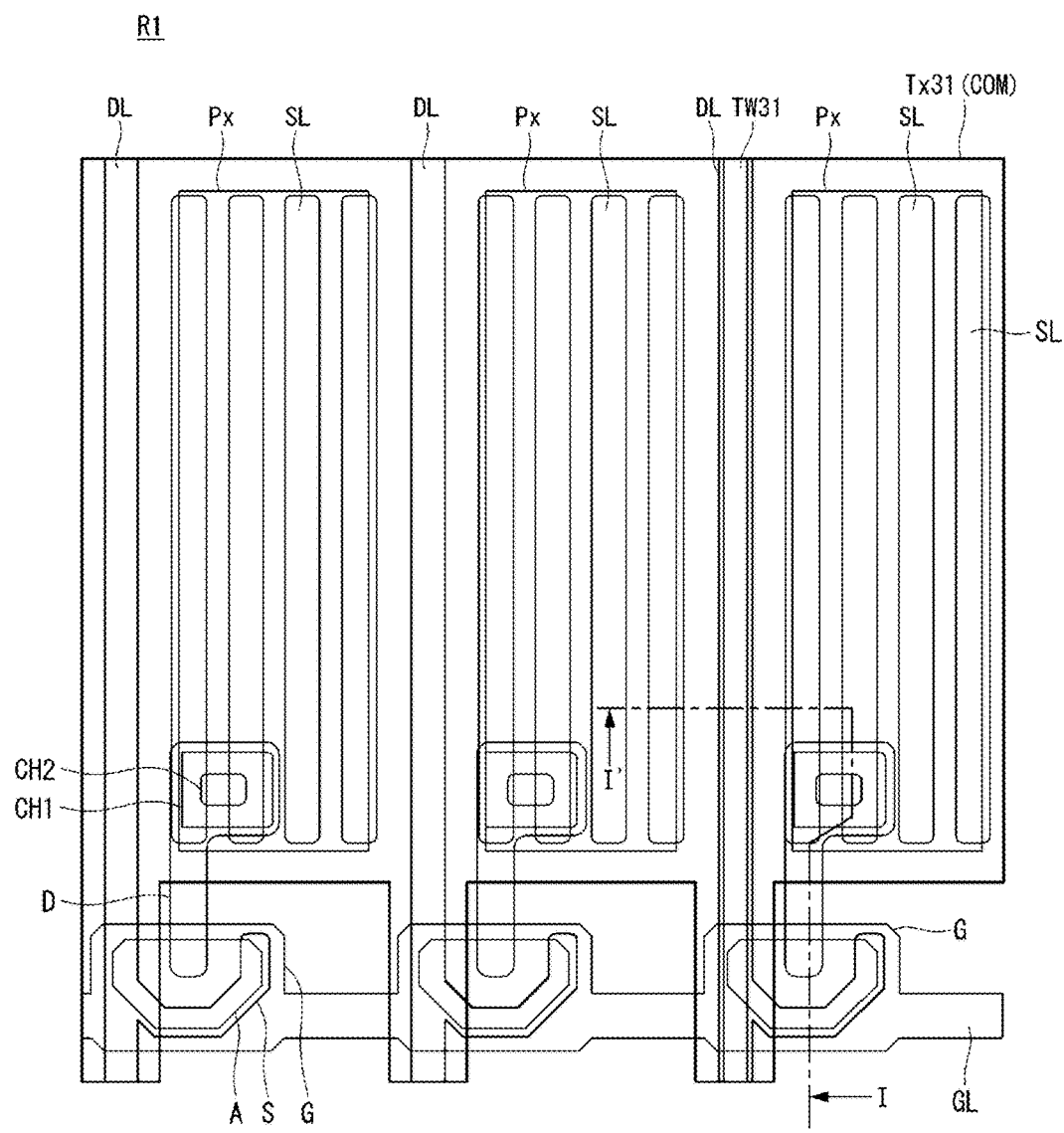
FIG. 7A is a plane view showing a partial area R1 of an active area shown in FIG. 6.
Figure 7B:
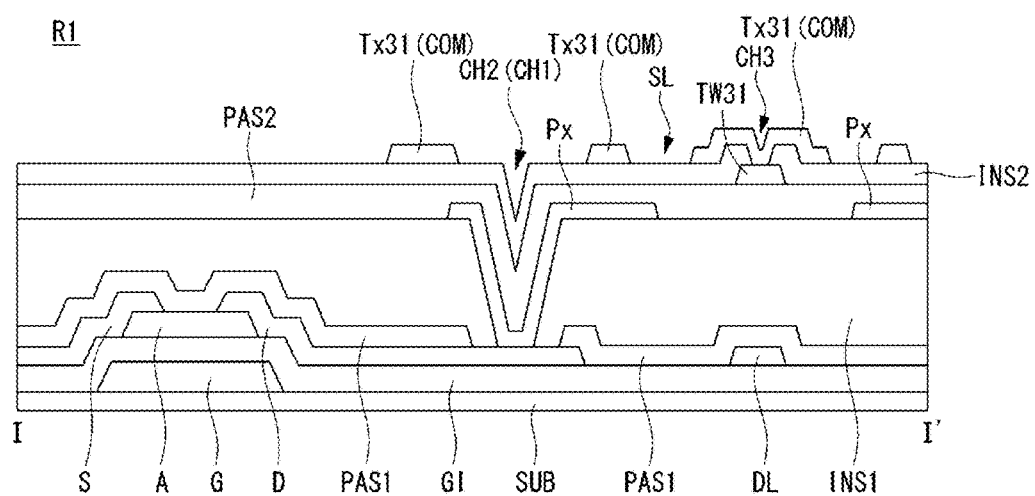
FIG. 7B is a cross-sectional view taken along line I-I' of FIG. 7A.
Figure 8A:
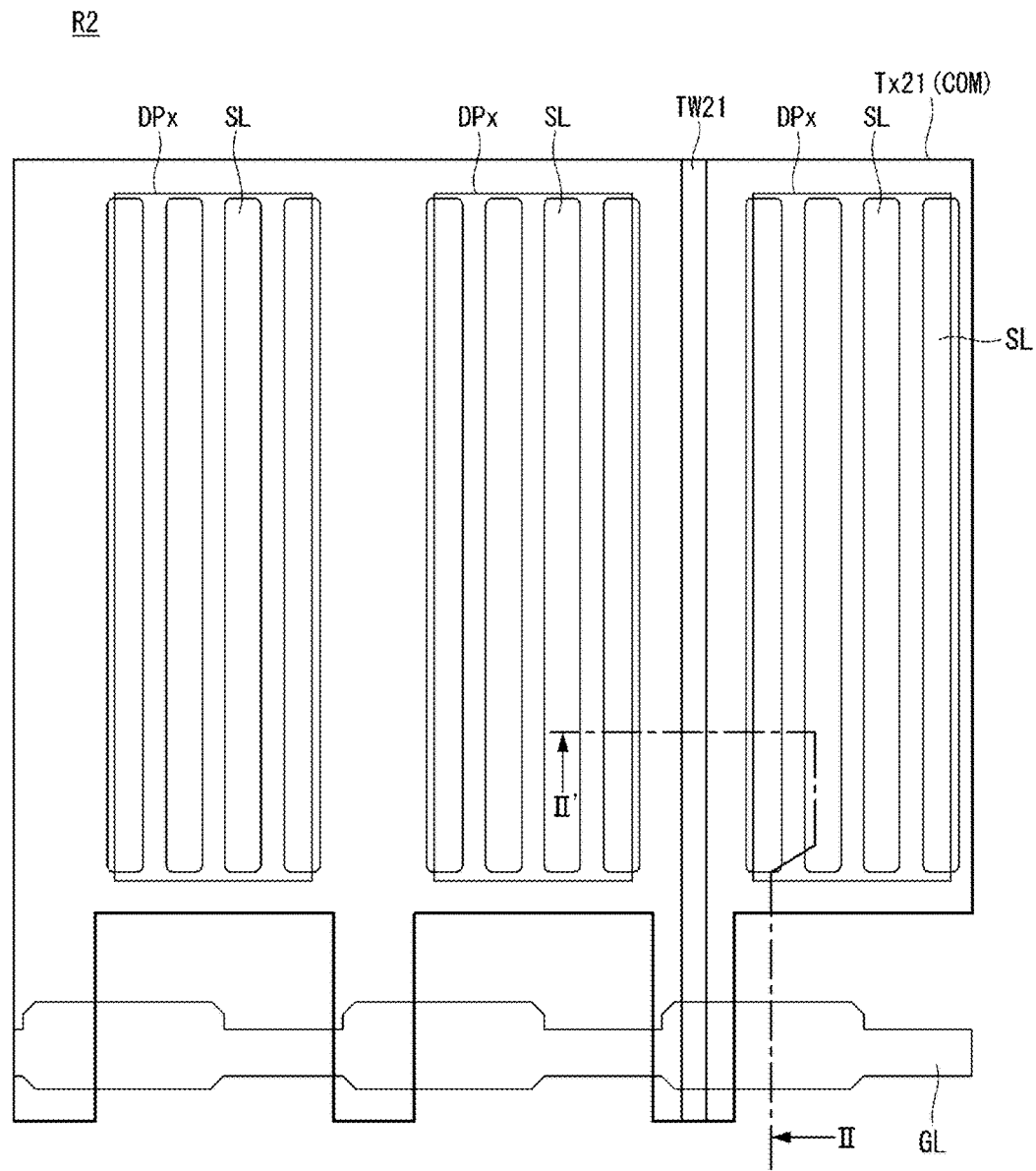
FIG. 8A is a plane view showing a partial area R2 of a bezel area on the left side or the right side of an active area shown in FIG. 6.
Figure 8B:
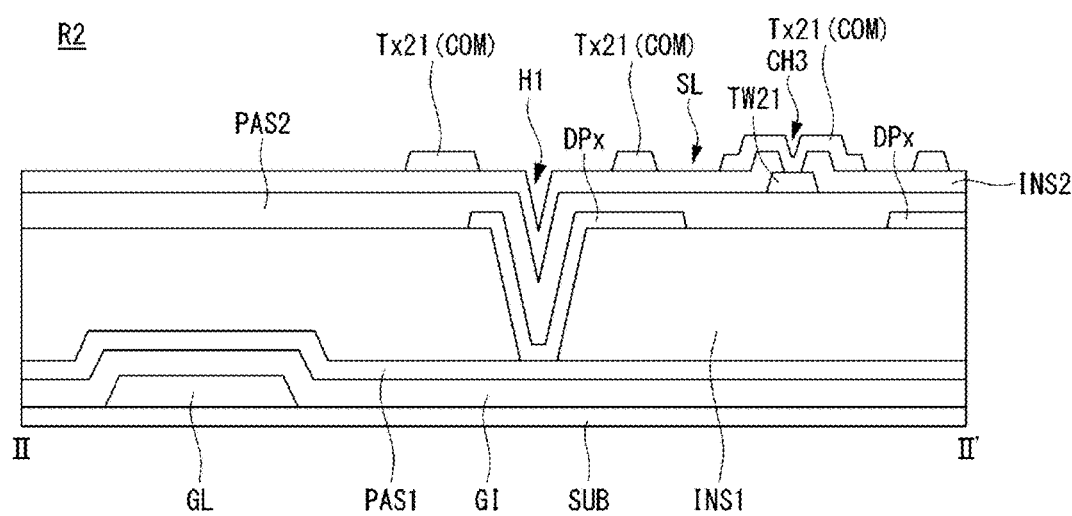
FIG. 8B is a cross-sectional view taken along line II-II' of FIG. 8A.
Figure 9A:
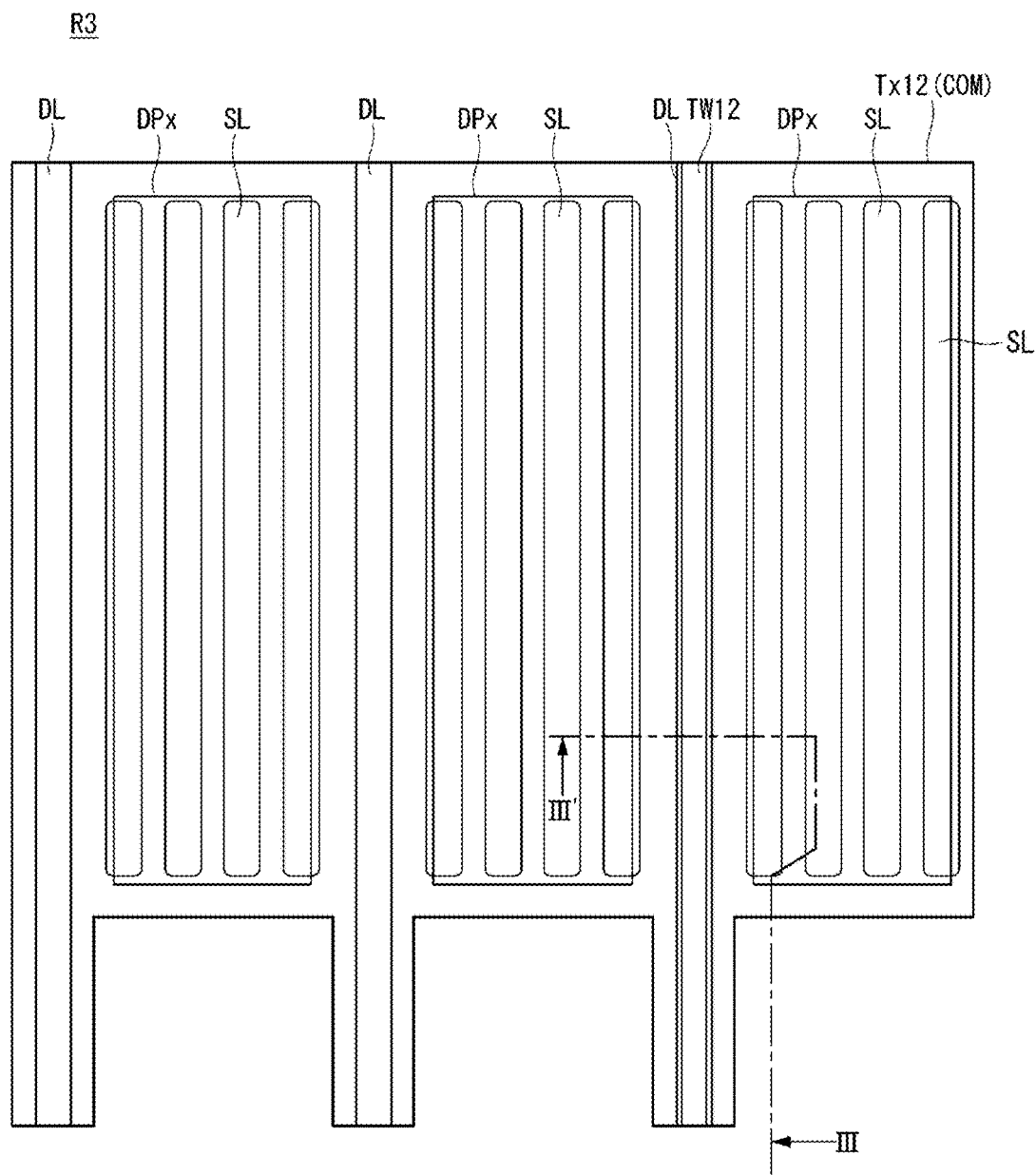
FIG. 9A is a plane view showing a partial area R3 of a bezel area on the upper side or the lower side of an active area shown in FIG. 6.
Figure 9B:
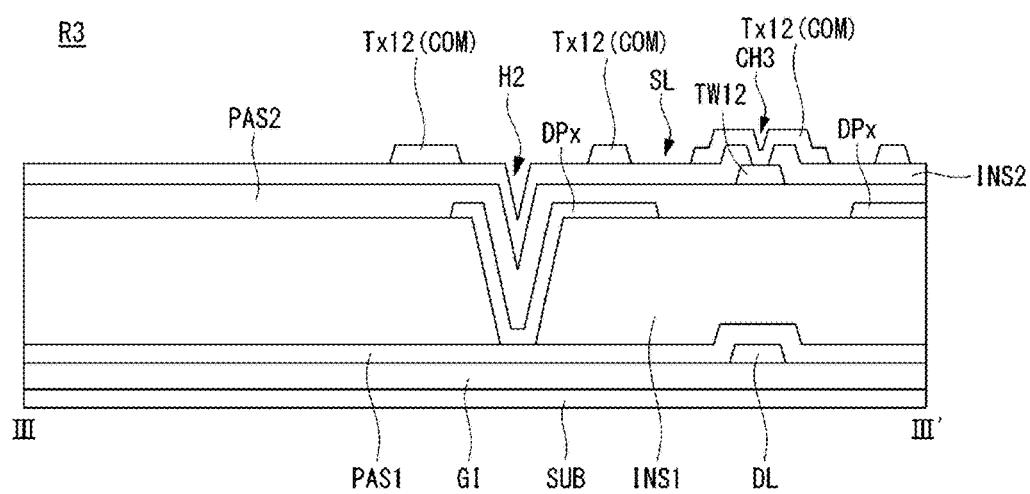
FIG. 9B is a cross-sectional view taken along line III-III' of FIG. 9A.

Next, a structure of the active area AA and a structure of the bezel area BA of the self capacitive touch sensor integrated type display device according to an example of the first embodiment of the invention will be described with reference to FIGS. 7A to 9B. FIG. 7A is a plane view showing a partial area R1 of the active area AA shown in FIG. 6, and FIG. 7B is a cross-sectional view taken along line I-I' of FIG. 7A. FIG. 8A is a plane view showing a partial area R2 of the bezel area BA on the left side or the right side of the active area AA shown in FIG. 6, and FIG. 8B is a cross-sectional view taken along line II-II' of FIG. 8A. FIG. 9A is a plane view showing a partial area R3 of the bezel area BA on the upper side or the lower side of the active area AA shown in FIG. 6, and FIG. 9B is a cross-sectional view taken along line III-III' of FIG. 9A.

As shown in FIGS. 7A and 7B, in the active area AA, gate lines GL and data lines DL which may be formed to cross over each other on the substrate SUB of the TFT array TFTA, thin film transistors formed at crossings of the gate lines GL and the data lines DL, pixel electrodes Px formed in areas defined by the crossing of the gate lines GL and the data lines DL, and common electrodes COM positioned opposite the pixel electrodes Px, may be disposed. Because the common electrode COM also serves as the touch electrode, the common electrode COM may hereinafter be referred to as the touch electrode or the touch electrode serving as the common electrode.

In the above configuration of the display device, the gate line GL may be formed on the substrate SUB, and a gate insulating layer GI may be formed on the gate line GL. An active layer A, a source electrode S, and a drain electrode D constituting the thin film transistor may be formed on the gate insulating layer GI.

For example, the thin film transistor may include a gate electrode G extending from the gate line GL formed on the substrate SUB, the active layer A formed on the gate insulating layer GI covering the gate line GL and the gate electrode G in an area corresponding to the gate electrode G, and the source electrode S and the drain electrode D which may be separated from each other on the gate insulating layer GI so as to expose a portion of the active layer A. The source electrode S extends from the data line DL.

Embodiments of the invention describe, as an example, a thin film transistor having a gate bottom structure, in which the gate electrode may be formed under the source and drain electrodes, but embodiments of the invention are not limited to this example. Embodiments of the invention should be understood as including a thin film transistor having a gate top structure, in which the gate electrode may be formed on the source and drain electrodes. Because a thin film transistor having the gate top structure is known, a detailed description thereof will be omitted.

A first passivation layer PAS1 covering the thin film transistor and the data line DL may be formed on the gate insulating layer GI, on which the thin film transistor and the data line DL may be formed, and a first insulating layer INS1, such as photoacryl, for planarization may be formed on the first passivation layer PAS1. A first contact hole CH1 exposing a portion of the drain electrode D may be formed in the first passivation layer PAS1.

The pixel electrodes Px may be formed on the first insulating layer INS1 and may be respectively arranged in pixel areas defined by the crossing of the data lines DL and the gate lines GL. The first insulating layer INS1 may include a second contact hole CH2 exposing the portion of the drain electrode D exposed through the first contact hole CH1 of the first passivation layer PAS1. The pixel electrode Px may be connected to the drain electrode D of the thin film transistor through the second contact hole CH2 passing through the first insulating layer INS1.

A second passivation layer PAS2 may be formed on the first insulating layer INS1, on which the pixel electrodes Px may be formed.

The routing wire TW31 may be formed on the second passivation layer PAS2 and may overlap the data line DL.

A second insulating layer INS2 having a contact hole CH3 may be formed on the second passivation layer PAS2, on which the routing wire TW31 may be formed, and thus a portion of the routing wire TW31 may be exposed through the contact hole CH3. The touch electrode Tx31 serving as the common electrode may be formed on the second insulating layer INS2 and may be connected to the routing wire TW31 through the contact hole CH3. The touch electrode Tx31 serving as the common electrode may be formed to overlap the plurality of pixel electrodes Px. The touch electrode Tx31 serving as the common electrode may have a plurality of slits SL, so that it may be easy to form a horizontal electric field between the touch electrode Tx31 and the pixel electrodes Px.

As shown in FIGS. 8A and 8B, the gate lines GL extending from the active area AA may be formed on the substrate SUB in the partial area R2 of the bezel area BA on the left side or the right side of the active area AA. The gate insulating layer GI, the first passivation layer PAS1, and the first insulating layer INS1 may be sequentially formed on the gate line GL. Similar to the active area AA, a hole H1 may be formed in the first insulating layer INS1 to pass through the first insulating layer INS1 and expose the first passivation layer PAS1.

Similar to the formation of the pixel electrode in the active area AA, a dummy pixel electrode DPx may be formed on the first insulating layer INS1.

The thin film transistor may not be formed in the left or right bezel area R2. Thus, the dummy pixel electrode DPx formed in the left or right bezel area BA may be floated, unlike the pixel electrode Px formed in the active area AA.

The example description of the first embodiment of the invention has described that the first insulating layer INS1 formed in the left or right bezel area BA may have the hole H1. However, the hole H1 may be omitted. In such an example, the dummy pixel electrode DPx may be formed on the first insulating layer INS1.

The second passivation layer PAS2 may be formed on the first insulating layer INS1, on which the dummy pixel electrodes DPx may be formed.

The routing wire TW21 may be formed on the second passivation layer PAS2 in a direction parallel to an arrangement direction of the data line DL. The second insulating layer INS2 having the contact hole CH3 may be formed on the second passivation layer PAS2, on which the routing wire TW21 may be formed, and thus a portion of the routing wire TW21 may be exposed through the contact hole CH3.

The touch electrode Tx21 serving as the common electrode extending from the active area AA may be formed on the second insulating layer INS2, on which the routing wire TW21 may be formed. The touch electrode Tx21 serving as the common electrode may be formed to overlap the plurality of dummy pixel electrodes DPx. The touch electrode Tx21 serving as the common electrode may have a plurality of slits SL, similar to the pixel electrode Px formed in the active area AA.

As shown in FIGS. 9A and 9B, the data lines DL extending from the active area AA may be formed on the gate insulating layer GI in the partial area R3 of the bezel area BA on the upper side or the lower side of the active area AA. The first passivation layer PAS1 and the first insulating layer INS1 may be sequentially formed on the gate insulating layer GI, on which the data lines DL may be formed. Similar to the active area AA, a hole H2 may be formed in the first insulating layer INS1 to pass through the first insulating layer INS1 and expose the first passivation layer PAS1.

Similar to the formation of the pixel electrode in the active area AA, a dummy pixel electrode DPx may be formed on the first insulating layer INS1.

The thin film transistor may not be formed in the upper or lower bezel area R3. Thus, the dummy pixel electrode DPx formed in the upper or lower bezel area BA may be floated, unlike the pixel electrode Px formed in the active area AA.

The example of the first embodiment of the invention has described that the first insulating layer INS1 formed in the upper or lower bezel area BA may have the hole H2. However, the hole H2 may be omitted. In such an example, the dummy pixel electrode DPx may be formed on the first insulating layer INS1.

The second passivation layer PAS2 may be formed on the first insulating layer INS1, on which the dummy pixel electrodes DPx may be formed.

The routing wire TW12 may be formed on the second passivation layer PAS2 in a direction parallel to an arrangement direction of the data line DL.

The second insulating layer INS2 having the contact hole CH3 may be formed on the second passivation layer PAS2, on which the routing wire TW12 may be formed, and thus a portion of the routing wire TW12 may be exposed through the contact hole CH3. The touch electrode Tx12 serving as the common electrode extending from the active area AA may be formed on the second insulating layer INS2 and may be connected to the routing wire TW12 through the contact hole CH3. The touch electrode Tx12 serving as the common electrode may be formed to overlap the plurality of dummy pixel electrodes DPx. The touch electrode Tx12 serving as the common electrode may have a plurality of slits SL, similar to the pixel electrode Px formed in the active area AA.

In the self capacitive touch sensor integrated type display device according to an example first embodiment of the invention, the 1-2 touch electrodes Tx22-Tx2($m$−1), Tx32-Tx3($m$−1), . . . , and Tx(n−1)2-Tx(n−1)(m−1) formed only in the active area AA and the 1-1 touch electrodes Tx11-Tx1$m$, Txn1-Txnm, Tx21-Tx(n−1)1, and Tx2$m$-Tx(n−1)m extending from the active area AA to the upper, lower, left, and right bezel areas BA may each have the same size. In the left and right bezel areas BA, the dummy pixel electrode DPx having the same structure as the pixel electrode Px formed in the active area AA and the gate line GL extending from the active area AA may be formed. A dummy data line (not shown) may be formed in the left and right bezel areas BA. In the upper and lower bezel areas BA, the dummy pixel electrode DPx having the same structure as the pixel electrode Px formed in the active area AA and the data line DL extending from the active area AA may be formed. A dummy gate line (not shown) may be formed in the upper and lower bezel areas BA.

In the self capacitive touch sensor integrated type display device according to the example first embodiment of the invention, the 1-2 touch electrodes Tx22-Tx2(*m*−1), Tx32-Tx3(*m*−1), . . . , and Tx(n−1)2-Tx(n−1)(m−1) formed only in the active area AA and the 1-1 touch electrodes Tx11-Tx1*m*, Txn1-Txnm, Tx21-Tx(n−1)1, and Tx2*m*-Tx(n−1)m extending from the active area AA to the upper, lower, left, and right bezel areas BA may each have the same size. Thus, even if the touch operation is performed at an edge or a corner of the active area AA, the capacitances may be compensated through the portions of the 1-1 touch electrodes extending to the bezel area BA. Hence, a touch performance may be improved.

In the self capacitive touch sensor integrated type display device according to the example first embodiment of the invention, the dummy pixel electrode DPx having a same structure as the pixel electrode Px formed in the active area AA and the gate line GL extending from the active area AA may be formed in the left and right bezel areas BA. Further, the dummy pixel electrode DPx having the same structure as the pixel electrode Px formed in the active area AA and the data line DL extending from the active area AA may be formed in the upper and lower bezel areas BA. Initial capacitances in the active area AA and the bezel area BA may be similarly maintained by equally forming the pixel electrodes and the signal lines in the active area AA and the bezel area BA as described above. Hence, the touch accuracy may be improved.

In the self capacitive touch sensor integrated type display device according to the example first embodiment of the invention, the dummy data line (not shown) may be formed in the bezel area BA on the left and right sides of the active area AA, and the dummy gate line (not shown) may be formed in the bezel area BA on the upper and lower sides of the active area AA.

Figure 10:
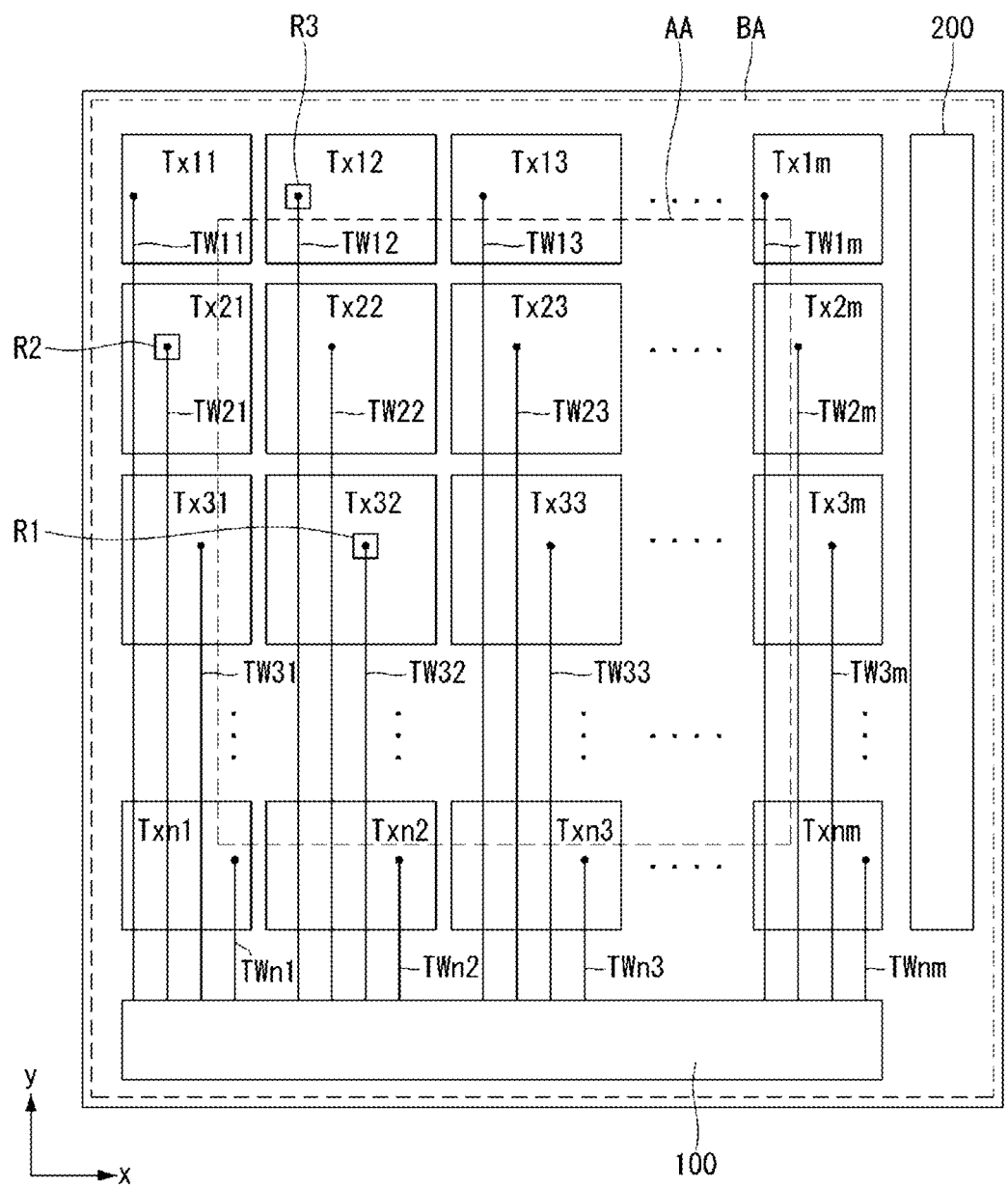
FIG. 10 is a plane view showing a self capacitive touch sensor integrated type display device according to a second embodiment of the invention.

A self capacitive touch sensor integrated type display device according to a second embodiment of the invention is described with reference to FIGS. 10 to 15B. FIG. 10 is a plane view showing the self capacitive touch sensor integrated type display device according to an example second embodiment of the invention.

As shown in FIG. 10, the self capacitive touch sensor integrated type display device according to the second embodiment of the invention may include an active area AA and a bezel area BA positioned outside the active area AA.

The example second embodiment of the invention shown in FIG. 10 may be different from the first embodiment, in that the size of each of outermost touch electrodes, e.g., 1-2 touch electrodes Tx11-Tx1*m*, Txn1-Txnm, Tx21-Tx(n−1)1, and Tx2*m*-Tx(n−1)m extending from the active area AA to the bezel area BA, may be less than the size of each of 1-1 touch electrodes Tx22-Tx2(*m*−1), Tx32-Tx3(*m*−1), . . . , and Tx(n−1)2-Tx(n−1)(m−1), of which the entire area may be positioned in the active area AA. Further, the second embodiment of the invention may be different from the first embodiment in configuration of the touch electrodes, gate lines, and data lines in the active area AA and the bezel area BA.

Thus, an example of the self capacitive touch sensor integrated type display device according to the second embodiment of the invention is described below, focusing on differences between the first and second embodiments of the invention.

As shown in FIG. 10, the touch electrodes formed in the active area AA and the bezel area BA may be configured such that the size of each of the 1-1 touch electrodes Tx22-Tx2(*m*−1), Tx32-Tx3(*m*−1), . . . , and Tx(n−1)2-Tx(n−1)(m−1) positioned only in the active area AA may be greater than the size of each of the 1-2 touch electrodes Tx11-Tx1*m*, Txn1-Txnm, Tx21-Tx(n−1)1, and Tx2*m*-Tx(n−1)m positioned in both the active area AA and the bezel area BA. This is in accordance with a recent trend toward a reduction in the size of the bezel area.

Because a disposition relationship and a connection relationship between the touch electrodes, routing wires, ICs, etc. formed in the active area AA and the bezel area BA in the example second embodiment shown in FIG. 10 may be substantially the same as that of the first embodiment, a further description may be briefly made or may be entirely omitted.

The structures of the active area AA and the bezel area BA in the self capacitive touch sensor integrated type display device according to the example second embodiment of the invention may be described with reference to FIGS. 11A to 15B.

Figure 11A:
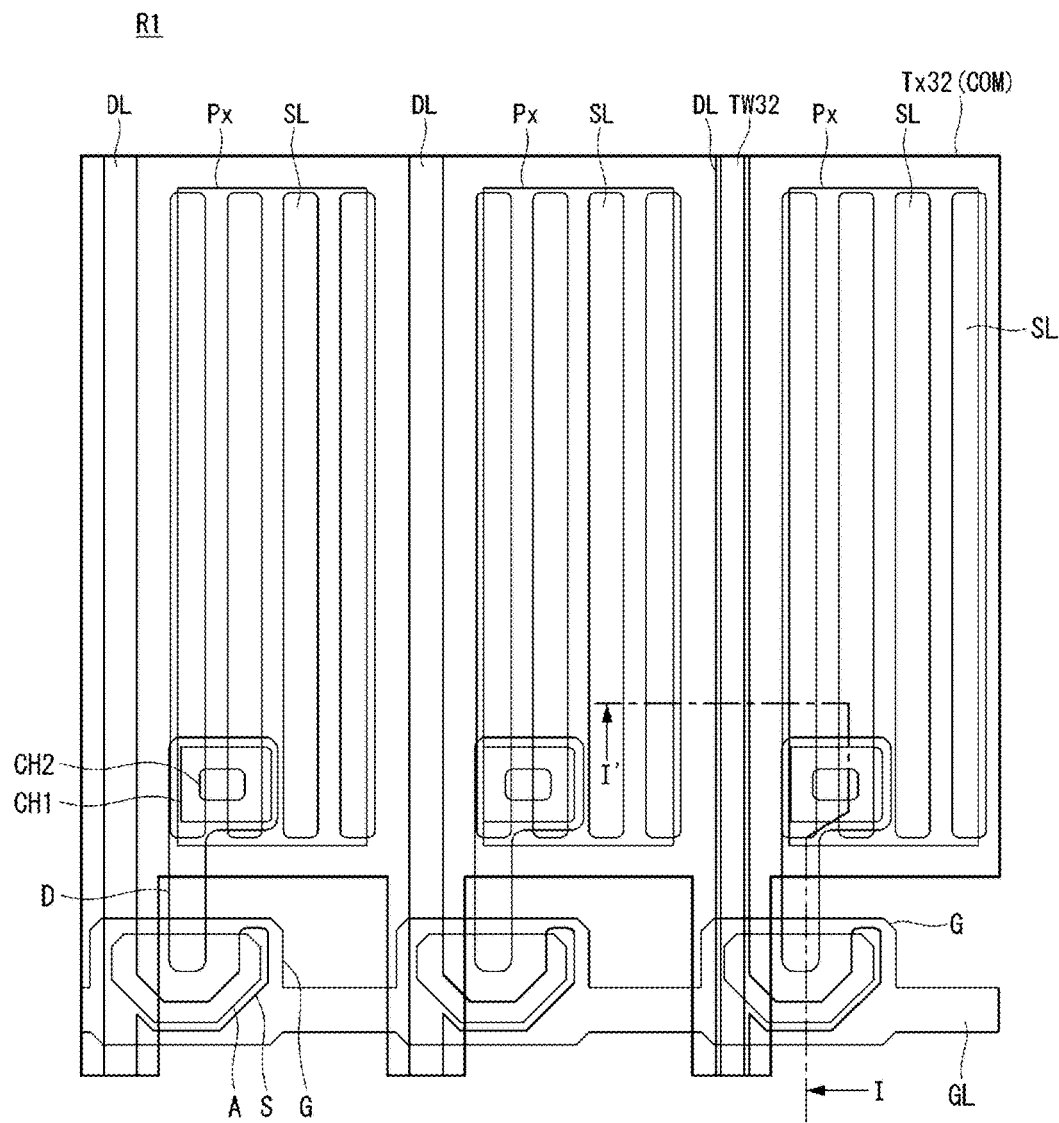
FIG. 11A is a plane view showing a partial area R1 of an active area shown in FIG. 10.
Figure 11B:
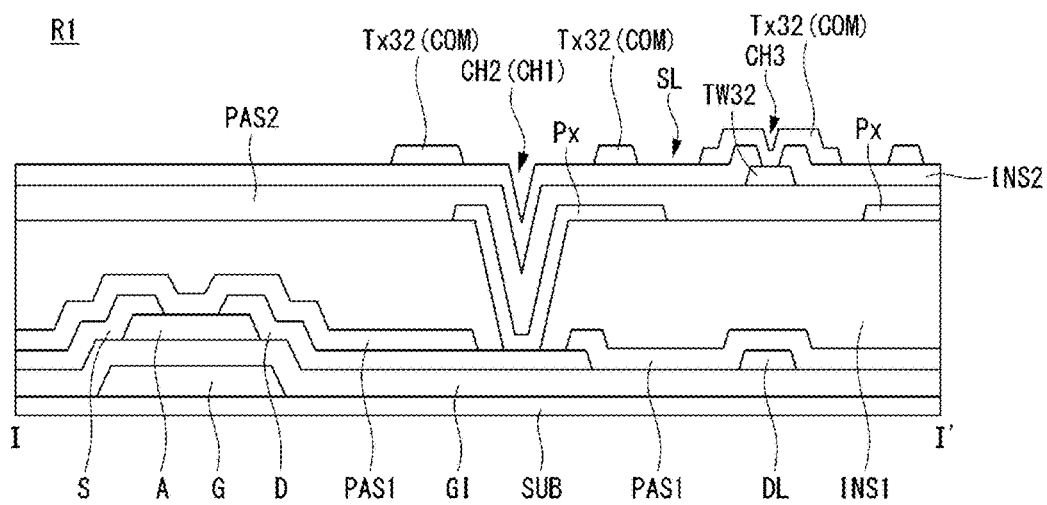
FIG. 11B is a cross-sectional view taken along line I-I' of FIG. 11A.
Figure 12A:
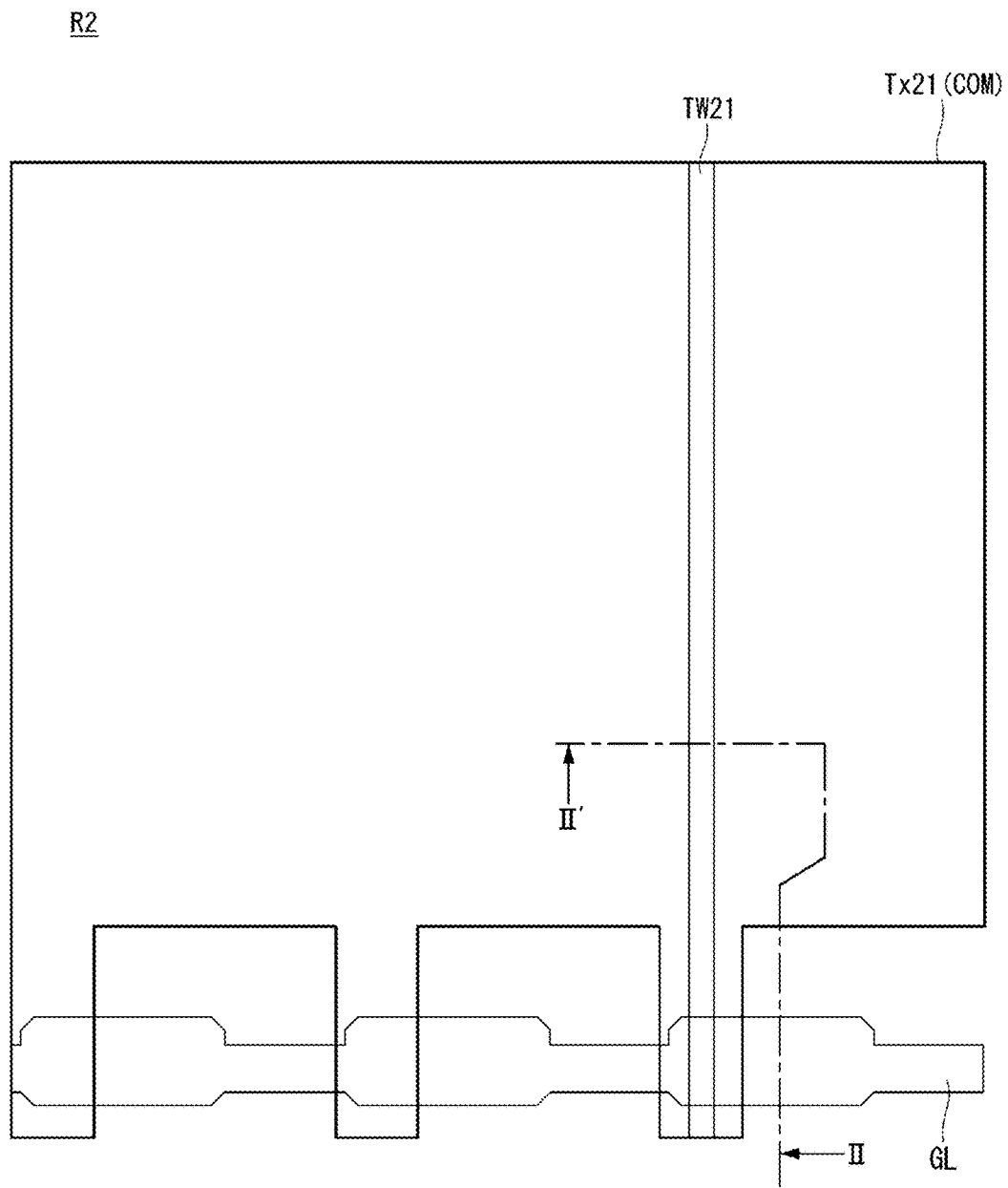
FIG. 12A is a plane view showing an example of a partial area R2 of a bezel area shown in FIG. 10.
Figure 12B:
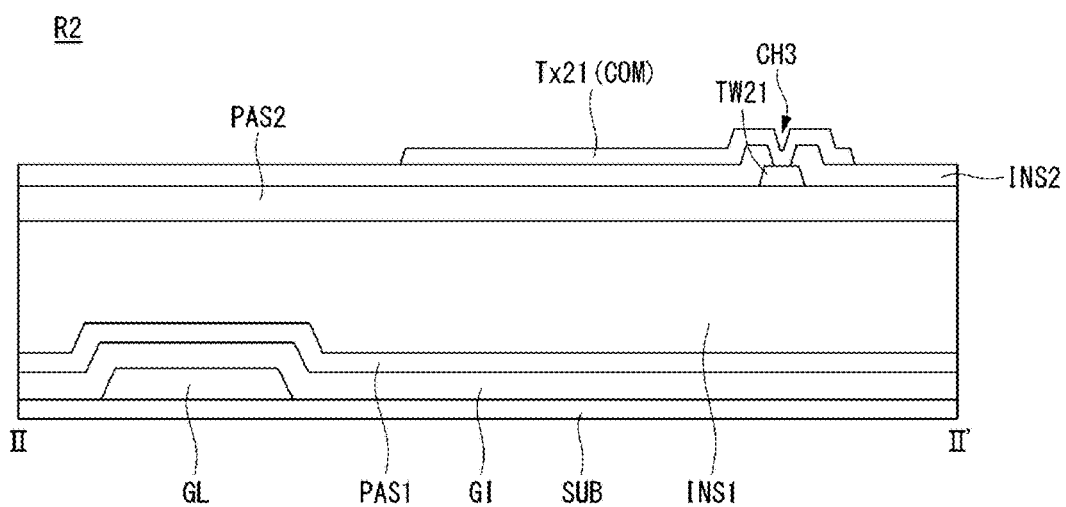
FIG. 12B is a cross-sectional view taken along line II-II' of FIG. 12A.
Figure 13A:
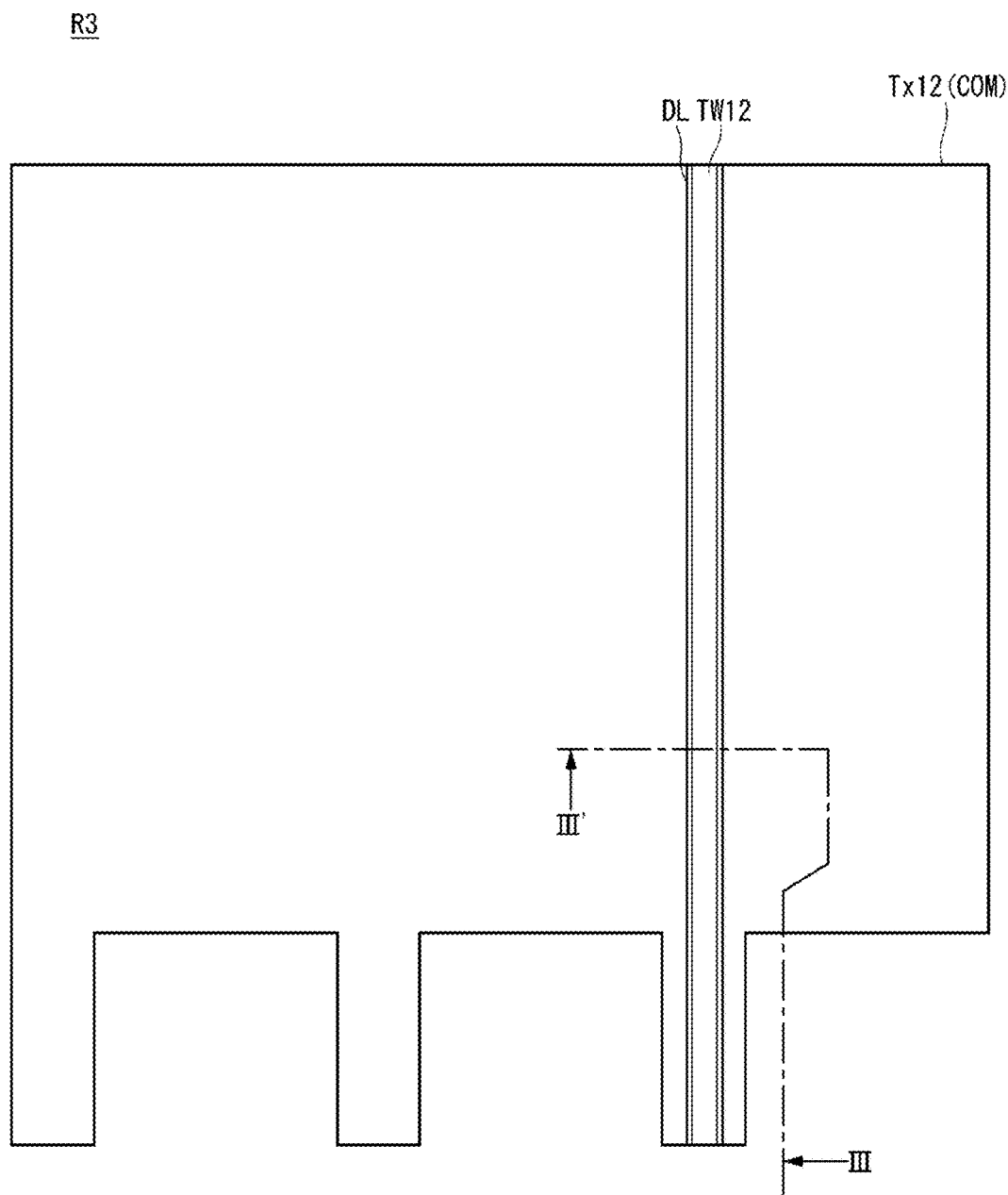
FIG. 13A is a plane view showing an example of a partial area R3 of a bezel area shown in FIG. 10.
Figure 13B:
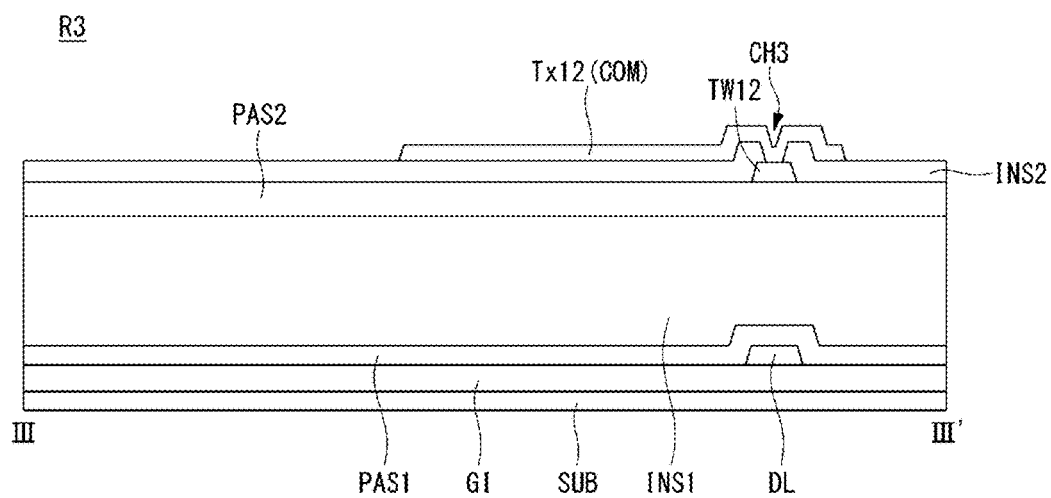
FIG. 13B is a cross-sectional view taken along line III-III' of FIG. 13A.

FIG. 11A is a plane view showing a partial area R1 of the active area AA shown in FIG. 10, and FIG. 11B is a cross-sectional view taken along line I-I' of FIG. 11A. FIG. 12A is a plane view showing an example of a partial area R2 of the bezel area BA on the left or right side of the active area AA shown in FIG. 10, and FIG. 12B is a cross-sectional view taken along line II-II' of FIG. 12A. FIG. 13A is a plane view showing an example of a partial area R3 of the bezel area BA on the upper or lower side of the active area AA shown in FIG. 10, and FIG. 13B is a cross-sectional view taken along line III-III' of FIG. 13A.

As shown in FIGS. 11A and 11B, in the active area AA, gate lines GL and data lines DL which may be formed to cross over each other on the substrate SUB of the TFT array TFTA, thin film transistors formed at crossings of the gate lines GL and the data lines DL, pixel electrodes Px formed in areas defined by the crossing of the gate lines GL and the data lines DL, and common electrodes COM (i.e., touch electrodes Tx serving as common electrode) positioned opposite the pixel electrodes Px, may be disposed. Because configuration of the active area AA according to the second embodiment of the invention may be substantially the same as configuration of the active area AA according to the first embodiment of the invention, a further description may be briefly made or may be entirely omitted.

As shown in FIGS. 12A and 12B, the gate lines GL extending from the active area AA may be formed on the substrate SUB in the partial area R2 of the bezel area BA on the left side or the right side of the active area AA. A gate insulating layer GI, a first passivation layer PAS1, a first insulating layer INS1, and a second passivation layer PAS2 may be sequentially formed on the gate line GL.

The thin film transistor and the pixel electrode may not be formed in the left or right bezel area R2, unlike in the active area AA.

A routing wire TW21 may be formed on the second passivation layer PAS2 in a direction parallel to an arrangement direction of the data line DL.

A second insulating layer INS2 having the contact hole CH3 may be formed on the second passivation layer PAS2, on which the routing wire TW21 may be formed, and thus a portion of the routing wire TW21 may be exposed through the contact hole CH3. The touch electrode Tx21 serving as the common electrode extending from the active area AA may be formed on the second insulating layer INS2 and may be connected to the routing wire TW21 through the contact hole CH3. The touch electrode Tx21 serving as the common electrode may not have a slit SL, unlike the touch electrodes formed in the active area AA. Alternatively, the touch electrode Tx21 serving as the common electrode may have slits SL less than the number of slits SL positioned in the active area AA.

As shown in FIGS. 13A and 13B, the data lines DL extending from the active area AA may be formed on the gate insulating layer GI in the partial area R3 of the bezel area BA on the upper side or the lower side of the active area AA. The first passivation layer PAS1, the first insulating layer INS1, and the second passivation layer PAS2 may be sequentially formed on the gate insulating layer GI, on which the data lines DL may be formed. The thin film transistor and the pixel electrode may not be formed in the upper or lower bezel area R3.

The routing wire TW12 may be formed on the second passivation layer PAS2 in a direction parallel to an arrangement direction of the data line DL.

The second insulating layer INS2 having the contact hole CH3 may be formed on the second passivation layer PAS2, on which the routing wire TW12 may be formed, and thus a portion of the routing wire TW12 may be exposed through the contact hole CH3. The touch electrode Tx12 serving as the common electrode extending from the active area AA may be formed on the second insulating layer INS2 and may be connected to the routing wire TW12 through the contact hole CH3. The touch electrode Tx12 serving as the common electrode may not have a slit SL, unlike the pixel electrode Px formed in the active area AA. Alternatively, the touch electrode Tx12 serving as the common electrode may have slits SL less than the number of slits SL positioned in the active area AA.

Figure 14A:
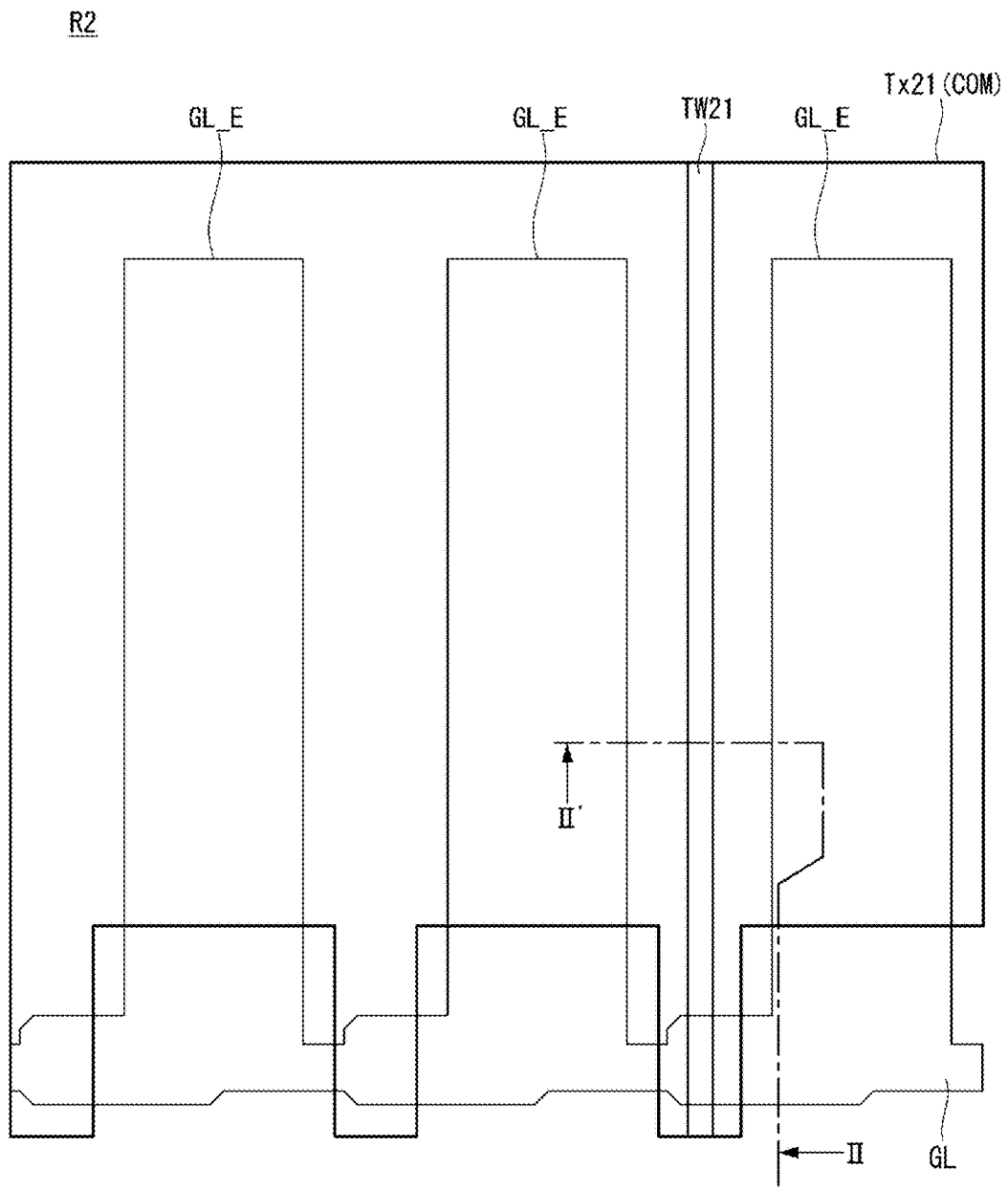
FIG. 14A is a plane view showing another example of a partial area R2 of a bezel area shown in FIG. 10.
Figure 14B:
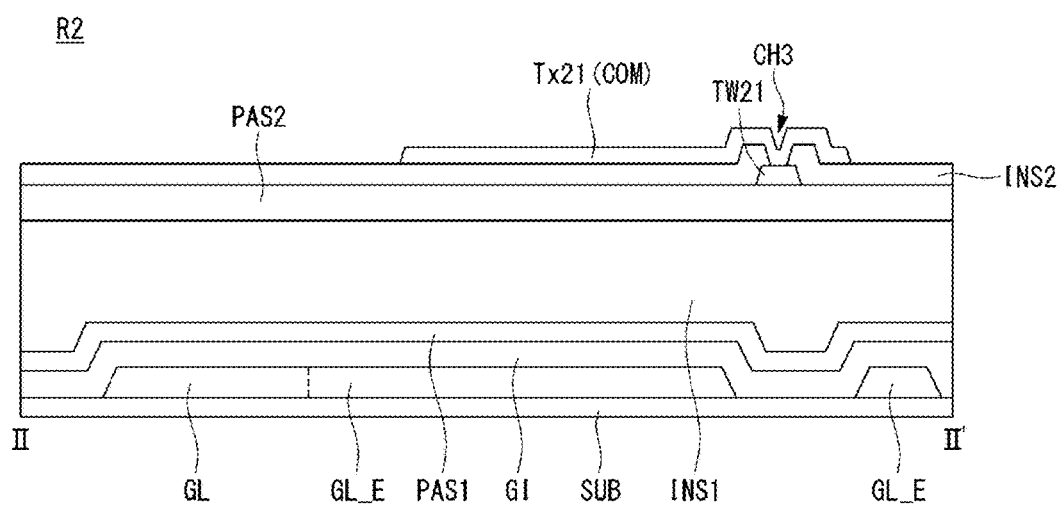
FIG. 14B is a cross-sectional view taken along line II-II' of FIG. 14A.
Figure 15A:
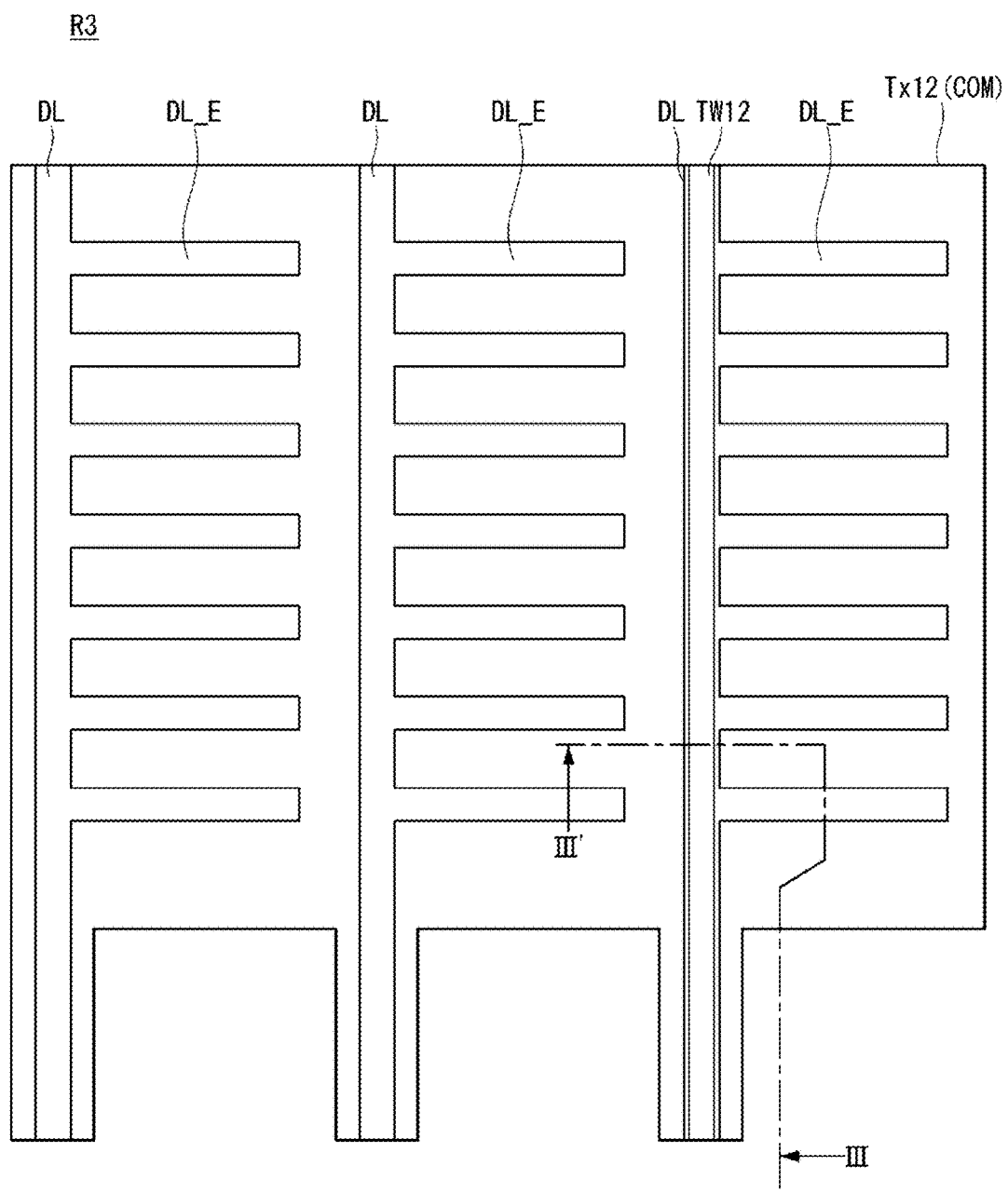
FIG. 15A is a plane view showing another example of a partial area R3 of a bezel area shown in FIG. 10.
Figure 15B:
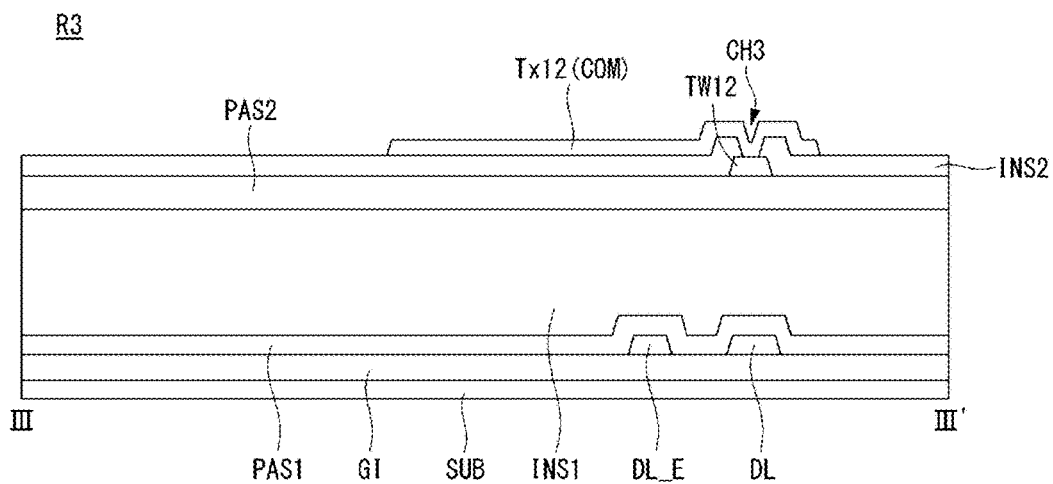
FIG. 15B is a cross-sectional view taken along line III-III' of FIG. 15A.

FIG. 14A is a plane view showing another example of the partial area R2 of the bezel area BA shown in FIG. 10, and FIG. 14B is a cross-sectional view taken along line II-II' of FIG. 14A. FIG. 15A is a plane view showing another example of the partial area R3 of the bezel area BA shown in FIG. 10, and FIG. 15B is a cross-sectional view taken along line of FIG. 15A.

As shown in FIGS. 14A and 14B, the gate lines GL extending from the active area AA may be formed on the substrate SUB in the partial area R2 of the bezel area BA on the left side or the right side of the active area AA. Each gate line GL may include a plurality of gate line extensions GL_E extending in a direction crossing an arrangement direction of the gate line GL. The gate insulating layer GI, the first passivation layer PAS1, the first insulating layer INS1, and the second passivation layer PAS2 may be sequentially formed on the substrate SUB, on which the gate lines GL and the gate line extensions GL_E may be formed.

The thin film transistor and the pixel electrode may not be formed in the left or right bezel area R2, unlike in the active area AA.

The routing wire TW21 may be formed on the second passivation layer PAS2 in a direction parallel to an arrangement direction of the data line DL.

The second insulating layer INS2 having the contact hole CH3 may be formed on the second passivation layer PAS2, on which the routing wire TW21 may be formed, and thus a portion of the routing wire TW21 may be exposed through the contact hole CH3. The touch electrode Tx21 serving as the common electrode extending from the active area AA may be formed on the second insulating layer INS2 and may be connected to the routing wire TW21 through the contact hole CH3.

The touch electrode Tx21 serving as the common electrode may not have a slit SL, unlike the touch electrodes formed in the active area AA. Alternatively, the touch electrode Tx21 serving as the common electrode may have slits SL less than the number of slits SL positioned in the active area AA.

As shown in FIGS. 15A and 15B, the data lines DL extending from the active area AA may be formed on the gate insulating layer GI in the partial area R3 of the bezel area BA on the upper side or the lower side of the active area AA. Each data line GL may include a plurality of data line extensions DL_E extending in a direction crossing an arrangement direction of the data line GL. The first passivation layer PAS1, the first insulating layer INS1, and the second passivation layer PAS2 may be sequentially formed on the gate insulating layer GI, on which the data lines DL and the data line extensions DL_E may be formed. The thin film transistor and the pixel electrode may not be formed in the upper or lower bezel area R3.

The routing wire TW12 may be formed on the second passivation layer PAS2 in a direction parallel to the arrangement direction of the data line DL.

The second insulating layer INS2 having the contact hole CH3 may be formed on the second passivation layer PAS2, on which the routing wire TW12 may be formed, and thus a portion of the routing wire TW12 may be exposed through the contact hole CH3. The touch electrode Tx12 serving as the common electrode extending from the active area AA may be formed on the second insulating layer INS2 and may be connected to the routing wire TW12 through the contact hole CH3. The touch electrode Tx12 serving as the common electrode may not have a slit SL, unlike the pixel electrode Px formed in the active area AA. Alternatively, the touch electrode Tx12 serving as the common electrode may have slits SL less than the number of slits SL positioned in the active area AA.

In the self capacitive touch sensor integrated type display device according to the example second embodiment of the invention, the size of each of the 1-1 touch electrodes Tx22-Tx2(m−1), Tx32-Tx3(m−1), . . . , and Tx(n−1)2-Tx(n−1)(m−1) formed only in the active area AA may be greater than the size of each of the 1-2 touch electrodes Tx11-Tx1m, Txn1-Txnm, Tx21-Tx(n−1)1, and Tx2m-Tx(n−1)m extending from the active area AA to the upper, lower, left, and right bezel areas BA. Further, the area of the touch electrode disposed in the active area AA may have the slits, but the area of the touch electrode disposed in the bezel area BA does not have slits or may have a number of slits less than the number of slits positioned in the active area AA. Thus, the size of the bezel area according to the second embodiment of the invention may be less than the first embodiment of the invention through the touch electrodes thus formed. Further, even if the touch operation is performed at the edge or the corner of the active area AA, capacitances may be compensated through portions of the 1-2 touch electrodes extending to the bezel area BA. Hence, a touch performance may be improved.

Furthermore, the gate lines GL extending from the active area AA and the gate line extensions GL_E extending from the gate lines GL may be formed in the bezel area BA on the left or right side of the active area AA, and the data lines DL extending from the active area AA and the data line extensions DL_E extending from the data lines DL may be formed in the bezel area BA on the upper or lower side of the active area AA. Initial capacitances in the active area AA and the bezel area BA may be similarly maintained by forming the extensions to the signal lines formed in the bezel area BA, and thus the touch accuracy may be improved.

In the self capacitive touch sensor integrated type display device according to the example second embodiment of the invention, a dummy data line (not shown) may be formed in the bezel area BA on the left and right sides of the active area AA, and a dummy gate line (not shown) may be formed in the bezel area BA on the upper and lower sides of the active area AA.

Figure 16:
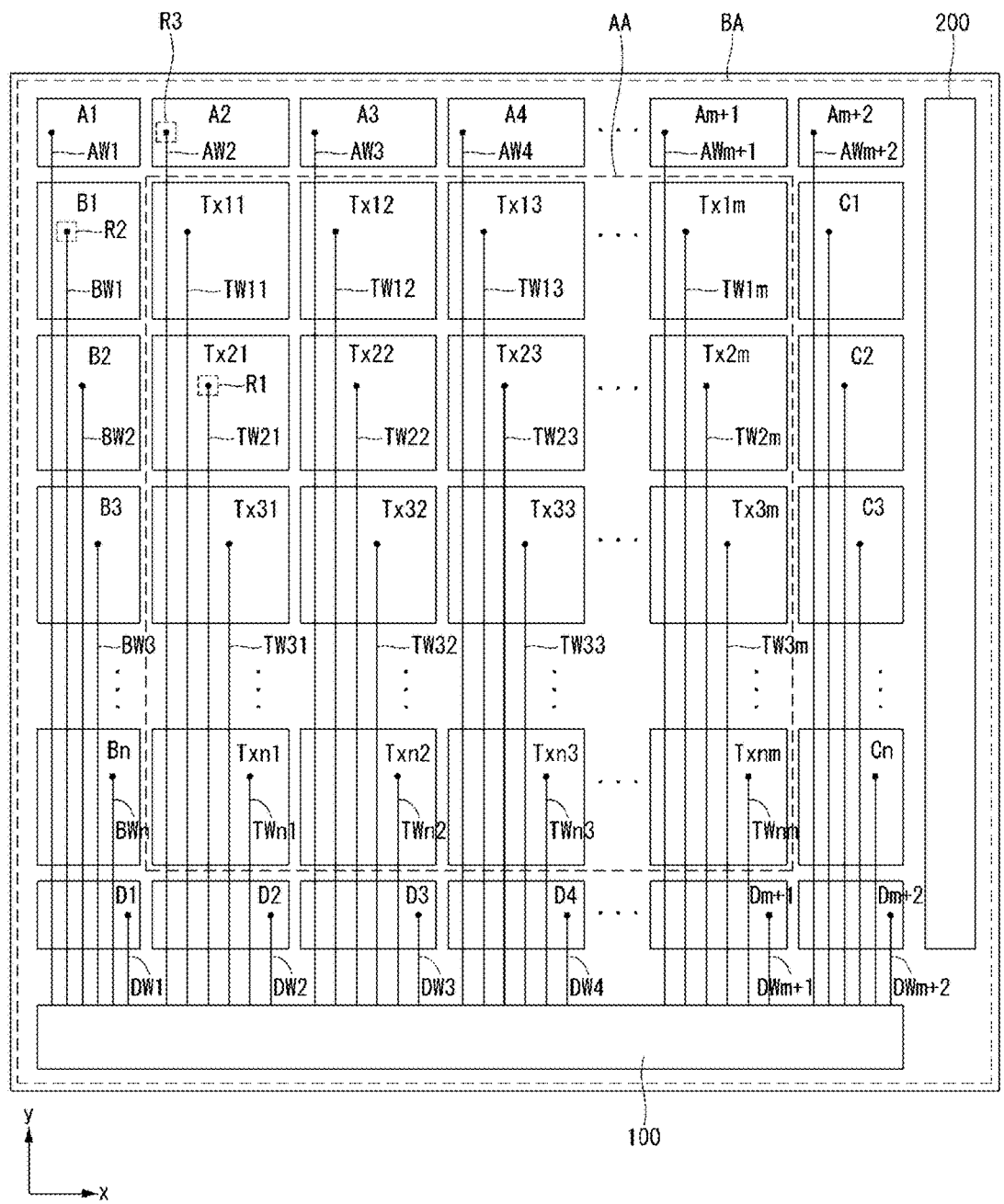
FIG. 16 is a plane view showing a self capacitive touch sensor integrated type display device according to a third embodiment of the invention.

A self capacitive touch sensor integrated type display device according to an example third embodiment of the invention is described with reference to FIG. 16. FIG. 16 is a plane view showing the self capacitive touch sensor integrated type display device according to the third embodiment.

As shown in FIG. 16, the self capacitive touch sensor integrated type display device according to the third embodiment may include an active area AA and a bezel area BA positioned outside the active area AA.

The active area AA may be an area in which main touch electrodes serving as common electrodes may be formed and data may be displayed. The bezel area BA may be an area in which auxiliary touch electrodes, a source driving and touch sensing IC 110, a gate driver IC 210, and various wires may be formed and where data may not be displayed.

For example, the active area AA may include a plurality of main touch electrodes Tx11-Tx1$m$, Tx21-Tx2$m$, Tx31-Tx3$m$, . . . , and Txn1-Txnm divided in a first direction (for example, x-axis direction) and a second direction (for example, y-axis direction) crossing the first direction and a plurality of main routing wires TW11-TW1$m$, TW21-TW2$m$, TW31-TW3$m$, . . . , and TWn1-TWnm which may be respectively connected to the plurality of main touch electrodes Tx11-Tx1$m$, Tx21-Tx2$m$, Tx31-Tx3$m$, . . . , and Txn1-Txnm and may be arranged in the second direction in parallel with one another, where m and n are natural numbers.

The plurality of main touch electrodes Tx11-Tx1$m$, Tx21-Tx2$m$, Tx31-Tx3$m$, . . . , and Txn1-Txnm in the active area AA may be formed by dividing the common electrode of the display device, and thus may operate as the common electrode(s) in a display drive for displaying data, and may operate as the touch electrodes in a touch drive for recognizing a touch position.

The bezel area BA positioned outside the active area AA may include a plurality of auxiliary touch electrodes A1-Am+2, B1-Bn, C1-Cn, and D1-Dm+2 which may be formed to surround the active area AA.

In the plurality of auxiliary touch electrodes A1-Am+2, B1-Bn, C1-Cn, and D1-Dm+2, the first auxiliary touch electrodes A1 to Am+2 may be disposed outside the upper side of the active area AA; the second auxiliary touch electrodes B1 to Bn may be disposed outside the left side of the active area AA; the third auxiliary touch electrodes C1 to Cn may be disposed outside the right side of the active area AA; and the fourth auxiliary touch electrodes D1 to Dm+2 may be disposed outside the lower side of the active area AA.

The size of each of the plurality of auxiliary touch electrodes A1-Am+2, B1-Bn, C1-Cn, and D1-Dm+2 in the bezel area BA may be about ¹⁄₁₀ to ½ of the size of each of the plurality of main touch electrodes Tx11-Tx1$m$, Tx21-Tx2$m$, Tx31-Tx3$m$, . . . , and Txn1-Txnm in the active area AA. When the size of the auxiliary touch electrode is greater than ½ of the size of the main touch electrode, the size of the bezel area BA may excessively increase. When the size of the auxiliary touch electrode is less than ¹⁄₁₀ of the size of the main touch electrode, the touch sensitivity may not be sufficiently obtained.

The first auxiliary touch electrodes A1 to Am+2 may be respectively connected to first auxiliary routing wires AW1 to AWm+2 arranged in the second direction in parallel with one another, and the second auxiliary touch electrodes B1 to Bn may be respectively connected to second auxiliary routing wires BW1 to BWn arranged in the second direction in parallel with one another. The third auxiliary touch electrodes C1 to Cn may be respectively connected to third auxiliary routing wires CW1 to CWn arranged in the second direction in parallel with one another, and the fourth auxiliary touch electrodes D1 to Dm+2 may be respectively connected to fourth auxiliary routing wires DW1 to DWm+2 arranged in the second direction in parallel with one another.

The first auxiliary routing wires AW2 to AWm+1 passing through the active area AA among the first auxiliary routing wires AW1 to AWm+2 may be arranged in the second direction in parallel with one another, so that they do not contact the plurality of main routing wires TW11-TW1$m$, TW21-TW2$m$, TW31-TW3$m$, . . . , and TWn1-TWnm in the active area AA and the fourth auxiliary routing wires DW2 to DWm+1 in the bezel area BA. The plurality of main routing wires TW11-TW1$m$, TW21-TW2$m$, TW31-TW3$m$, . . . , and TWn1-TWnm in the active area AA may also be arranged in the second direction in parallel with one another, so that they do not contact the fourth auxiliary routing wires DW2 to DWm+1 in the bezel area BA.

Thus, the plurality of main routing wires TW11-TW1$m$, TW21-TW2$m$, TW31-TW3$m$, . . . , and TWn1-TWnm and the first to fourth auxiliary routing wires AW1-AWm+2, BW1-BWn, CW1-CWn, and DW1-DWm+2 may be arranged in the second direction in parallel with one another, so that the main and auxiliary routing wires do not contact each other.

The various wires in the bezel area BA may include the plurality of main routing wires TW11-TW1$m$, TW21-TW2$m$, TW31-TW3$m$, . . . , and TWn1-TWnm which may be respectively connected to the plurality of main touch electrodes Tx11-Tx1$m$, Tx21-Tx2$m$, Tx31-Tx3$m$, . . . , and Txn1-Txnm and may be arranged in the second direction in parallel with one another, the plurality of auxiliary routing wires AW1-AWm+2, BW1-BWn, CW1-CWn, and DW1-DWm+2 which may be respectively connected to the plurality of auxiliary touch electrodes A1-Am+2, B1-Bn, C1-Cn, and D1-Dm+2 and may be arranged in the second direction in parallel with one another, the data lines D1 and D2 (refer to FIG. 5) connected to the source driving and touch sensing IC 110, and the gate lines G1 and G2 (refer to FIG. 5) connected to the gate driver IC 210.

In the self capacitive touch sensor integrated type display device according to the example third embodiment, structures of areas R1, R2, and R3 shown in FIG. 16 may be substantially the same as those in the second embodiment except, for example, reference numerals. For example, the structure of the partial area R1 of the active area AA in the third embodiment may be substantially the same as the structure shown in FIGS. 11A and 11B; the structure of the partial area R2 of the left or right bezel area BA in the third embodiment may be substantially the same as the structure shown in FIGS. 12A and 12B and FIGS. 14A and 14B; and the structure of the partial area R3 of the upper or lower bezel area BA in the third embodiment may be substantially the same as the structure shown in FIGS. 13A and 13B and FIGS. 15A and 15B. Therefore, a further description thereof may be omitted.

Figure 17:
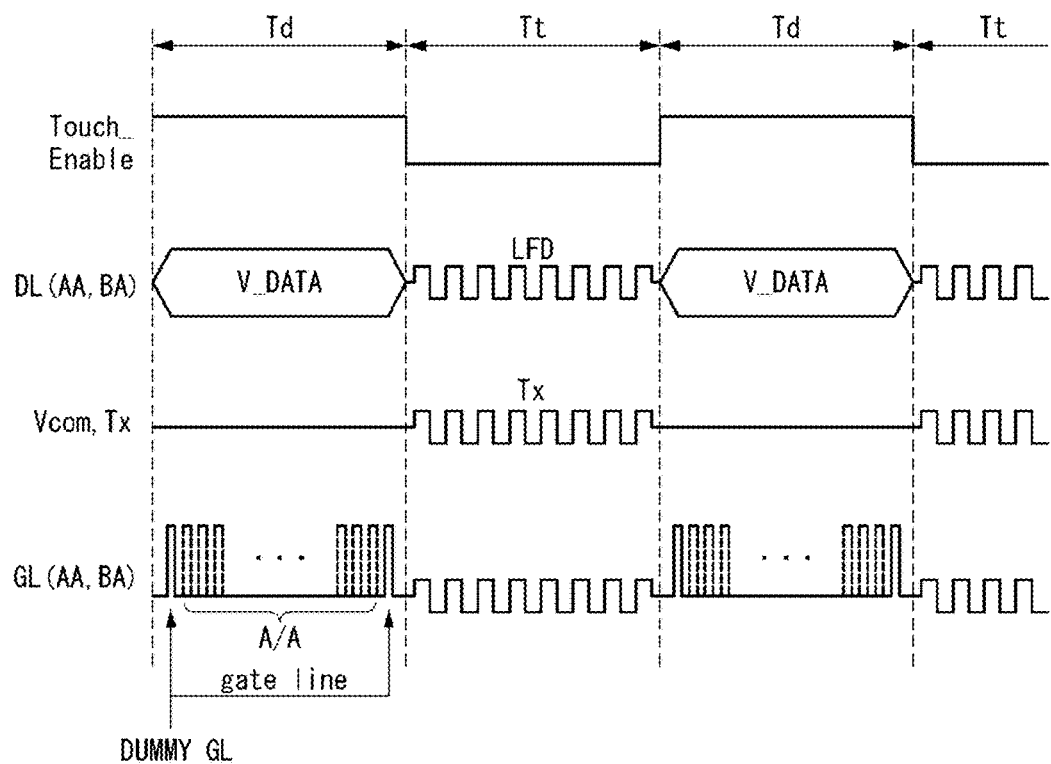
FIG. 17 is a waveform diagram of signals applied to a drive of the self capacitive touch sensor integrated type display device according to the first to third embodiments of the invention.

A drive of the self capacitive touch sensor integrated type display device according to the example first to third embodiments of the invention is described with reference to FIG. 17. FIG. 17 is a waveform diagram of signals applied to a drive of the self capacitive touch sensor integrated type display device according to the first to third embodiments.

As shown in FIG. 17, the self capacitive touch sensor integrated type display device according to the first to third embodiments of the invention may be time-division driven in a display driving period Td and a touch sensor driving period Tt.

In the display driving period Td, the data lines DL may be driven to apply data V_DATA to pixels of the active area AA and the bezel area BA, and a common voltage Vcom may be supplied to the touch electrodes serving as the common electrode through the routing wires. The data V_DATA applied to the pixels of the bezel area BA may have a predetermined value, and the predetermined value may be generally approximate to the common voltage Vcom.

In the touch sensor driving period Tt, a touch driving signal Tx with voltage Vtsp may be supplied to the touch electrodes serving as the common electrode. Further, an alternating current (AC) signal LFD having the same phase as the touch driving signal applied to the touch electrodes may be supplied to the signal lines (for example, the gate lines GL and the data lines DL) through the routing wires, so as to minimize a parasitic capacitance between the signal lines (for example, the gate lines GL and the data lines DL) connected to the pixels of the active area AA and the bezel area BA and the touch electrodes. The touch electrodes of the bezel area BA may be driven irrespective of the active area AA and may be grouped and driven in a horizontal or vertical direction.

Hence, the initial capacitances in the active area AA and the bezel area BA may be similarly maintained, and thus the touch accuracy may be improved.

Figure 18:
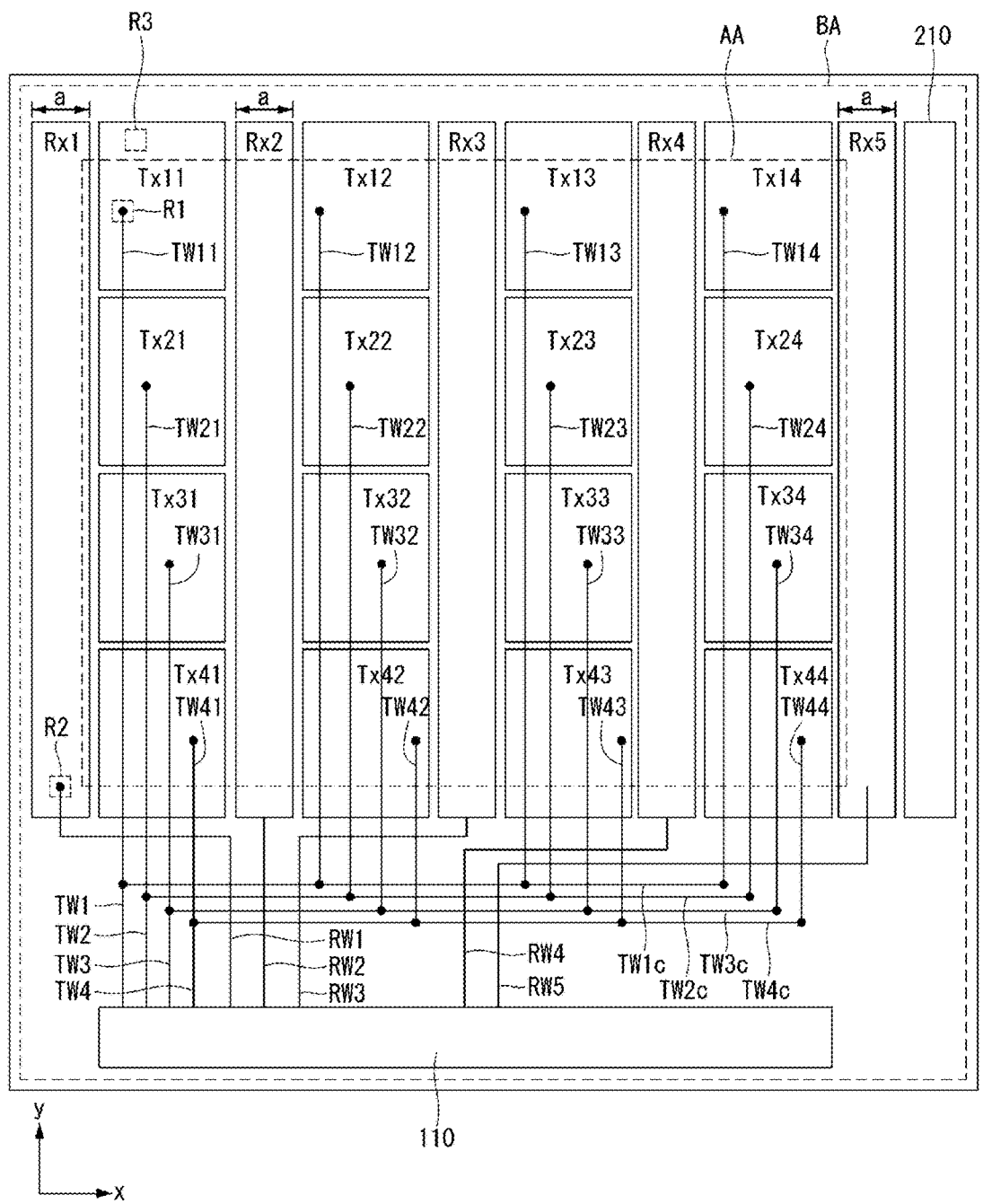
FIG. 18 is a plane view showing a mutual capacitive touch sensor integrated type display device according to a fourth embodiment of the invention.

A mutual capacitive touch sensor integrated type display device according to an example fourth embodiment of the invention is described with reference to FIGS. 18 to 21B. FIG. 18 is a plane view showing the mutual capacitive touch sensor integrated type display device according to an example of the fourth embodiment of the invention.

As shown in FIG. 18, the mutual capacitive touch sensor integrated type display device according to the fourth embodiment may include an active area AA and a bezel area BA positioned outside the active area AA.

The active area AA may include a plurality of first touch electrodes Tx11-Tx14, Tx21-Tx24, Tx31-Tx34, and Tx41-Tx44 divided in a first direction (for example, x-axis direction) and a second direction (for example, y-axis direction) crossing the first direction, a plurality of first sub-routing wires TW11-TW14, TW21-TW24, TW31-TW34, and TW41-TW44 which may be respectively connected to the plurality of first touch electrodes Tx11-Tx14, Tx21-Tx24, Tx31-Tx34, and Tx41-Tx44 and extend in the second direction, and a plurality of second touch electrodes Rx1 to Rx5 which may be disposed between the first touch electrodes adjacent to each other in the first direction and may be arranged in the second direction.

The plurality of first touch electrodes Tx11-Tx14, Tx21-Tx24, Tx31-Tx34, and Tx41-Tx44 may be connected to one another using the first sub-routing wires TW11-TW14, TW21-TW24, TW31-TW34, and TW41-TW44 respectively connected to the first touch electrodes, first connection wires TW1c to TW4c, and first main routing wires TW1 to TW4 and may be, for example, arranged in four rows based on the row.

More specifically, the 1-1 touch electrodes Tx11 to Tx14 of a first row arranged in the first direction may be connected to one another using the 1-1 sub-routing wires TW11 to TW14 respectively connected to the 1-1 touch electrodes Tx11 to Tx14, the 1-1 connection wire TW1c connecting the 1-1 sub-routing wires TW11 to TW14, and the 1-1 main routing wire TW1 connected to the 1-1 connection wire TW1c, and may form a 1-1 touch electrode line of the first row.

The 1-2 touch electrodes Tx21 to Tx24 of a second row arranged in the first direction may be connected to one another using the 1-2 sub-routing wires TW21 to TW24 respectively connected to the 1-2 touch electrodes Tx21 to Tx24, the 1-2 connection wire TW2c connecting the 1-2 sub-routing wires TW21 to TW24, and the 1-2 main routing wire TW2 connected to the 1-2 connection wire TW2c, and may form a 1-2 touch electrode line of the second row.

The 1-3 touch electrodes Tx31 to Tx34 of a third row arranged in the first direction may be connected to one another using the 1-3 sub-routing wires TW31 to TW34 respectively connected to the 1-3 touch electrodes Tx31 to Tx34, the 1-3 connection wire TW3c connecting the 1-3 sub-routing wires TW31 to TW34, and the 1-3 main routing wire TW3 connected to the 1-3 connection wire TW3c, and may form a 1-3 touch electrode line of the third row.

The 1-4 touch electrodes Tx41 to Tx44 of a fourth row arranged in the first direction may be connected to one another using the 1-4 sub-routing wires TW41 to TW44 respectively connected to the 1-4 touch electrodes Tx41 to Tx44, the 1-4 connection wire TW4c connecting the 1-4 sub-routing wires TW41 to TW44, and the 1-4 main routing wire TW4 connected to the 1-4 connection wire TW4c, and may form a 1-4 touch electrode line of the fourth row.

The plurality of first touch electrodes Tx11-Tx14, Tx21-Tx24, Tx31-Tx34, and Tx41-Tx44 may each have the same size. In the plurality of first touch electrodes Tx11-Tx14, Tx21-Tx24, Tx31-Tx34, and Tx41-Tx44, the first touch electrodes Tx11 to Tx14 positioned on the uppermost side extend from the active area AA to the upper bezel area BA, and the first touch electrodes Tx41 to Tx44 positioned on the lowermost side extend from the active area AA to the lower bezel area BA. Thus, the 1-1 and 1-4 touch electrodes Tx11-Tx14 and Tx41-Tx44 positioned at the upper and lower edges of the active area AA may have the same size as the 1-2 and 1-3 touch electrodes Tx21-Tx24 and Tx31-Tx34 positioned only in the active area AA. However, the size of the active area AA occupied by the 1-1 and 1-4 touch electrodes Tx11-Tx14 and Tx41-Tx44 may be less than the size of the active area AA occupied by the 1-2 and 1-3 touch electrodes Tx21-Tx24 and Tx31-Tx34.

In the plurality of second touch electrodes Rx1 to Rx5, the 2-1 touch electrode Rx1 may be disposed on the left side of the first touch electrodes Tx11 to Tx41 of a first column. Further, a portion of the 2-1 touch electrode Rx1 may be positioned in the active area AA, and a remainder may be positioned in the bezel area BA. Hence, the 2-1 touch electrode Rx1 of a first column may be formed. The 2-1 touch electrode Rx1 may extend to the active area AA and the left, upper, and lower bezel areas.

The 2-2 touch electrode Rx2 may be disposed between the first touch electrodes Tx11-Tx41 and Tx12-Tx42 of the first column and a second column, which may be adjacent to each other in the first direction, to form the 2-2 touch electrode Rx2 of a second column. The 2-2 touch electrode Rx2 may extend from the active area AA to the upper and lower bezel areas.

The 2-3 touch electrode Rx3 may be disposed between the first touch electrodes Tx12-Tx42 and Tx13-Tx43 of the second column and a third column, which may be adjacent to each other in the first direction, to form the 2-3 touch electrode Rx3 of a third column. The 2-3 touch electrode Rx3 may extend from the active area AA to the upper and lower bezel areas.

The 2-4 touch electrode Rx4 may be disposed between the first touch electrodes Tx13-Tx43 and Tx14-Tx44 of the third column and a fourth column, which may be adjacent to each other in the first direction, to form the 2-4 touch electrode Rx4 of a fourth column. The 2-4 touch electrode Rx4 may extend from the active area AA to the upper and lower bezel areas.

The 2-5 touch electrode Rx5 may be disposed on the right side of the first touch electrodes Tx14 to Tx44 of a last column. Further, a portion of the 2-5 touch electrode Rx5 may be positioned in the active area AA, and a remainder may be positioned in the bezel area BA. Hence, the 2-5 touch electrode Rx5 of a fifth column may be formed. The 2-5 touch electrode Rx5 may extend to the active area AA and the right, upper, and lower bezel areas.

The bezel area BA positioned outside the active area AA may include the first touch electrodes Tx11-Tx14 and Tx41-Tx44 and the second touch electrodes Rx1 to Rx5 extending from the active area AA, various wires, a source driving and touch sensing IC 110, and a gate driver IC 210.

As shown by example in FIG. 18, the various wires may include the first routing wires TW11-TW14, TW21-TW24, TW31-TW34, TW41-TW44, TW1c-TW4c, and TW1-TW4 connecting based on the row the first touch electrodes Tx11-Tx14, Tx21-Tx24, Tx31-Tx34, and Tx41-Tx44, second routing wires RW1 to RW5 respectively connected to the second touch electrodes Rx1 to Rx5, the data lines D1 and D2 (refer to FIG. 5) connected to the source driving and touch sensing IC 110, and the gate lines G1 and G2 (refer to FIG. 5) connected to the gate driver IC 210.

Figure 19A:
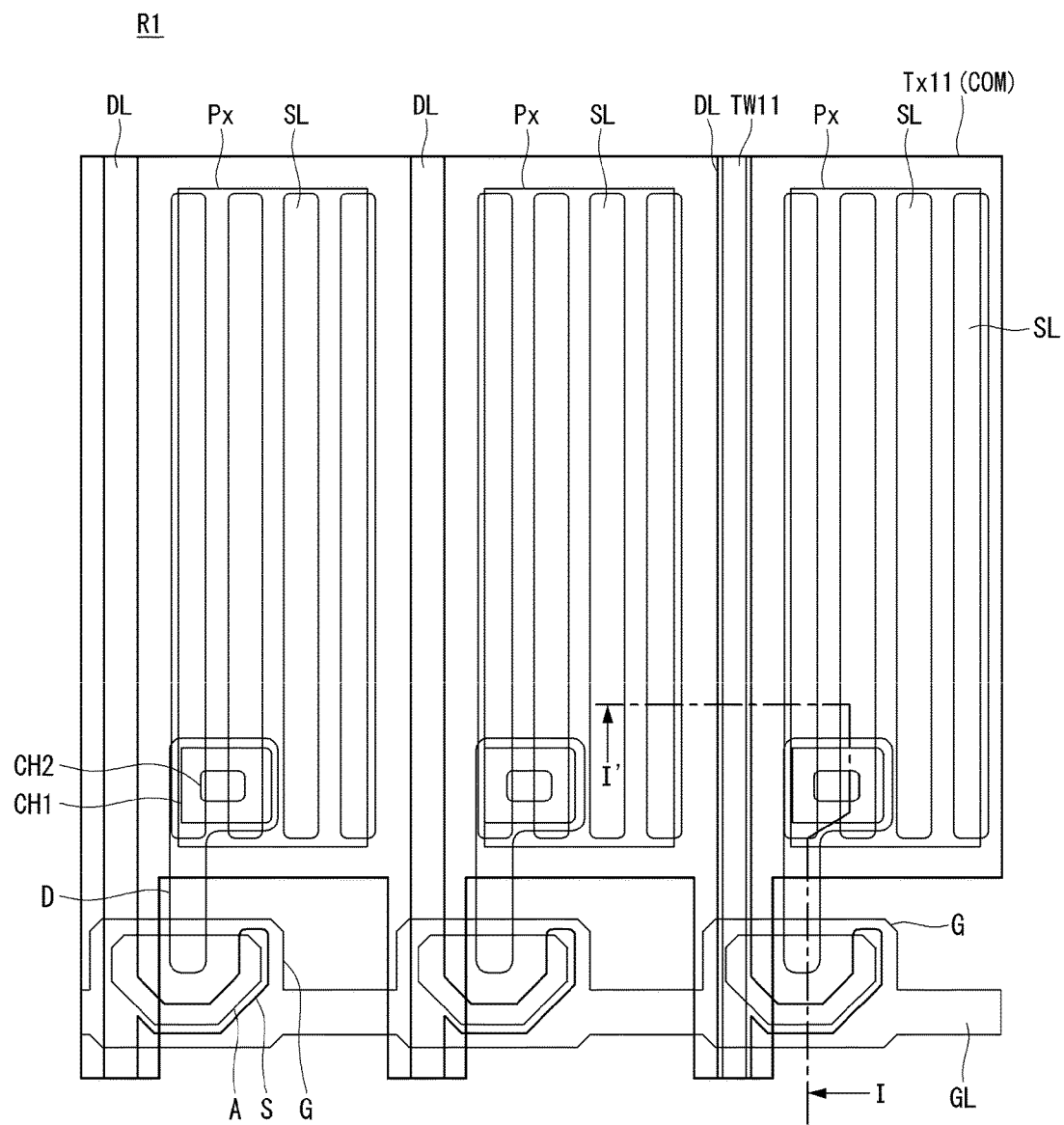
FIG. 19A is a plane view showing a partial area R1 of an active area shown in FIG. 18.
Figure 19B:
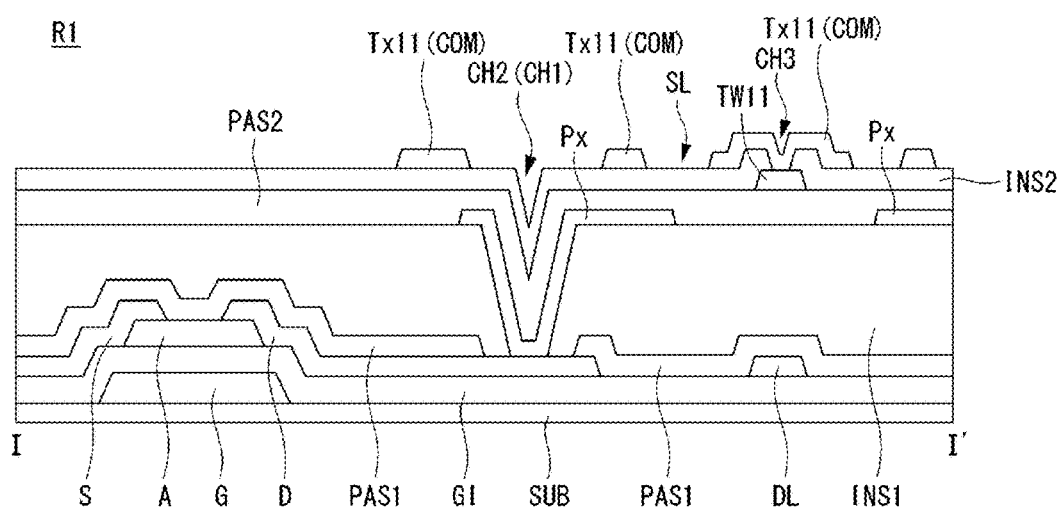
FIG. 19B is a cross-sectional view taken along line I-I' of FIG. 19A.
Figure 20A:
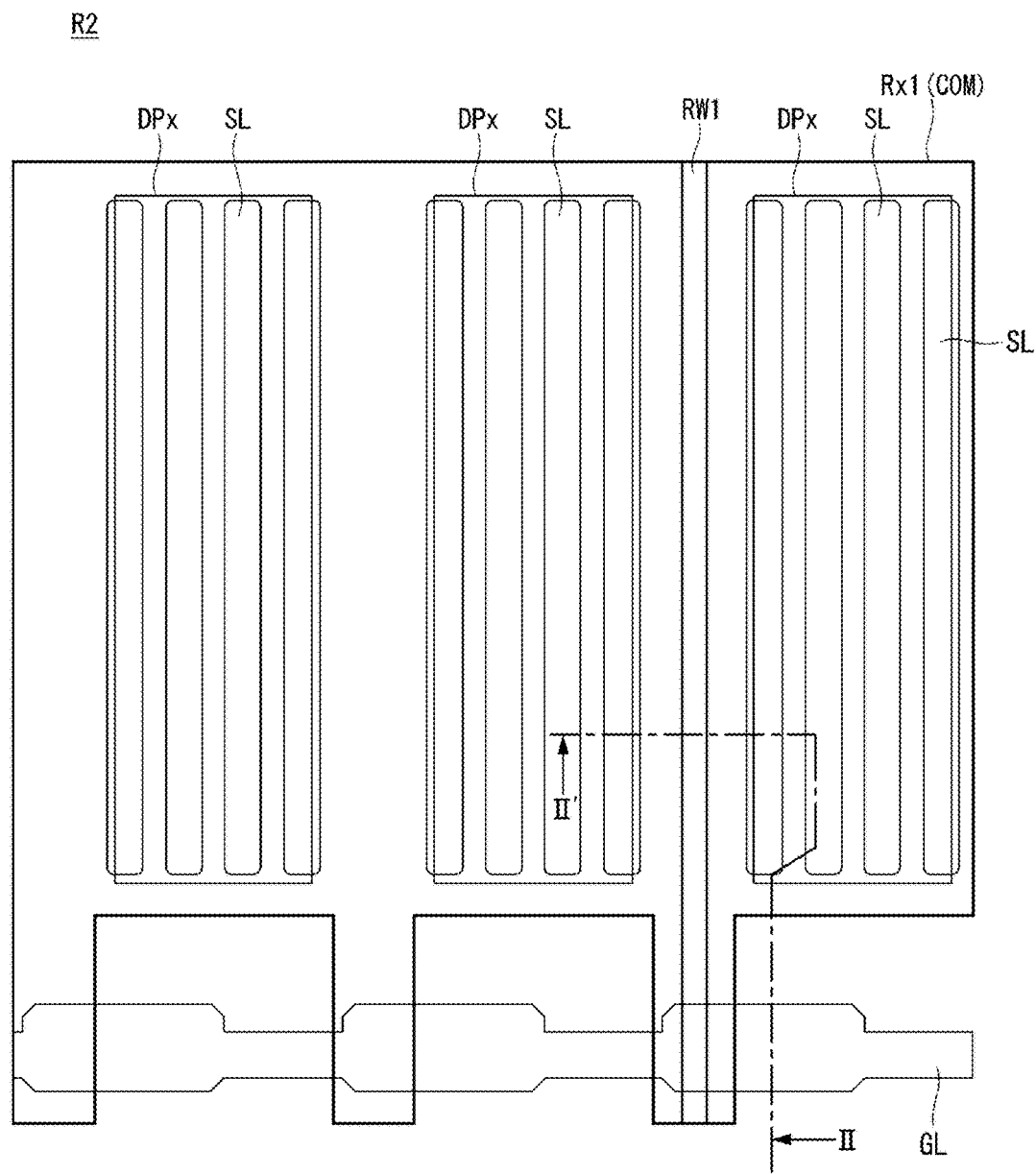
FIG. 20A is a plane view showing a partial area R2 of a bezel area shown in FIG. 18.
Figure 20B:
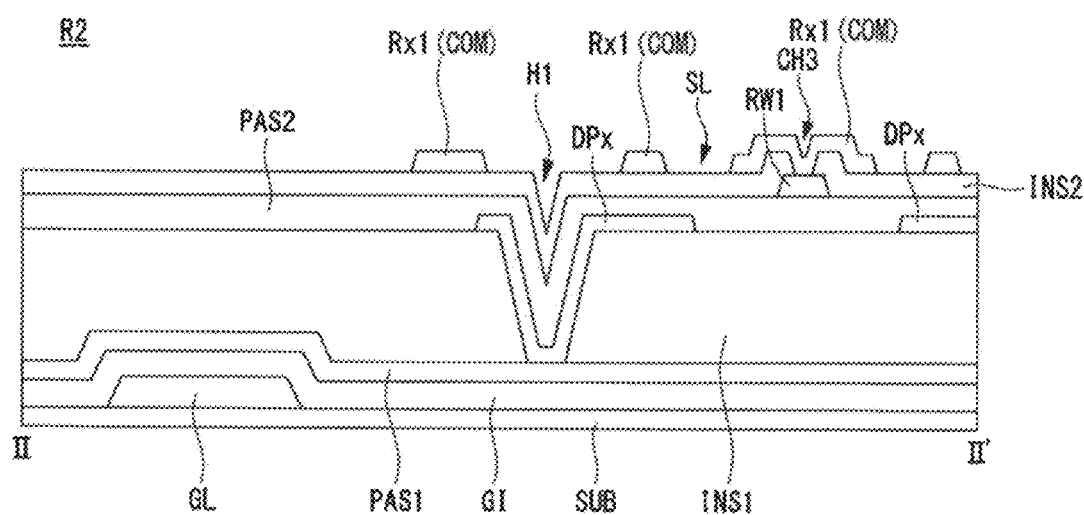
FIG. 20B is a cross-sectional view taken along line II-II' of FIG. 20A.
Figure 21A:
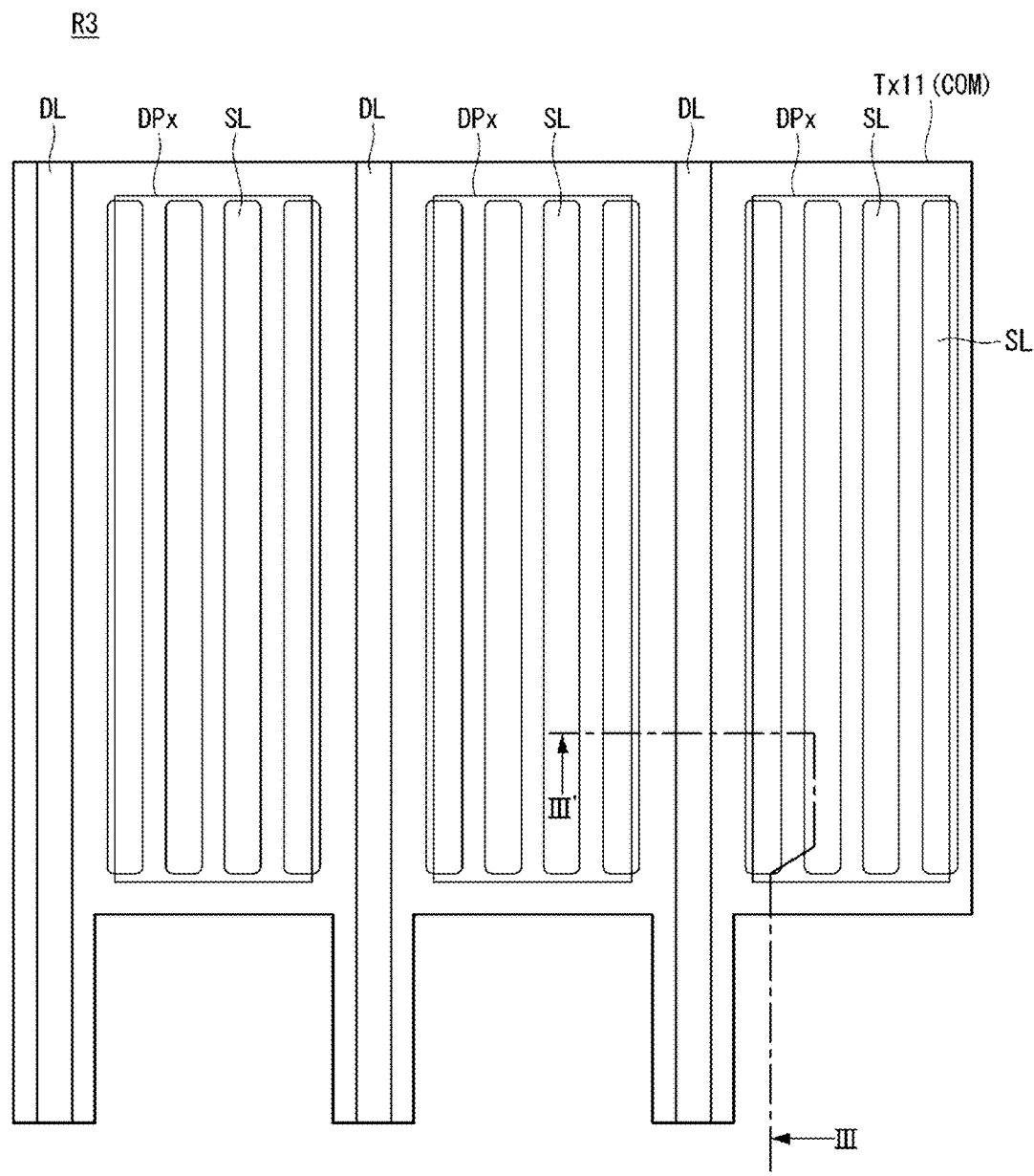
FIG. 21A is a plane view showing a partial area R3 of a bezel area shown in FIG. 18.
Figure 21B:
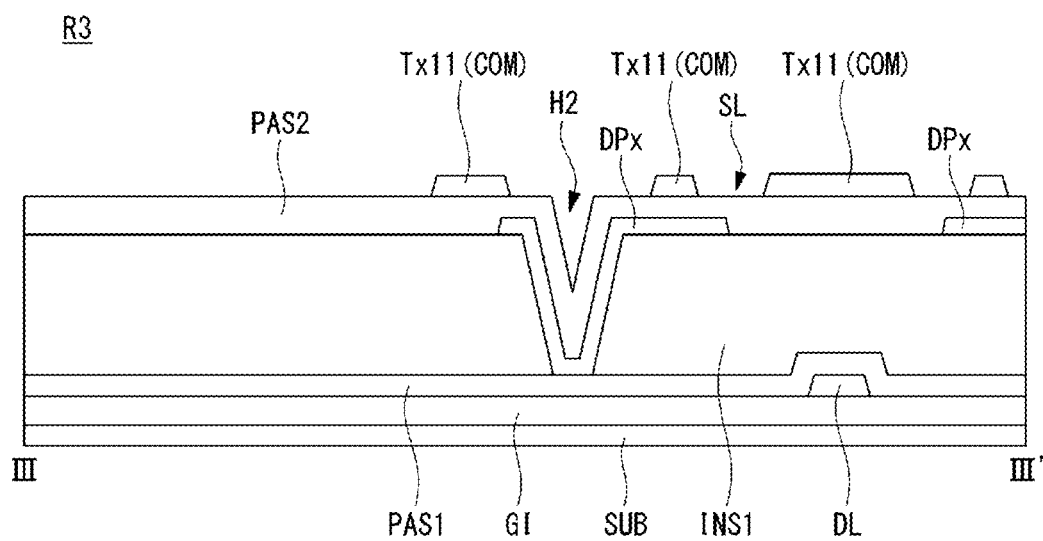
FIG. 21B is a cross-sectional view taken along line III-III' of FIG. 21A.

FIGS. 19A to 21B show example structures of the active area AA and the bezel area BA of the mutual capacitive touch sensor integrated type display device according to the fourth embodiment of the invention. FIG. 19A is a plane view showing a partial area R1 of the active area AA shown in FIG. 18, and FIG. 19B is a cross-sectional view taken along line I-I' of FIG. 19A. FIG. 20A is a plane view showing a partial area R2 of the bezel area BA shown in FIG. 18, and FIG. 20B is a cross-sectional view taken along line II-II' of FIG. 20A. FIG. 21A is a plane view showing a partial area R3 of the bezel area BA shown in FIG. 18, and FIG. 21B is a cross-sectional view taken along line III-III' of FIG. 21A.

As shown in FIGS. 19A and 19B, in the active area AA, gate lines GL and data lines DL which may be formed to cross over each other on the substrate SUB of the TFT array TFTA, thin film transistors formed at crossings of the gate lines GL and the data lines DL, pixel electrodes Px formed in areas defined by the crossing of the gate lines GL and the data lines DL, and touch electrodes Tx11 serving as the common electrode positioned opposite the pixel electrodes Px, may be disposed. For example, the touch electrode Tx11 serving as the common electrode shown in FIGS. 19A and 19B indicates a partial area of the first touch electrode Tx11 in the active area AA among the first touch electrodes Tx11-Tx14, Tx21-Tx24, Tx31-Tx34, and Tx41-Tx44 and the second touch electrodes Rx1 to Rx5 shown in FIG. 18.

In the above configuration, the gate line GL may be formed on the substrate SUB, and a gate insulating layer GI may be formed on the gate line GL. An active layer A, a source electrode S, and a drain electrode D constituting the thin film transistor may be formed on the gate insulating layer GI.

For example, the thin film transistor may include a gate electrode G extending from the gate line GL formed on the substrate SUB, the active layer A formed on the gate insulating layer GI covering the gate line GL and the gate electrode G in an area corresponding to the gate electrode G, and the source electrode S and the drain electrode D, which may be separated from each other on the gate insulating layer GI so as to expose a portion of the active layer A. The source electrode S may extend from the data line DL.

Embodiments have described, as an example, a thin film transistor having a gate bottom structure, in which the gate electrode may be formed under the source and drain electrodes, but embodiments are not limited to this example. Embodiments of the invention should be understood as including a thin film transistor having a gate top structure, in which the gate electrode may be formed on the source and drain electrodes. Because the thin film transistor having the gate top structure may already be known, a detailed description thereof will be omitted.

A first passivation layer PAS1 covering the thin film transistor and the data line DL may be formed on the gate insulating layer GI, on which the thin film transistor and the data line DL may be formed, and a first insulating layer INS1, such as photoacryl, for planarization may be formed on the first passivation layer PAS1. A first contact hole CH1 exposing a portion of the drain electrode D may be formed in the first passivation layer PAS1.

The pixel electrodes Px may be formed on the first insulating layer INS1 and may be respectively arranged in pixel areas defined by the crossing of the data lines DL and the gate lines GL. The first insulating layer INS1 may include a second contact hole CH2 exposing the portion of the drain electrode D exposed through the first contact hole CH1 of the first passivation layer PAS1. The pixel electrode Px may be connected to the drain electrode D of the thin film transistor through the second contact hole CH2 passing through the first insulating layer INS1.

A second passivation layer PAS2 may be formed on the first insulating layer INS1, on which the pixel electrodes Px may be formed.

The routing wire TW11 may be formed on the second passivation layer PAS2 and may overlap the data line DL.

A second insulating layer INS2 having a contact hole CH3 may be formed on the second passivation layer PAS2, on which the routing wire TW11 may be formed, and thus a portion of the routing wire TW11 may be exposed through the contact hole CH3. The touch electrode Tx11 serving as the common electrode may be formed on the second insulating layer INS2 and may be connected to the routing wire TW11 through the contact hole CH3. The touch electrode Tx11 serving as the common electrode may be formed to overlap the plurality of pixel electrodes Px. The touch electrode Tx11 serving as the common electrode may have a plurality of slits SL, so that it may be easy to form a horizontal electric field between the touch electrode Tx11 and the pixel electrodes Px.

As shown in FIGS. 20A and 20B, the gate lines GL extending from the active area AA may be formed on the substrate SUB in the partial area R2 of the bezel area BA on the left side or the right side of the active area AA. The gate insulating layer GI, the first passivation layer PAS1, and the first insulating layer INS1 may be sequentially formed on the gate line GL. Similar to the active area AA, a hole H1 may be formed in the first insulating layer INS1 to pass through the first insulating layer INS1 and expose the first passivation layer PAS1.

Similar to the formation of the pixel electrode in the active area AA, a dummy pixel electrode DPx may be formed on the first insulating layer INS1.

The thin film transistor may not be formed in the left or right bezel area R2. Thus, the dummy pixel electrode DPx formed in the left or right bezel area BA may be floated, unlike the pixel electrode Px formed in the active area AA.

Embodiments of the invention have described that the first insulating layer INS1 of the bezel area BA may have the hole H1. However, the hole H1 may be omitted. In such an example, the dummy pixel electrode DPx may be formed on the first insulating layer INS1.

The second passivation layer PAS2 may be formed on the first insulating layer INS1, on which the dummy pixel electrodes DPx may be formed.

The second routing wire RW1 may be formed on the second passivation layer PAS2 in a direction parallel to an arrangement direction of the data line DL.

The second touch electrode Rx1 serving as the common electrode extending from the active area AA may be formed on the second passivation layer PAS2, on which the second routing wire RW1 may be formed. The second touch electrode Rx1 serving as the common electrode may be formed to overlap the plurality of dummy pixel electrodes DPx. The second touch electrode Rx1 serving as the common electrode may have a plurality of slits SL, similar to the pixel electrode Px formed in the active area AA.

As shown in FIGS. 21A and 21B, the data lines DL extending from the active area AA may be formed on the gate insulating layer GI in the partial area R3 of the bezel area BA on the upper side or the lower side of the active area AA. The first passivation layer PAS1 and the first insulating layer INS1 may be sequentially formed on the gate insulating layer GI, on which the data lines DL may be formed. Similar to the active area AA, a hole H2 may be formed in the first insulating layer INS1 to pass through the first insulating layer INS1 and expose the first passivation layer PAS1.

Similar to the formation of the pixel electrode in the active area AA, a dummy pixel electrode DPx may be formed on the first insulating layer INS1.

The thin film transistor may not be formed in the upper or lower bezel area R3. Thus, the dummy pixel electrode DPx formed in the upper or lower bezel area BA may be floated, unlike the pixel electrode Px formed in the active area AA.

Embodiments of the invention have described that the first insulating layer INS1 formed in the upper or lower bezel area BA may have the hole H2. However, the hole H2 may be omitted. In such an example, the dummy pixel electrode DPx may be formed on the first insulating layer INS1.

The second passivation layer PAS2 may be formed on the first insulating layer INS1, on which the dummy pixel electrodes DPx may be formed.

The first touch electrode Tx11 serving as the common electrode extending from the active area AA may be formed on the second passivation layer PAS2. The first touch electrode Tx11 serving as the common electrode may be formed to overlap the plurality of dummy pixel electrodes DPx. The first touch electrode Tx11 serving as the common electrode may have a plurality of slits SL, similar to the pixel electrode Px formed in the active area AA.

In the mutual capacitive touch sensor integrated type display device according to the example fourth embodiment of the invention, the first touch electrodes Tx11-Tx14 and Tx41-Tx44 of the upper edge and the lower edge and the second touch electrodes Rx1 and Rx5 of the leftmost side and the rightmost side may extend from the active area AA to the bezel area BA, and the second touch electrodes Rx1 to Rx5 may each have the same size. Thus, even if a touch operation is performed at an edge or a corner of the active area AA, capacitances may be compensated through portions of the first and second touch electrodes extending to the bezel area BA. Hence, a touch performance may be improved.

In the mutual capacitive touch sensor integrated type display device according to the example fourth embodiment of the invention, the dummy pixel electrode DPx having the same structure as the pixel electrode Px formed in the active area AA and the gate line GL extending from the active area AA may be formed in the left and right bezel areas BA. Further, the dummy pixel electrode DPx having the same structure as the pixel electrode Px formed in the active area AA and the data line DL extending from the active area AA may be formed in the upper and lower bezel areas BA. Initial capacitances in the active area AA and the bezel area BA may be similarly maintained by equally forming the pixel electrodes and the signal lines in the active area AA and the bezel area BA as described above. Hence, the touch accuracy may be improved.

In the mutual capacitive touch sensor integrated type display device according to the example fourth embodiment of the invention, a dummy data line (not shown) may be formed in the bezel area BA on the left and right sides of the active area AA, and a dummy gate line (not shown) may be formed in the bezel area BA on the upper and lower sides of the active area AA.

Figure 22:
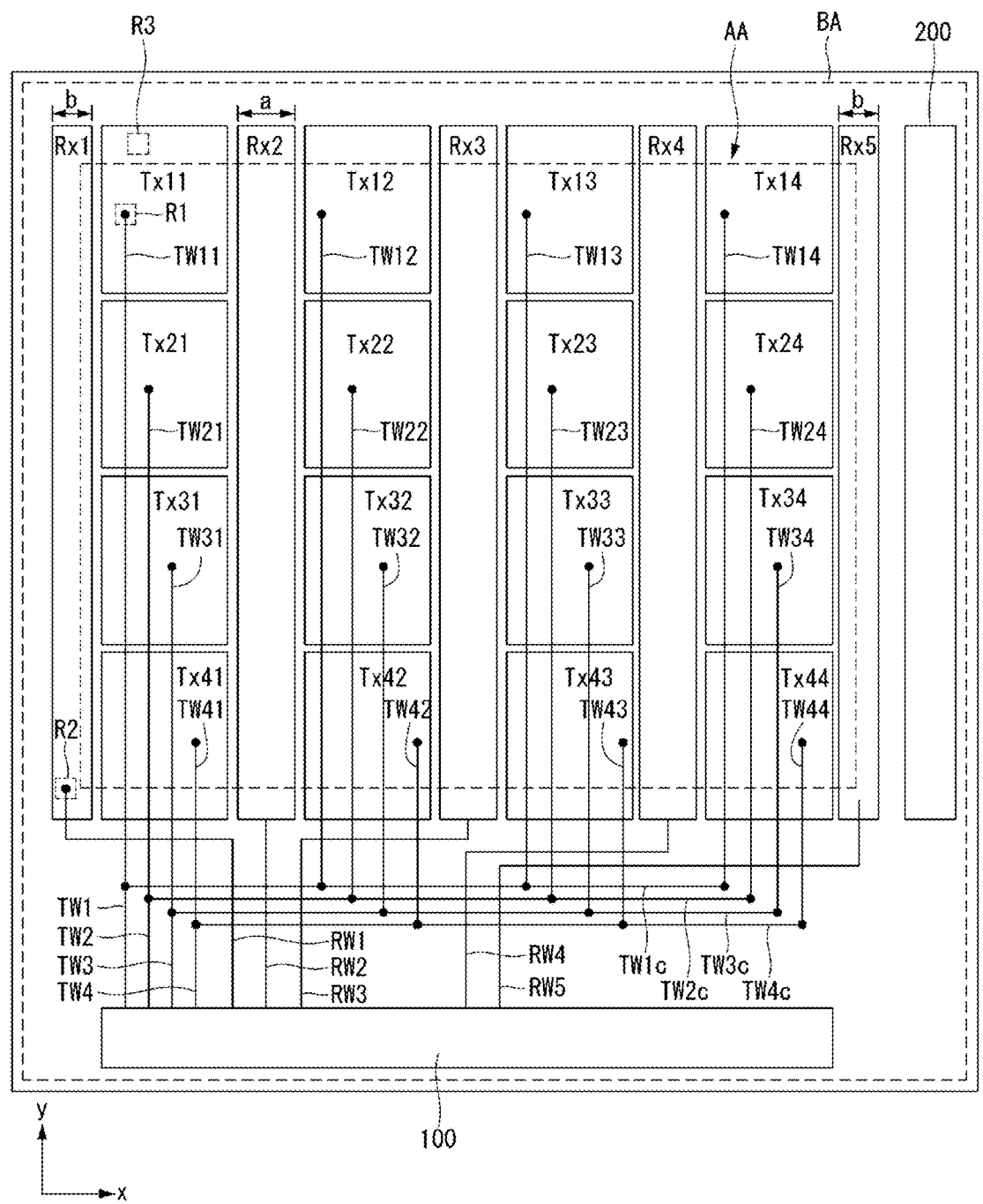
FIG. 22 is a plane view showing a mutual capacitive touch sensor integrated type display device according to a fifth embodiment of the invention.

A mutual capacitive touch sensor integrated type display device according to an example fifth embodiment of the invention is described with reference to FIGS. 22 to 27B. FIG. 22 is a plane view showing the mutual capacitive touch sensor integrated type display device according to the fifth embodiment.

As shown in FIG. 22, the mutual capacitive touch sensor integrated type display device according to the fifth embodiment of the invention may include an active area AA and a bezel area BA positioned outside the active area AA.

The example fifth embodiment of the invention shown in FIG. 22 may be different from the fourth embodiment shown in FIG. 18, in that the size of each of 2-1 and 2-5 touch electrodes Rx1 and Rx5 disposed on the outermost sides may be less than the size of each of 2-2 to 2-4 touch electrodes Rx2, Rx3, and Rx4 disposed in the active area AA, and touch electrodes, gate lines, and data lines may have different configurations in the active area AA and the bezel area BA.

Thus, the mutual capacitive touch sensor integrated type display device according to the example fifth embodiment is described below with reference to differences between the fourth and fifth embodiments.

As shown in FIG. 22, the 2-1 and 2-5 touch electrodes Rx1 and Rx5, which may be formed in the active area AA and the bezel area BA and may be disposed on the outermost sides, each may have a width 'b' less than a width 'a' of each of the 2-2 to 2-4 touch electrodes Rx2, Rx3, and Rx4 disposed in the active area AA. The size of the bezel area BA may decrease through a reduction in the width of the 2-1 and 2-5 touch electrodes Rx1 and Rx5 of the outermost sides.

Because a disposition relationship and a connection relationship between the touch electrodes, routing wires, ICs, etc. formed in the active area AA and the bezel area BA in the fifth embodiment shown in FIG. 22 may be substantially the same as the fourth embodiment, a further description may be briefly made or may be entirely omitted.

The structures of the active area AA and the bezel area BA of the mutual capacitive touch sensor integrated type display device according to the example fifth embodiment of the invention will be described with reference to FIGS. 23A to 28B.

Figure 23A:
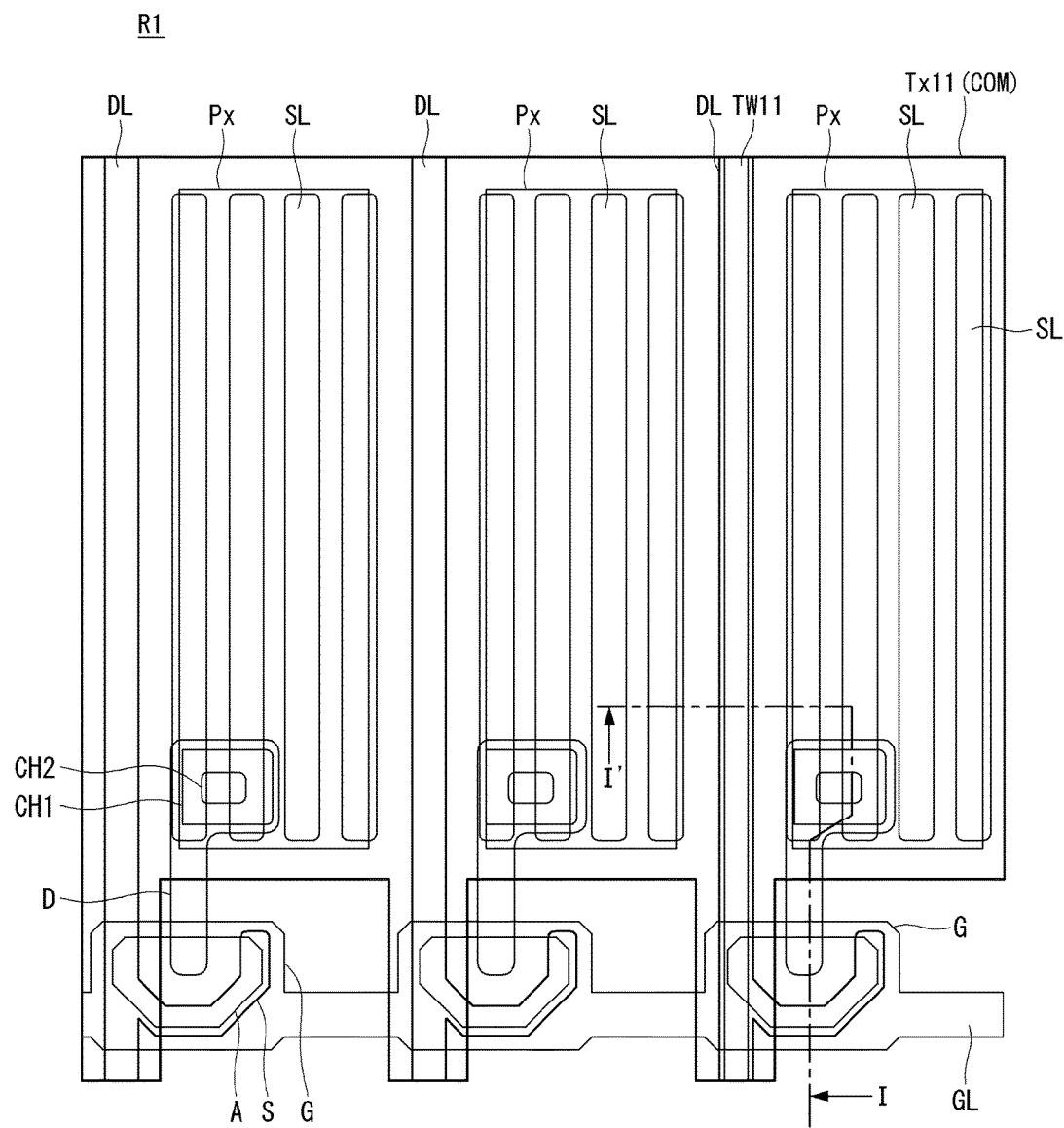
FIG. 23A is a plane view showing a partial area R1 of an active area shown in FIG. 22.
Figure 23B:
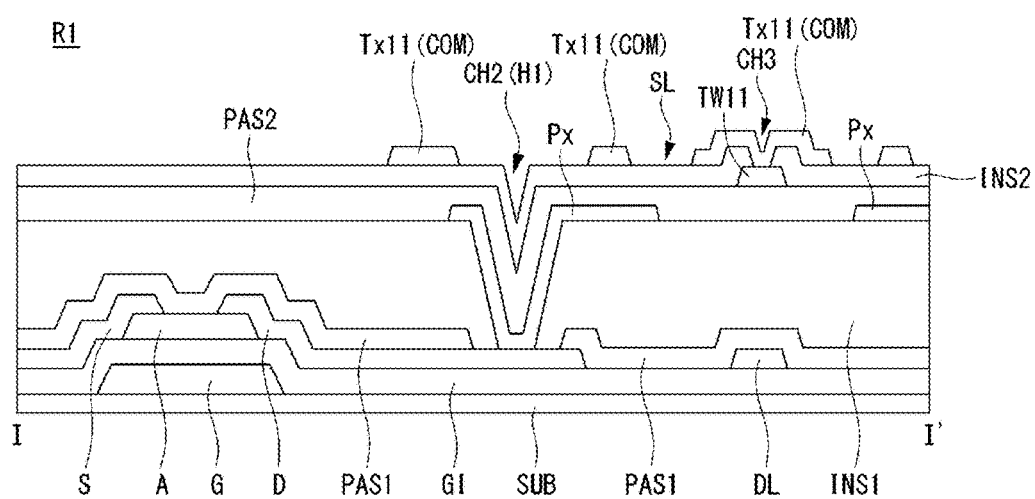
FIG. 23B is a cross-sectional view taken along line I-I' of FIG. 23A.
Figure 24A:
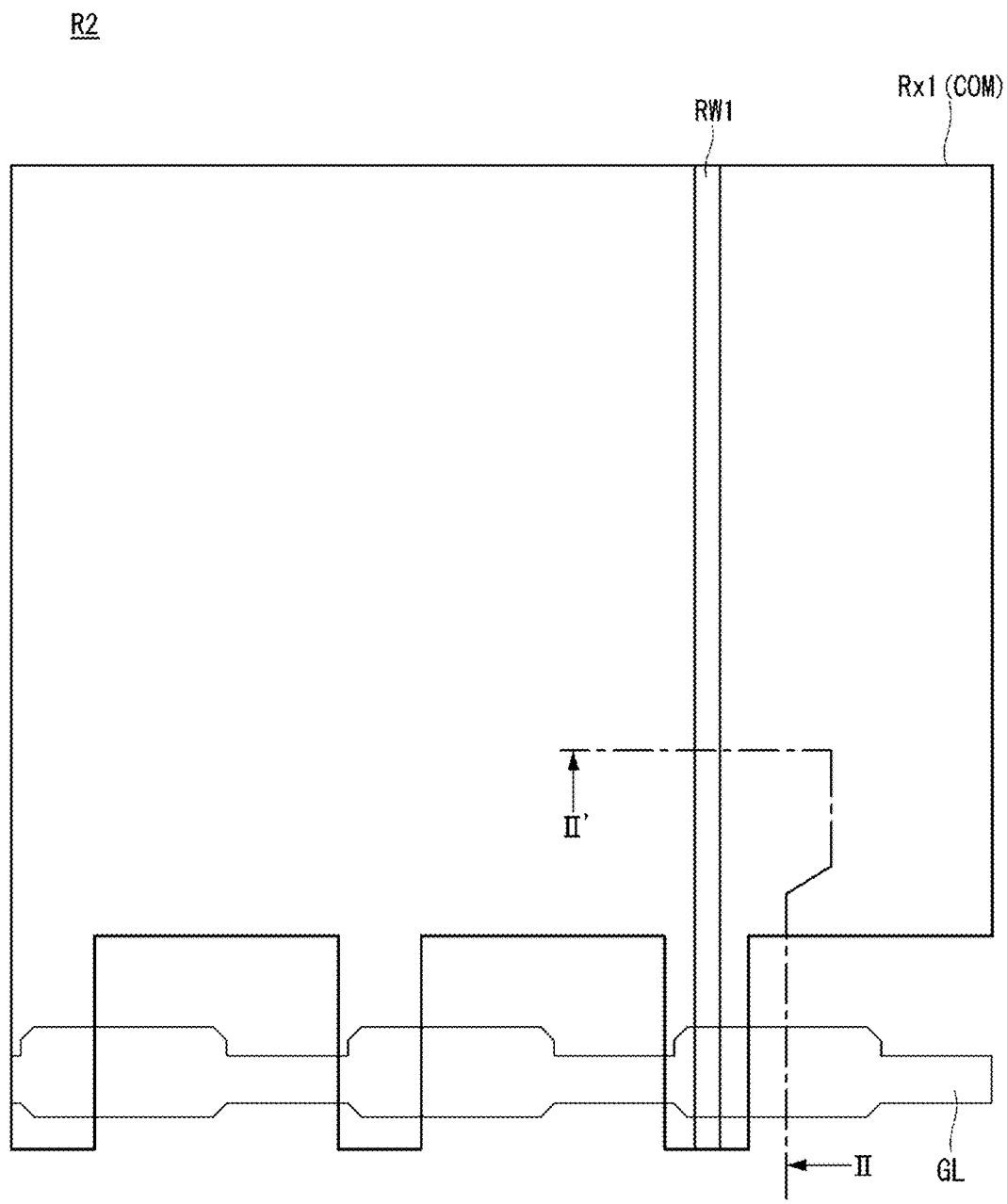
FIG. 24A is a plane view showing an example of a partial area R2 of a bezel area on the left side or the right side of an active area shown in FIG. 22.
Figure 24B:
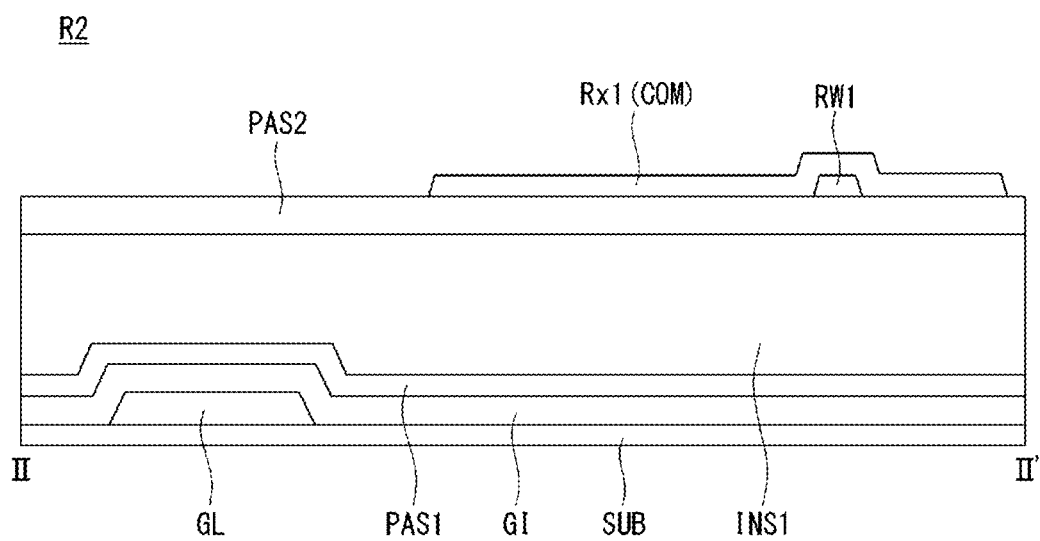
FIG. 24B is a cross-sectional view taken along line II-II' of FIG. 24A.
Figure 25A:
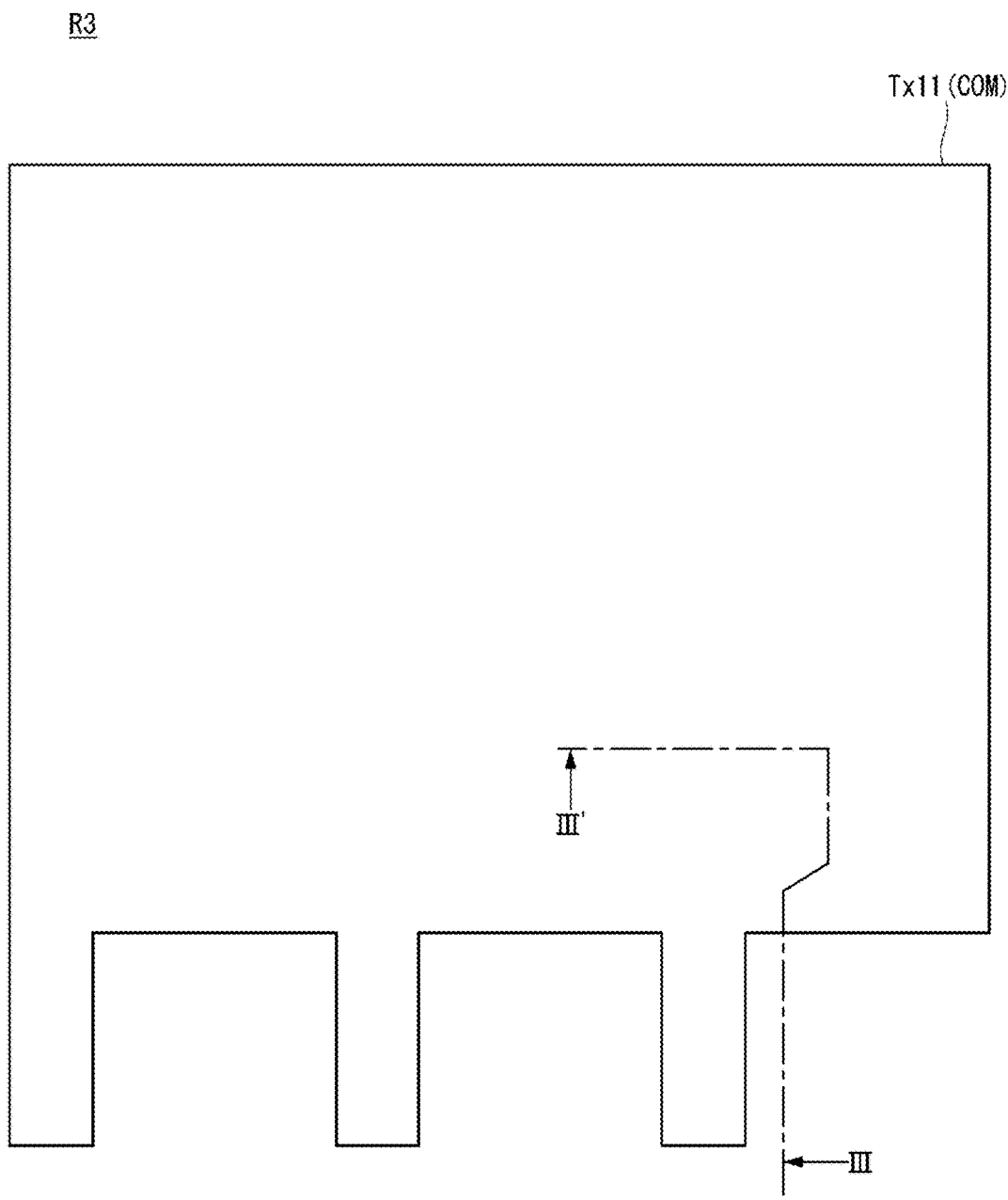
FIG. 25A is a plane view showing an example of a partial area R3 of a bezel area on the upper side or the lower side of an active area shown in FIG. 22.
Figure 25B:
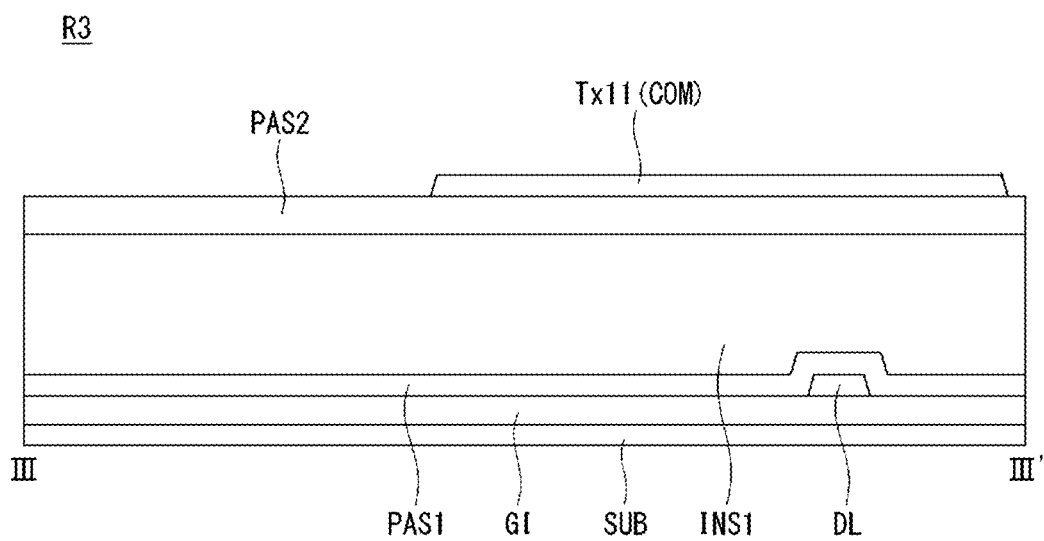
FIG. 25B is a cross-sectional view taken along line III-III' of FIG. 25A.

FIG. 23A is a plane view showing a partial area R1 of the active area AA shown in FIG. 22, and FIG. 23B is a cross-sectional view taken along line I-I' of FIG. 23A. FIG. 24A is a plane view showing an example of a partial area R2 of the bezel area BA on the left side or the right side of the active area AA shown in FIG. 22, and FIG. 24B is a cross-sectional view taken along line II-II' of FIG. 24A. FIG. 25A is a plane view showing an example of a partial area R3 of the bezel area BA on the upper side or the lower side of the active area AA shown in FIG. 22, and FIG. 25B is a cross-sectional view taken along line III-III' of FIG. 25A.

As shown in FIGS. 23A and 23B, in the active area AA, gate lines GL and data lines DL which may be formed to cross over each other on the substrate SUB of the TFT array TFTA, thin film transistors formed at crossings of the gate lines GL and the data lines DL, pixel electrodes Px formed in areas defined by the crossing of the gate lines GL and the data lines DL, and common electrodes COM (e.g., first touch electrodes Tx11-Tx14, Tx21-Tx24, Tx31-Tx34, and Tx41-Tx44 and the second touch electrodes Rx1 to Rx5 shown in FIG. 22) positioned opposite the pixel electrodes Px, may be disposed. Because the configuration of the active area AA according to the example fifth embodiment of the invention may be substantially the same as configuration of the active area AA according to the fourth embodiment of the invention, a further description may be briefly made or may be entirely omitted.

As shown in FIGS. 24A and 24B, the gate lines GL extending from the active area AA may be formed on the substrate SUB in the partial area R2 of the bezel area BA on the left side or the right side of the active area AA. A gate insulating layer GI, a first passivation layer PAS1, a first insulating layer INS1, and a second passivation layer PAS2 may be sequentially formed on the gate line GL.

The thin film transistor and the pixel electrode may not be formed in the left or right bezel area R2, unlike the active area AA.

A second routing wire RW1 may be formed on the second passivation layer PAS2 in a direction parallel to an arrangement direction of the data line DL.

The second touch electrode Rx1 extending from the active area AA may be formed on the second passivation layer PAS2, on which the second routing wire RW1 may be formed. The second touch electrode Rx1 may not have a slit SL, unlike the first touch electrodes Tx11-Tx14, Tx21-Tx24, Tx31-Tx34, and Tx41-Tx44 formed in the active area AA.

Alternatively, the second touch electrode Rx1 may have slits SL less than the number of slits SL positioned in the active area AA.

As shown in FIGS. 25A and 25B, the data lines DL extending from the active area AA may be formed on the gate insulating layer GI in the partial area R3 of the bezel area BA on the upper side or the lower side of the active area AA. The first passivation layer PAS1, the first insulating layer INS1, and the second passivation layer PAS2 may be sequentially formed on the gate insulating layer GI, on which the data lines DL may be formed. The thin film transistor and the pixel electrode may not be formed in the upper or lower bezel area R3.

The first touch electrode Tx11 extending from the active area AA may be formed on the second passivation layer PAS2. The first touch electrode Tx11 positioned in the upper or lower bezel area R3 may not have a slit SL, unlike the first touch electrode Tx positioned in the active area AA, or may have slits SL less than the number of slits SL positioned in the active area AA.

Figure 26A:
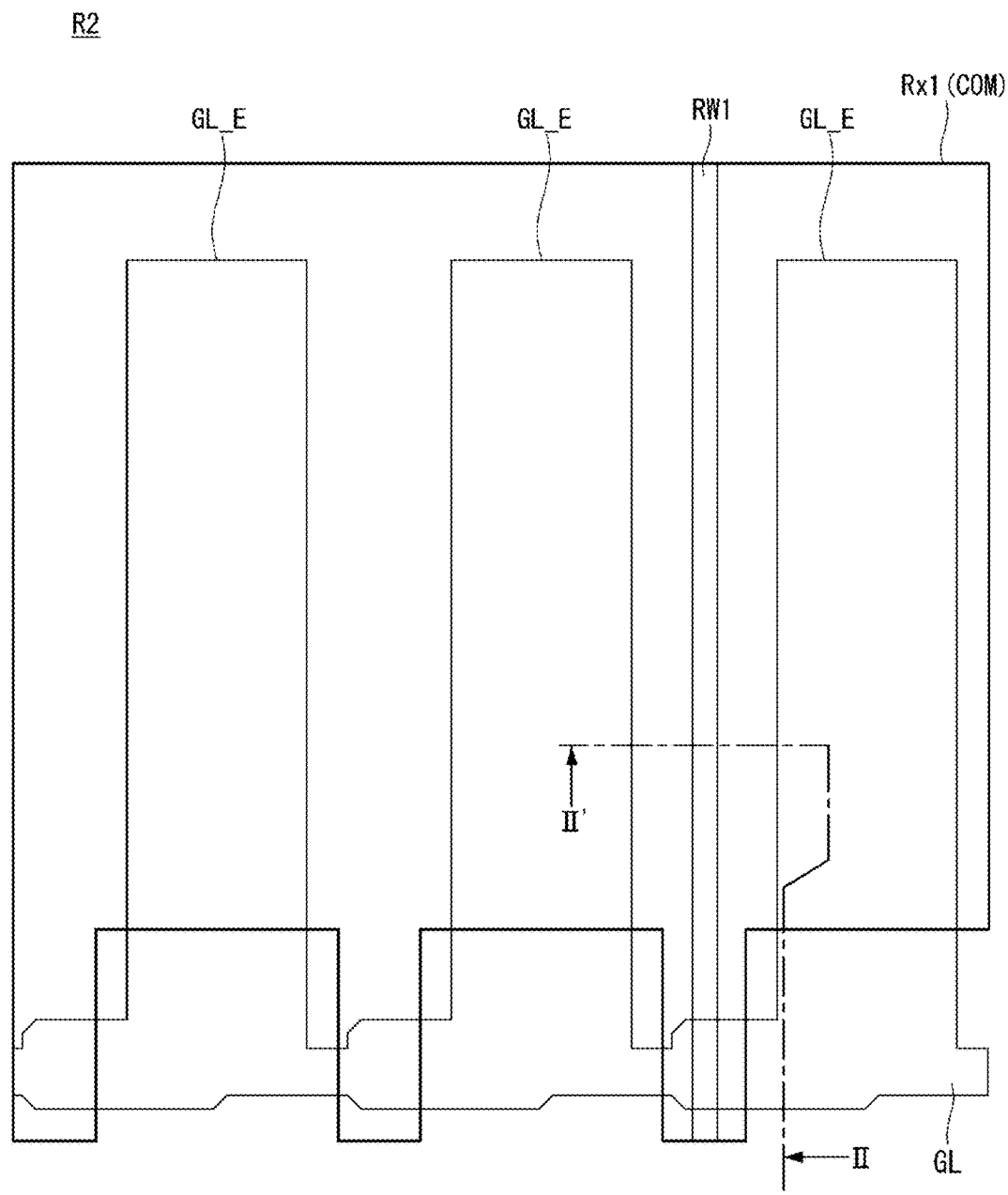
FIG. 26A is a plane view showing another example of a partial area R2 of a bezel area shown in FIG. 22.
Figure 26B:
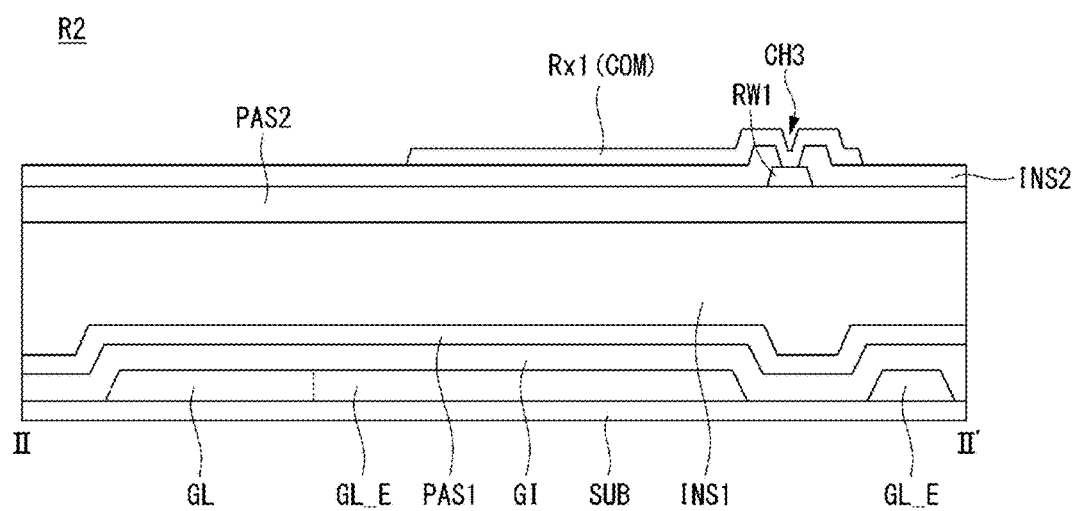
FIG. 26B is a cross-sectional view taken along line II-II' of FIG. 26A.
Figure 27A:
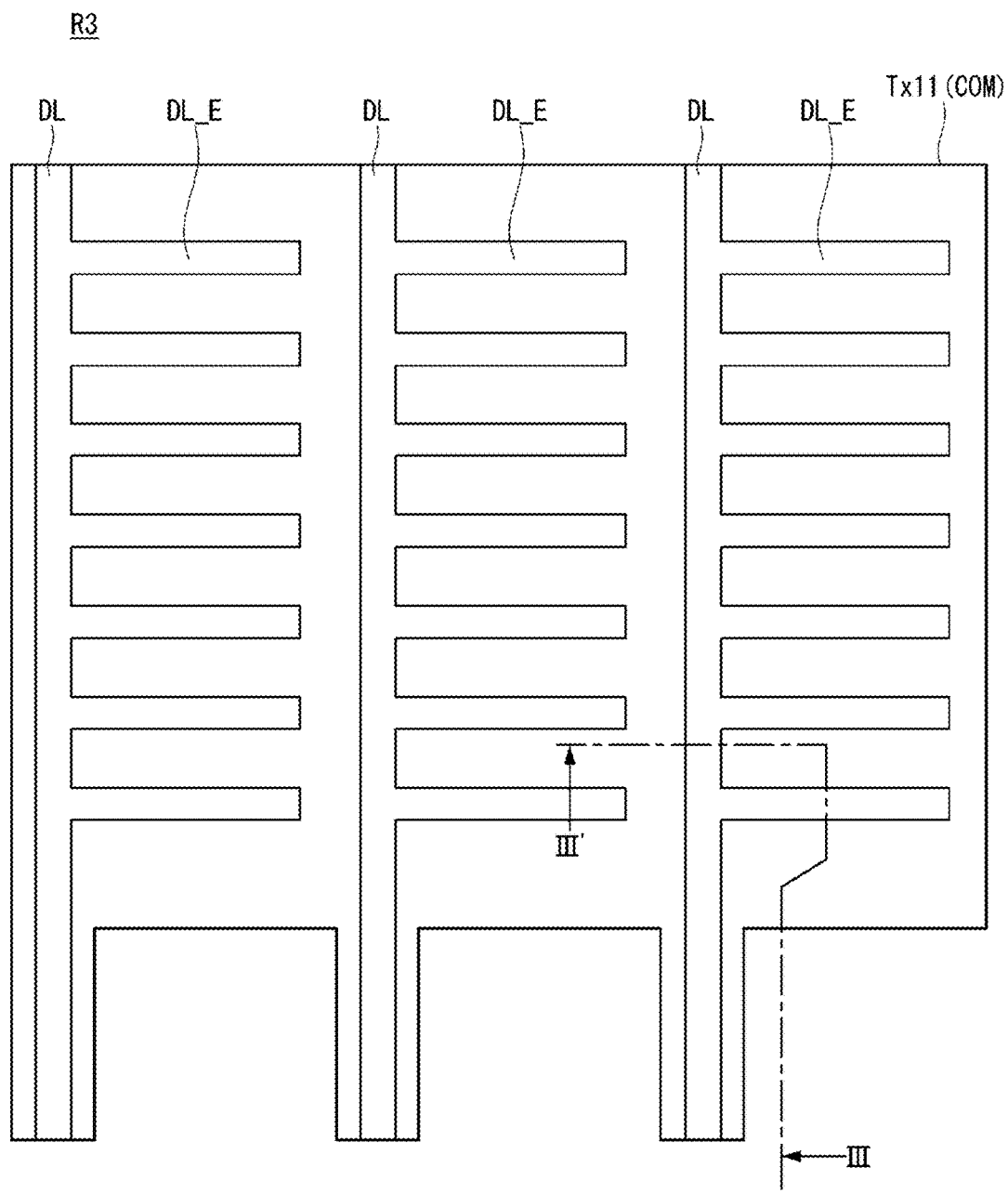
FIG. 27A is a plane view showing another example of a partial area R3 of a bezel area shown in FIG. 22.
Figure 27B:
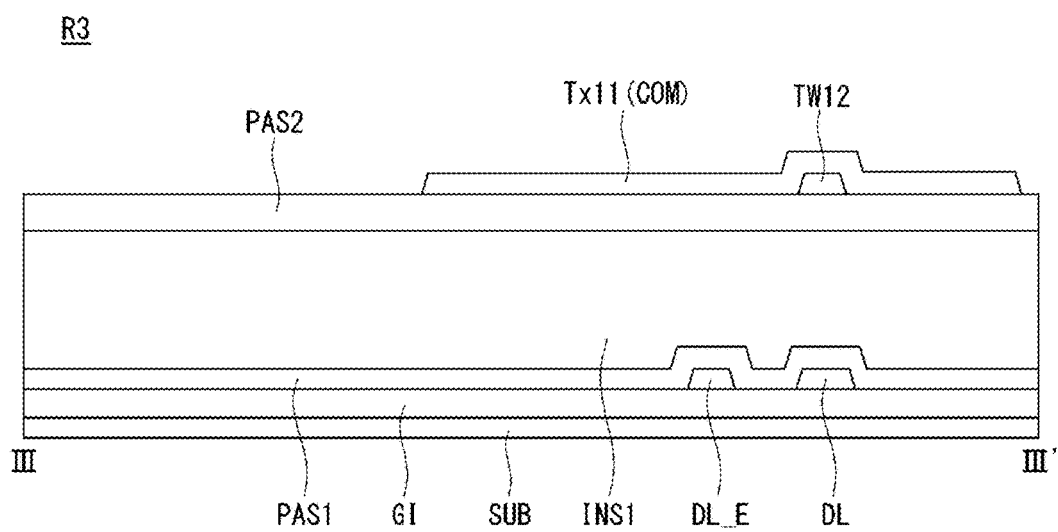
FIG. 27B is a cross-sectional view taken along line III-III' of FIG. 27A.

FIG. 26A is a plane view showing another example of the partial area R2 of the bezel area BA shown in FIG. 22, and FIG. 26B is a cross-sectional view taken along line II-II' of FIG. 26A. FIG. 27A is a plane view showing another example of the partial area R3 of the bezel area BA shown in FIG. 22, and FIG. 27B is a cross-sectional view taken along line of FIG. 27A.

As shown in FIGS. 26A and 26B, the gate lines GL extending from the active area AA may be formed on the substrate SUB in the partial area R2 of the bezel area BA on the left side or the right side of the active area AA. Each gate line GL may include a plurality of gate line extensions GL_E extending in a direction crossing an arrangement direction of the gate line GL. The gate insulating layer GI, the first passivation layer PAS1, the first insulating layer INS1, and the second passivation layer PAS2 may be sequentially formed on the substrate SUB, on which the gate lines GL and the gate line extensions GL_E may be formed.

The thin film transistor and the pixel electrode may not be formed in the left or right bezel area R2, unlike in the active area AA.

The second routing wire RW1 may be formed on the second passivation layer PAS2 in a direction parallel to an arrangement direction of the data line DL.

The second touch electrode Rx1 extending from the active area AA may be formed on the second passivation layer PAS2, on which the second routing wire RW1 may be formed. The second touch electrode Rx1 may not have a slit SL, unlike the first and second touch electrodes positioned in the active area AA, or may have slits SL less than the number of slits SL positioned in the active area AA.

As shown in FIGS. 27A and 27B, the data lines DL extending from the active area AA may be formed on the gate insulating layer GI in the partial area R3 of the bezel area BA on the upper side or the lower side of the active area AA. Each data line GL may include a plurality of data line extensions DL_E extending in a direction crossing an arrangement direction of the data line GL. The first passivation layer PAS1, the first insulating layer INS1, and the second passivation layer PAS2 may be sequentially formed on the gate insulating layer GI, on which the data lines DL and the data line extensions DL_E may be formed. The thin film transistor and the pixel electrode may not be formed in the upper or lower bezel area R3.

The first touch electrode Tx11 extending from the active area AA may be formed on the second passivation layer PAS2. The first touch electrode Tx11 positioned in the upper or lower bezel area R3 may not have a slit SL, unlike the first touch electrode Tx positioned in the active area AA, or may have slits SL less than the number of slits SL positioned in the active area AA.

In the mutual capacitive touch sensor integrated type display device according to the example fifth embodiment of the invention, the first touch electrodes Tx11-Tx14 and Tx41-Tx44 of the upper edge and the lower edge and the second touch electrodes Rx1 and Rx5 of the leftmost side and the rightmost side extend from the active area AA to the bezel area BA, and the sizes of the second touch electrodes Rx1 and Rx5 of the leftmost side and the rightmost side may be less than the sizes of the second touch electrodes Rx2 to Rx4 positioned between the leftmost side and the rightmost side. Hence, the size of the bezel area in the fifth embodiment may decrease as compared to the fourth embodiment of the invention. Further, even if a touch operation is performed at an edge or a corner of the active area AA, capacitances may be compensated through portions of the first and second touch electrodes extending to the bezel area BA. As a result, a touch performance may be improved.

Furthermore, the gate lines GL extending from the active area AA and the gate line extensions GL_E extending from the gate lines GL may be formed in the bezel area BA on the left or right side of the active area AA, and the data lines DL extending from the active area AA and the data line extensions DL_E extending from the data lines DL may be formed in the bezel area BA on the upper or lower side of the active area AA. Initial capacitances in the active area AA and the bezel area BA may be similarly maintained by forming the extensions to the signal lines formed in the bezel area BA, and thus the touch accuracy may be improved.

In the mutual capacitive touch sensor integrated type display device according to the example fifth embodiment, a dummy data line (not shown) may be formed in the bezel area BA on the left and right sides of the active area AA, and a dummy gate line (not shown) may be formed in the bezel area BA on the upper and lower sides of the active area AA.

Figure 28:
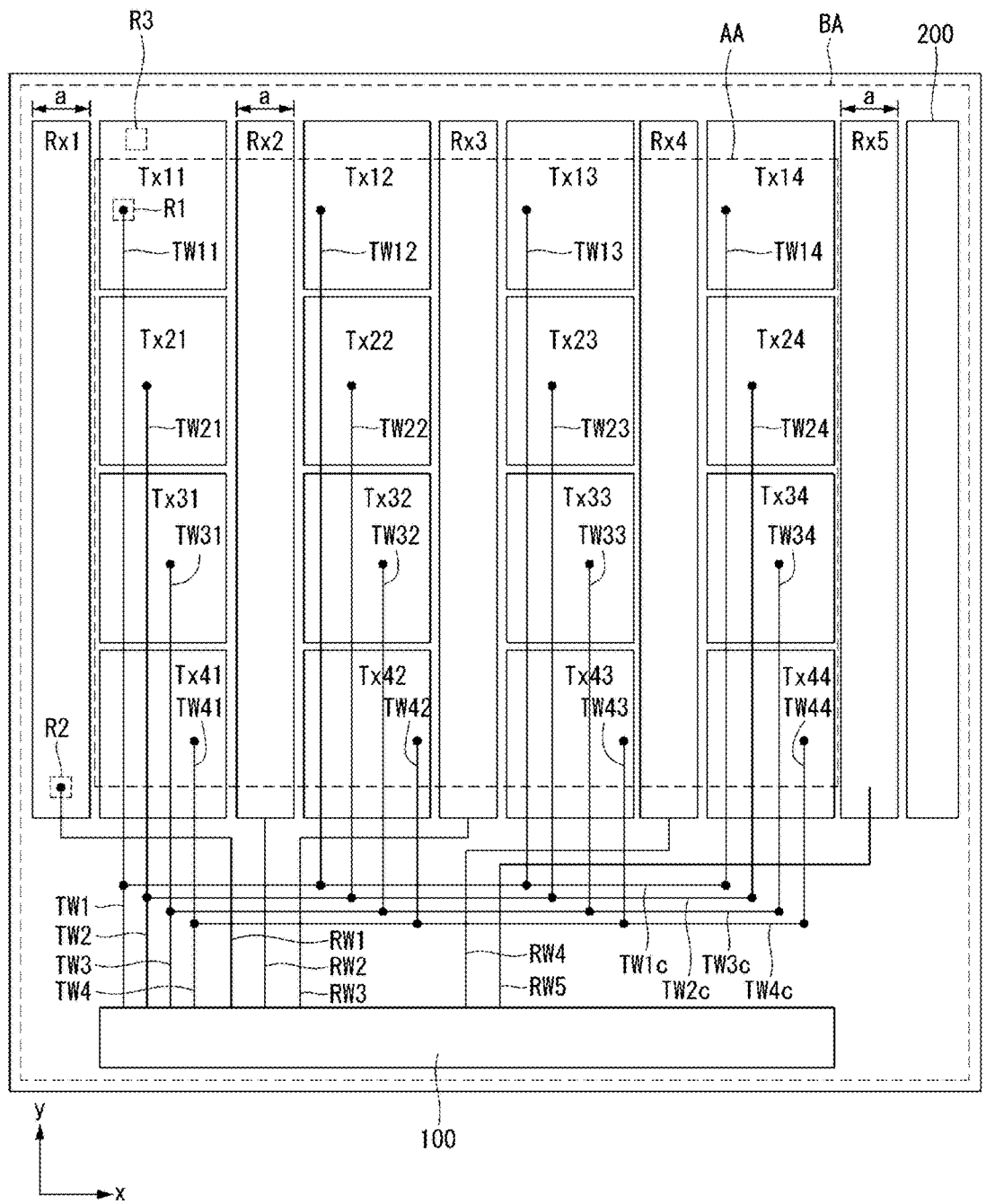
FIG. 28 is a plane view showing a mutual capacitive touch sensor integrated type display device according to a sixth embodiment of the invention.

A mutual capacitive touch sensor integrated type display device according to an example sixth embodiment of the invention is described with reference to FIG. 28. FIG. 28 is a plane view showing the mutual capacitive touch sensor integrated type display device according to the sixth embodiment.

The mutual capacitive touch sensor integrated type display device according to the sixth embodiment may be substantially the same as the mutual capacitive touch sensor integrated type display device according to the fourth embodiment shown in FIG. 18, except that 2-1 and 2-5 touch electrodes Rx1 and Rx5 of the leftmost side and the rightmost side may be disposed only in a bezel area BA.

Furthermore, structures of areas R1, R2, and R3 in the example sixth embodiment of the invention may be substantially the same as those in the fourth embodiment. For example, the structure of the partial area R1 of the active area in the sixth embodiment of the invention may be substantially the same as the structure shown in FIGS. 19A and 19B, and the structure of the partial area R2 of the left or right bezel area in the sixth embodiment may be substantially the same as the structure shown in FIGS. 20A and 20B. Further, the structure of the partial area R3 of the upper or lower bezel area in the sixth embodiment may be substantially the same as the structure shown in FIGS. 21A and 21B. Therefore, a further description may be briefly made or may be entirely omitted.

Figure 29:
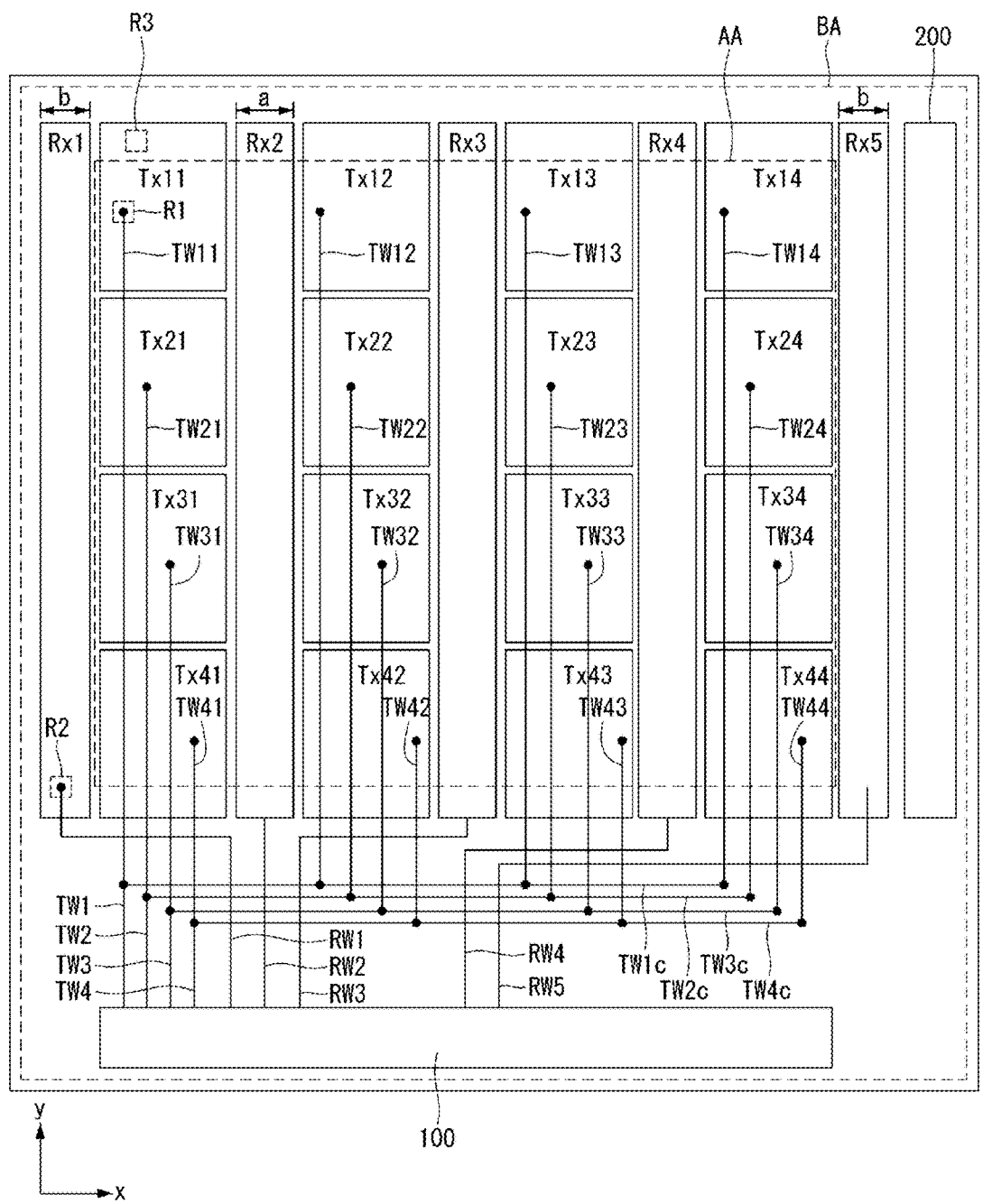
FIG. 29 is a plane view showing a mutual capacitive touch sensor integrated type display device according to a seventh embodiment of the invention.

A mutual capacitive touch sensor integrated type display device according to an example seventh embodiment of the invention is described with reference to FIG. 29. FIG. 29 is a plane view showing the mutual capacitive touch sensor integrated type display device according to the seventh embodiment.

The mutual capacitive touch sensor integrated type display device according to the seventh embodiment of the invention may be substantially the same as the mutual capacitive touch sensor integrated type display device according to the fifth embodiment shown in FIG. 22, except that 2-1 and 2-5 touch electrodes Rx1 and Rx5 of the leftmost side and the rightmost side may be disposed only in a bezel area BA.

Furthermore, structures of areas R1, R2, and R3 in the seventh embodiment of the invention may be substantially the same as those in the fifth embodiment. For example, the structure of the partial area R1 of the active area in the seventh embodiment may be substantially the same as the structure shown in FIGS. 23A and 23B, and the structure of the partial area R2 of the left or right bezel area in the seventh embodiment may be substantially the same as the structure shown in FIGS. 24A and 24B and FIGS. 26A and 26B. Further, the structure of the partial area R3 of the upper or lower bezel area in the seventh embodiment may be substantially the same as the structure shown in FIGS. 25A and 25B and FIGS. 27A and 27B. Therefore, a further description may be briefly made or may be entirely omitted.

Figure 30:
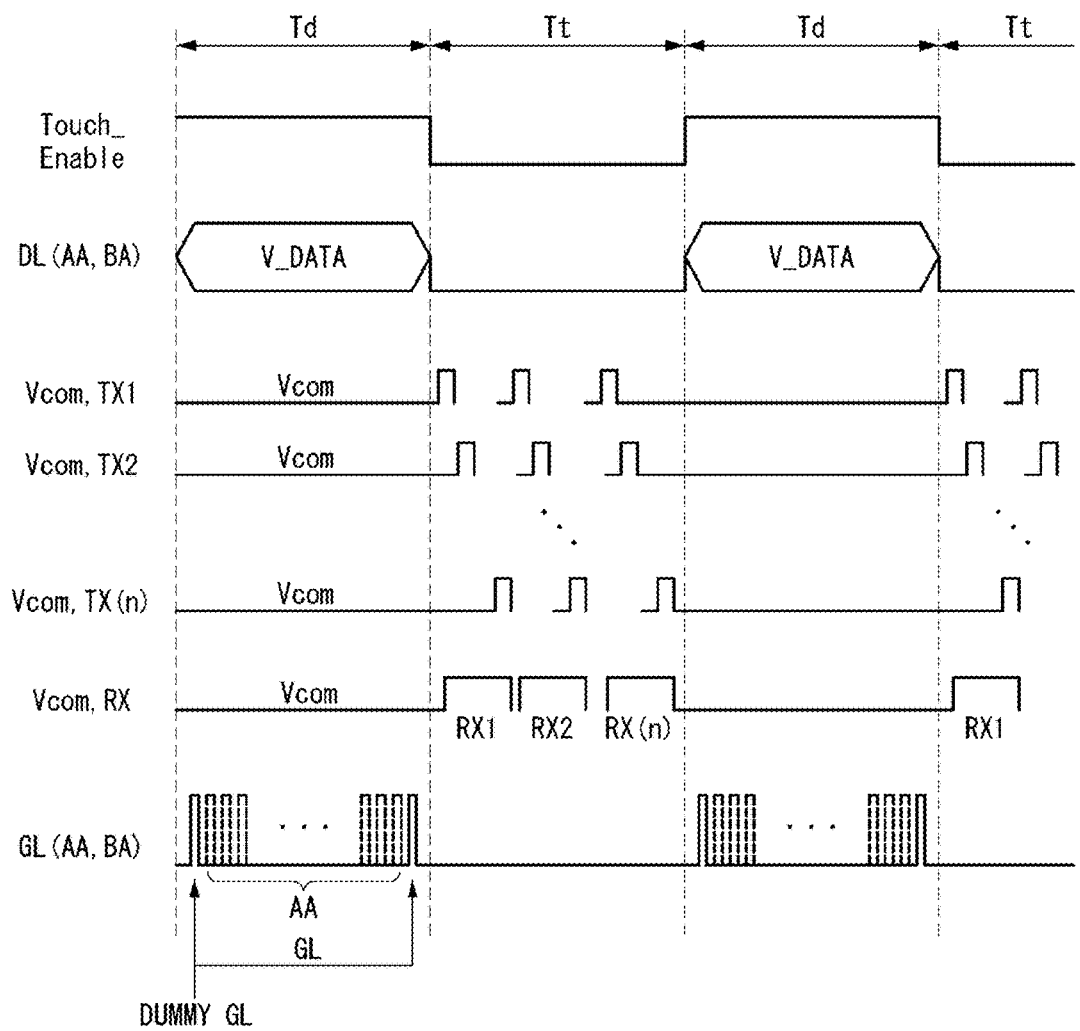
FIG. 30 is a waveform diagram of signals applied to a drive of the mutual capacitive touch sensor integrated type display device according to the fourth to seventh embodiments of the invention.

An example drive of the mutual capacitive touch sensor integrated type display device according to the fourth to seventh embodiments of the invention may be described with reference to FIG. 30. FIG. 30 is a waveform diagram of signals applied to an example drive of the mutual capacitive touch sensor integrated type display device according to the fourth to seventh embodiments of the invention.

As shown in FIG. 30, the mutual capacitive touch sensor integrated type display device according to the fourth to seventh embodiments of the invention may be time-division driven in a display driving period Td and a touch sensor driving period Tt.

In the display driving period Td, the data lines DL may be driven to apply data V_DATA to pixels of the active area AA and the bezel area BA, and a common voltage Vcom may be supplied to the first touch electrodes Tx11-Tx14, Tx21-Tx24, Tx31-Tx34, and Tx41-Tx44 and the second touch electrodes Rx1 to Rx5 through the routing wires. The data V_DATA applied to the pixels of the bezel area BA may have a predetermined value, and the predetermined value may be generally close to the common voltage Vcom.

In the touch sensor driving period Tt, a touch driving voltage may be sequentially supplied to the first touch electrodes without the distinction of the active area AA and the bezel area BA and may be sensed through the second touch electrodes.

In the touch sensor integrated type display device according to embodiments of the invention, even if the touch operation is performed at an edge or a corner of the active area, capacitances may be compensated through portions of touch electrodes extending to the bezel area or touch electrodes independently formed in the bezel area. Hence, a touch performance may be improved.

Furthermore, initial capacitances in the active area and the bezel area may be similarly maintained by forming dummy pixel electrodes or signal lines (for example, gate lines and the data lines) and modified signal lines in the bezel area in the same or similar manner as in the active area. Hence, touch accuracy may be improved.

Although embodiments of the invention have been described with reference to a number of illustrative embodiments thereof, it should be understood that numerous other modifications and embodiments may be devised by those skilled in the art that will fall within the scope of the principles of this disclosure.

For example, embodiment were described using the capacitive touch sensor integrated type liquid crystal display as an example of a capacitive touch sensor integrated type display device, but embodiments are not limited thereto. Embodiments of the invention may use any flat panel display, such as (for example) a field emission display (FED), a plasma display panel (PDP), an organic light emitting display, and an electrophoresis display (EPD).

Further, the number of touch electrodes described in the embodiments of the invention is merely an example for explanation purposes.

Further, combinations of the first to seventh embodiments of the invention may be used and are within the scope of the invention.

It will be apparent to those skilled in the art that various modifications and variations can be made in the touch sensor integrated type display device of the present invention without departing from the spirit or scope of the invention. Thus, it is intended that the present invention cover the modifications and variations of this invention provided they come within the scope of the appended claims and their equivalents.

What is claimed is:

1. A touch sensor integrated type display device including an active area and a bezel area positioned outside the active area, comprising:
a plurality of gate lines and a plurality of data lines;
a plurality of pixel electrodes in the active area of the display device;
a plurality of 1-1 electrodes disposed in the active area;
a plurality of 1-2 electrodes disposed in the active area and extended from the active area to the bezel area,
wherein the plurality of 1-1 electrodes and the plurality of 1-2 electrodes are touch electrodes; and
a plurality of first routing wires respectively connected to the plurality of 1-1 and 1-2 electrodes,
wherein dummy pixel areas are positioned in the bezel area to overlap with at least one of the plurality of 1-2 electrodes,
wherein dummy pixel electrodes in the dummy pixel areas are electrically floated, and
wherein one of the first routing wires connected to one of the 1-1 electrodes is overlapped with another one of the 1-1 electrodes which is not connected to the one of the first routing wires in the active area.

2. The touch sensor integrated type display device of claim 1, wherein the 1-1 electrode is larger than the 1-2 electrode,
wherein the 1-1 electrode and a portion of the 1-2 electrode positioned in the active area each has a plurality of slits, and a portion of the 1-2 electrode positioned in the bezel area does not slits or has a number of slits less than the number of slits positioned in the active area.

3. The touch sensor integrated type display device of claim 1, wherein the dummy pixel electrodes are electrically isolated from each other.

4. The touch sensor integrated type display device of claim 1,
wherein the dummy pixel areas include a first dummy pixel area and a second dummy pixel area,
wherein one or more of the plurality of gate lines overlaps the first dummy pixel area, and one or more of the plurality of data lines overlaps the second dummy pixel area,
wherein the first dummy pixel area overlaps with a first one of the plurality of 1-2 electrodes, and
wherein the second dummy pixel area overlaps with a second one of the plurality of 1-2 electrodes.

5. The touch sensor integrated type display device of claim 1,
wherein during a touch period, a touch driving signal is supplied to at least one of the plurality of 1-2 touch electrodes, and a driving signal having a same phase as the touch driving signal is supplied to at least one gate line overlapping with the at least one of the plurality of 1-2 touch electrodes or at least one data line overlapping with the at least one of the plurality of 1-2 touch electrodes.

6. The touch sensor integrated type display device of claim 1, wherein
a portion of one of the 1-2 electrodes is positioned in the active area, and another portion of the one of the 1-2 electrodes is positioned in the bezel area.

7. The touch sensor integrated type display device of claim 1, wherein the 1-1 electrode and the 1-2 electrode have a same size and a same shape.

8. The touch sensor integrated type display device of claim 7, wherein the dummy pixel electrodes positioned in the bezel area have a same shape as the pixel electrodes positioned in the active area.

9. The touch sensor integrated type display device of claim 2, wherein the gate line positioned in the bezel area includes a plurality of gate line extensions, and the plurality of gate line extensions extend in a direction crossing the gate line.

10. The touch sensor integrated type display device of claim 2, wherein the data line positioned in the bezel area includes a plurality of data line extensions, and the plurality of data line extensions are extended in a direction crossing the data line.

* * * * *